United States Patent
Deenoo et al.

(10) Patent No.: US 11,184,816 B2
(45) Date of Patent: *Nov. 23, 2021

(54) 3GPP MMW ACCESS LINK SYSTEM ARCHITECTURE

(71) Applicant: IDAC Holdings, Inc, Wilmington, DE (US)

(72) Inventors: Yugeswar Deenoo, Chalfont, PA (US); Tao Deng, Roslyn, NY (US); Ravikumar Pragada, Warrington, PA (US); Philip J. Pietraski, Jericho, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/681,777

(22) Filed: Nov. 12, 2019

(65) Prior Publication Data
US 2020/0084680 A1  Mar. 12, 2020

Related U.S. Application Data

(63) Continuation of application No. 15/111,867, filed as application No. PCT/US2015/011707 on Jan. 16, 2015, now Pat. No. 10,512,008.

(Continued)

(51) Int. Cl.
*H04W 36/00* (2009.01)
*H04W 8/22* (2009.01)
*H04W 24/10* (2009.01)

(52) U.S. Cl.
CPC ......... *H04W 36/0088* (2013.01); *H04W 8/22* (2013.01); *H04W 24/10* (2013.01); *H04W 36/0094* (2013.01)

(58) Field of Classification Search
CPC ............... H04W 8/22; H04W 36/0088; H04W 36/0094; H04W 24/10
See application file for complete search history.

(56) References Cited

U.S. PATENT DOCUMENTS

2009/0325580 A1* 12/2009 Kazmi ................. H04W 24/10
455/436
2012/0082049 A1  4/2012 Chen et al.
(Continued)

FOREIGN PATENT DOCUMENTS

WO  2012/064265 A1  5/2012
WO  2013/086410 A2  6/2013

OTHER PUBLICATIONS

3rd Generation Partnership Project, TR 36.913 V11.0.0, "Technical Specification Group Radio Access Network, Requirements for Further Advancements for Evolved Universal Terrestrial Radio Access (E-Utra) (LTE-Advanced) (Release 11)", Sep. 2012, pp. 1-15.

(Continued)

*Primary Examiner* — Jianye Wu
(74) *Attorney, Agent, or Firm* — Condo Roccia Koptiw LLP

(57) ABSTRACT

Systems, methods, and instrumentalities are disclosed for a wireless transmit/receive unit (WTRU) comprising a processor configured to receive a set of gap patterns, and measurement activities associated therewith, wherein each of the gap patterns includes an identifier for the measurement activity to be performed, and measure a signal pursuant to at least one of the gap patterns to obtain a measurement.

20 Claims, 33 Drawing Sheets

Related U.S. Application Data

(60) Provisional application No. 61/928,860, filed on Jan. 17, 2014.

(56) References Cited

U.S. PATENT DOCUMENTS

| | | | | |
|---|---|---|---|---|
| 2012/0252487 | A1* | 10/2012 | Siomina | H04W 24/10 455/456.1 |
| 2013/0088983 | A1* | 4/2013 | Pragada | H04W 16/14 370/252 |
| 2013/0303214 | A1 | 11/2013 | Ahmadi | |
| 2013/0322279 | A1 | 12/2013 | Chincholi et al. | |
| 2015/0230263 | A1 | 8/2015 | Roy et al. | |

OTHER PUBLICATIONS

3rd Generation Partnership Project, TR 36.932 V12.1.0, "Technical Specification Group Radio Access Network, Scenarios and Requirements for Small Cell Enhancements for E-UTRA and E-UTRAN (Release 12)", Mar. 2013, pp. 1-14.

3rd Generation Partnership Project, TS 36.212 V11.4.0, "Technical Specification Group Radio Access Network, Evolved Universal Terrestrial Radio Access (E-UTRA), Multiplexing and Channel Coding (Release 11)", Dec. 2013, pp. 1-84.

3rd Generation Partnership Project, TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.

3rd Generation Partnership Project, TS 36.300 V11.7.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 11)", Sep. 2013, pp. 1-209.

3rd Generation Partnership Project, TS 36.304 V11.5.0, "Technical Specification Group Radio Access Network, Evolved Universal Terrestrial Radio Access (E-UTRA), User Equipment (UE) Procedures in Idle Mode (Release 11)", Sep. 2013, pp. 1-34.

3rd Generation Partnership Project, TS 36.321 V11.3.0, "Technical Specification Group Radio Access Network, Evolved Universal Terrestrial Radio Access (E-UTRA), Medium Access Control (MAC) Protocol Specification (Release 11)", Jun. 2013, pp. 1-57.

3rd Generation Partnership Project, TS 36.322 V11.0.0, "Technical Specification Group Radio Access Network, Evolved Universal Terrestrial Radio Access (E-UTRA), Radio Link Control (RLC) Protocol Specification (Release 11)", Sep. 2012, pp. 1-39.

3rd Generation Partnership Project, TS 36.331 V11.5.0, "Technical Specification Group Radio Access Network, Evolved Universal Terrestrial Radio Access (E-UTRA), Radio Resource Control (RRC), Protocol Specification (Release 11)", Sep. 2013, pp. 1-347.

Raaf et al., "Vision for Beyond 4G Broadband Radio Systems", IEEE 22nd International Symposium on Personal, Indoor and Mobile Radio Communications, Sep. 2011, pp. 2369-2373.

Vinella et al., "Discontinuous Reception and Transmission (DRX/DTX) Strategies in Long Term Evolution (LTE) For Voice-Over-IP (VOIP) Traffic under both Full-Dynamic and Semi-Persistent Packet Scheduling Policies", Nokia Siemens Networks, Alborg University Denmark, Nov. 20, 2009, 123 pages.

\* cited by examiner

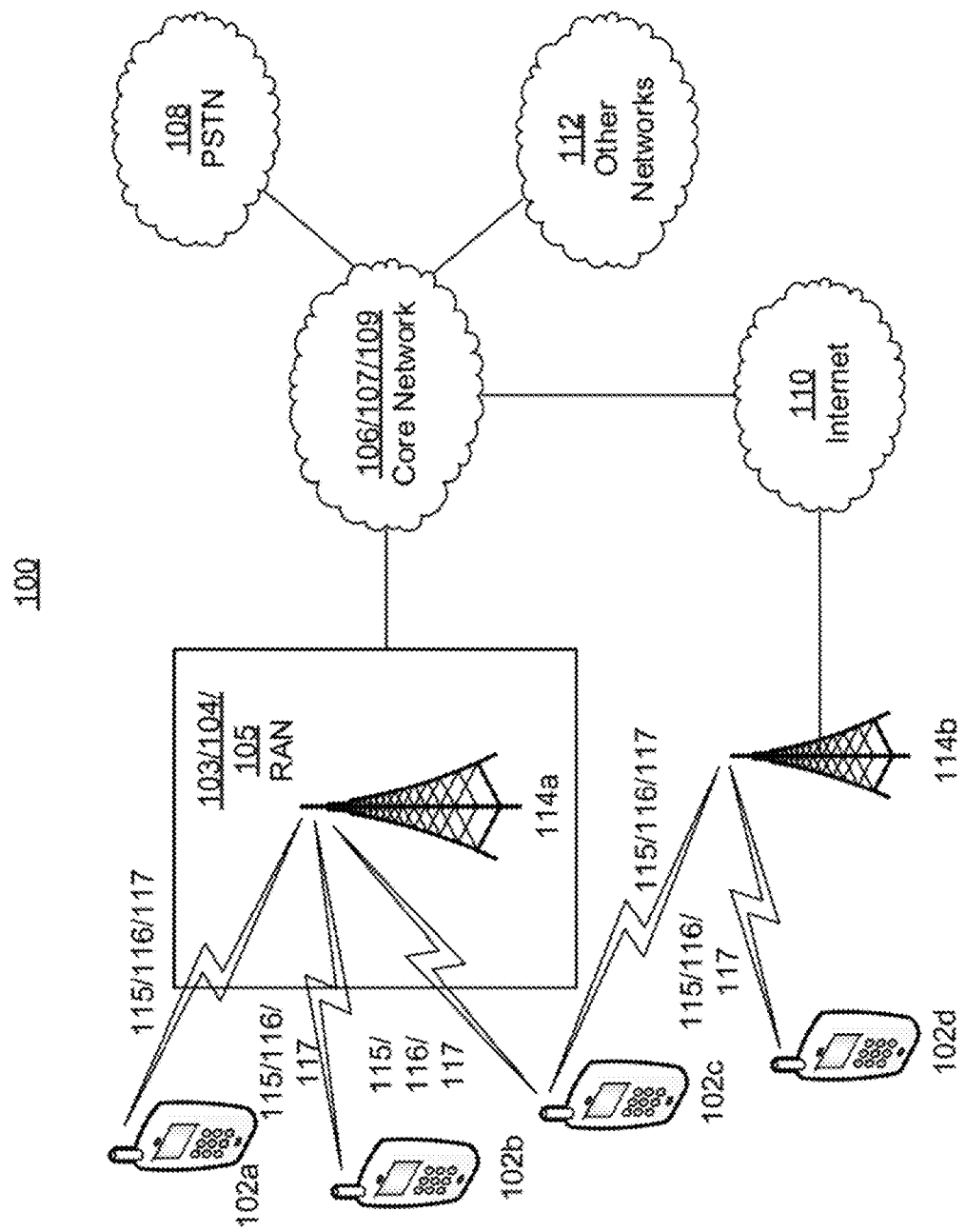

3GPP MMW ACCESS LINK SYSTEM ARCHITECTURE

CROSS-REFERENCE TO RELATED APPLICATION

This application is a continuation application of U.S. application Ser. No. 15/111,867, filed Jul. 15, 2016, which is the National Stage Entry under 35 U.S.C. § 371 of Patent Cooperation Treaty Application No. PCT/US2015/011707, filed Jan. 16, 2015, which claims the benefit of U.S. Provisional Patent Application No. 61/928,860 filed on Jan. 17, 2014, the contents of which are hereby incorporated by reference herein.

BACKGROUND

Increased demand for mobile data has led to the use of smaller cells. Small cells may imply an increased spatial reuse of the same spectrum and may be a simple way to achieve higher capacity. Using low-power nodes may be a way to cope with an increase in mobile traffic, for example, for hotspot deployments in indoor and outdoor scenarios. A low-power node may be a node whose transmit power may be lower than a macro node or a base station (BS), e.g., pico or femto eNBs.

Increased demand for mobile data has also led to the use of additional spectrum, e.g., 3.5 GHz and higher frequencies. Large bandwidth channels may be available in high frequency carriers. With higher frequencies, a synergistic effect may be exploited, and spatial reuse may be increased relative to lower frequencies. Directional antennas (e.g., in wireless HD devices) may be used to close the link budget for millimeter wave (mmW) systems. Large bandwidth channels may make transmissions contained in that transmitted energy may be concentrated on the intended receiver (e.g., increasing signal strength) while radiating little in other directions, decreasing the likelihood of interference for unintended receivers. This may reduce the need for complicated inter-cell interference mitigation.

High frequency carriers (e.g., in the mmW spectrum) may have large amounts of available spectrum, possibly with affordable terms. The 60 GHz spectrum is about 7 GHz (e.g., depending on country), and more spectrum may become available as licensed, lightly licensed, or unlicensed spectrum.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and instrumentalities are disclosed that are associated with millimeter wave (mmW) measurements. A mmW capable wireless transmit/receive unit WTRU may send a measurement gap request message associated with a mmW measurement. For example, the WTRU may send the measurement gap request message to a mmW base station. The measurement gap request message may include a measurement gap requirement (e.g., a request to add/remove/modify a measurement gap pattern ID, a gap length, a gap repetition period, a gap repetition period, or a gap purpose). The WTRU may receive a first measurement gap pattern and a second measurement gap pattern (e.g., from the mmW base station). The first measurement gap pattern may be associated with a first activity and the second measurement gap pattern may be associated with a second activity. For example, the first activity may include a mmW measurement associated with a mmW serving cell (e.g., a wide beam and/or narrow beam measurement of the mmW serving cell) and the second activity may include a mmW measurement associated with a first mmW neighbor cell (e.g., a wide beam and/or narrow beam measurement of the first mmW neighbor cell). The first measurement gap pattern and the second measurement gap pattern may occur in a time period (e.g., may be interleaved in a time period). For example, the first measurement gap pattern may be associated with a first subframe pattern in a time period and the second measurement gap pattern may be associated with a second subframe pattern in the time period. The WTRU may perform respective measurements associated with the respective measurement gap patterns. For example, the WTRU may perform a measurement associated with a mmW serving cell in accordance with the first measurement gap pattern, and, a measurement associated with a first mmW neighbor cell in accordance with the second measurement gap pattern.

The measurement gap requirement may be based on at least one of a capability associated with the WTRU or a measurement status associated with the WTRU. Example capabilities associated with the WTRU may include one or more of: a number of beams supported by the WTRU, a number of phase antenna arrays supported by the WTRU, or a number of simultaneous receive beams supported by the WTRU. A mmW network entity, such as a mmW base station, may use the measurement gap requirement to determine the first measurement gap pattern and/or the second measurement gap pattern. Each measurement gap pattern may be associated with respective configuration parameters. Example configuration parameters may include one or more of: a measurement gap pattern ID, a gap length, a gap repetition period, a gap repetition period, or a gap purpose, where a gap purpose may be related to an activity associated with a gap pattern.

A mmW network entity, such as a mmW base station, may send the measurement gap patterns to the WTRU, e.g., using a DCI, MAC control element, RRC signaling, etc.). For example, the mmW network entity may send a measurement gap pattern to the WTRU in a DCI associated with a control channel. The WTRU may decode the DCI to receive a measurement gap pattern. The WTRU may be assigned a measurement RNTI. The WTRU may use the measurement RNTI to determine a measurement gap pattern meant for the WTRU in the DCI.

BRIEF DESCRIPTION OF THE DRAWINGS

FIG. 1A is a system diagram of an example communications system in which one or more disclosed embodiments may be implemented.

DETAILED DESCRIPTION

Figure 1B:
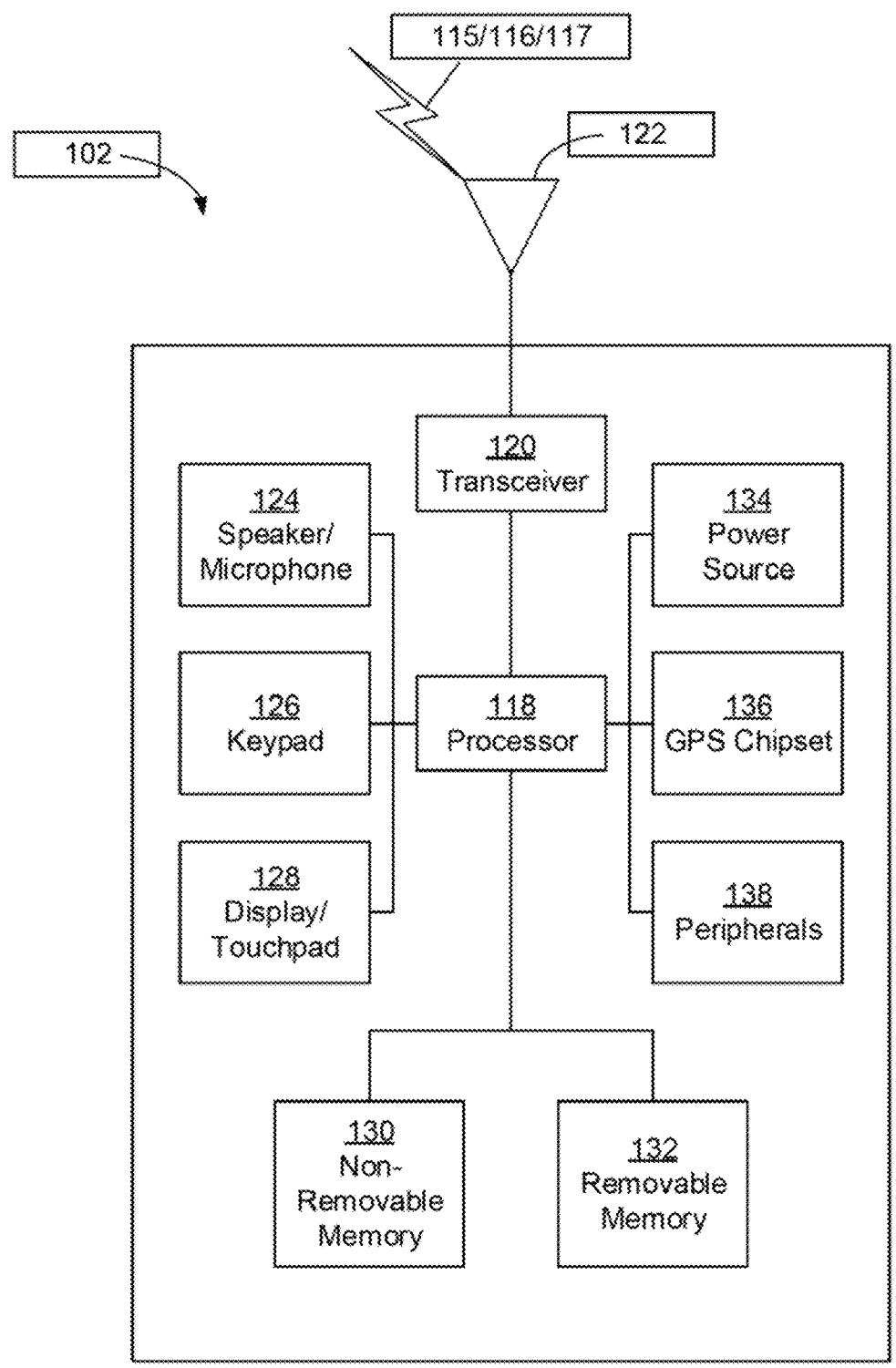
FIG. 1B is a system diagram of an example wireless transmit/receive unit (WTRU) that may be used within the communications system illustrated in FIG. 1A.

A detailed description of illustrative embodiments will now be described with reference to the various Figures. Although this description provides a detailed example of possible implementations, it should be noted that the details are intended to be exemplary and in no way limit the scope of the application.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b. 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth, module, a frequency modulated (FM) radio unit, a digital music player, a media player, a video game player module, an Internet browser, and the like.

Figure 1C:
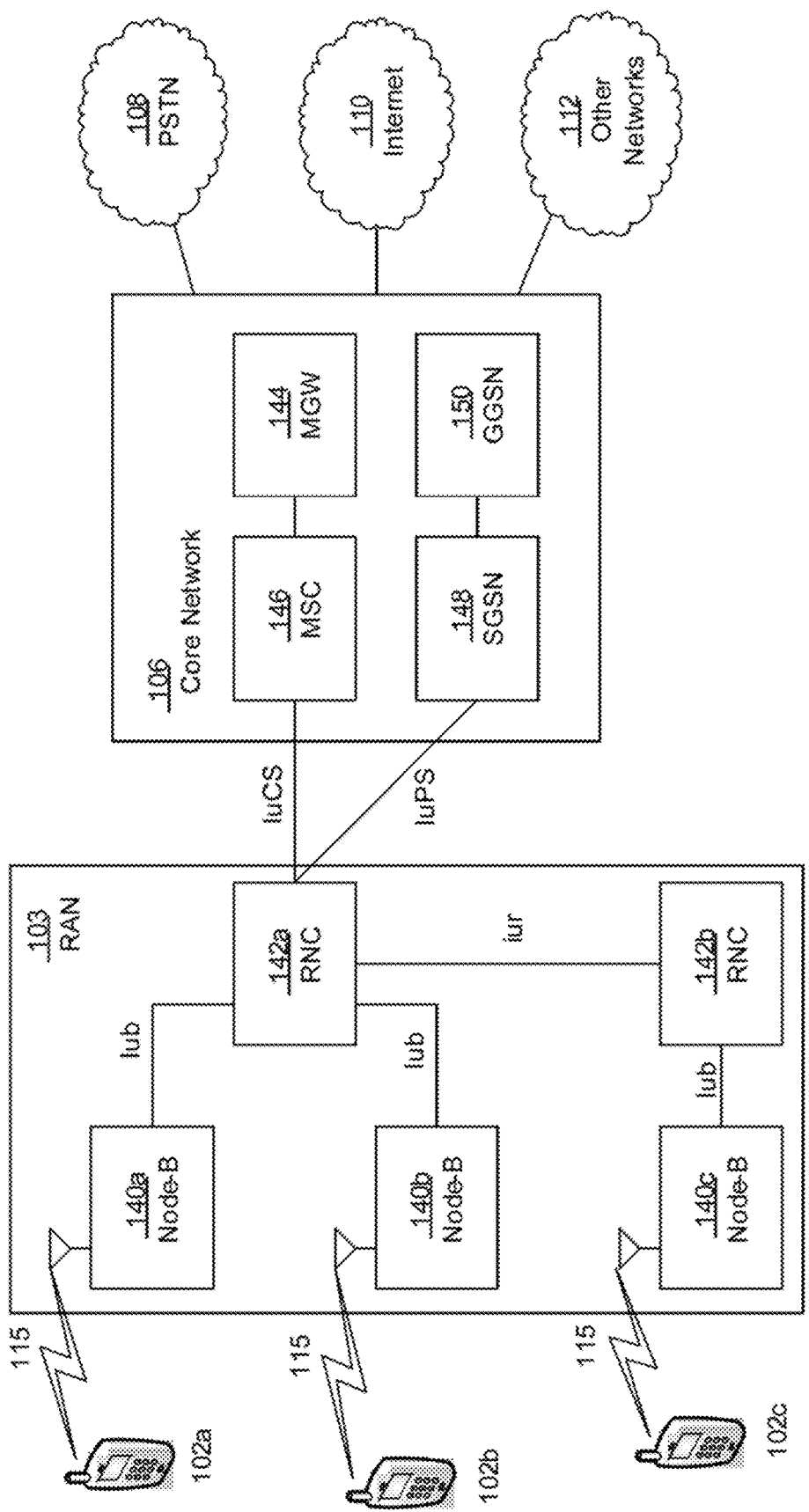
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
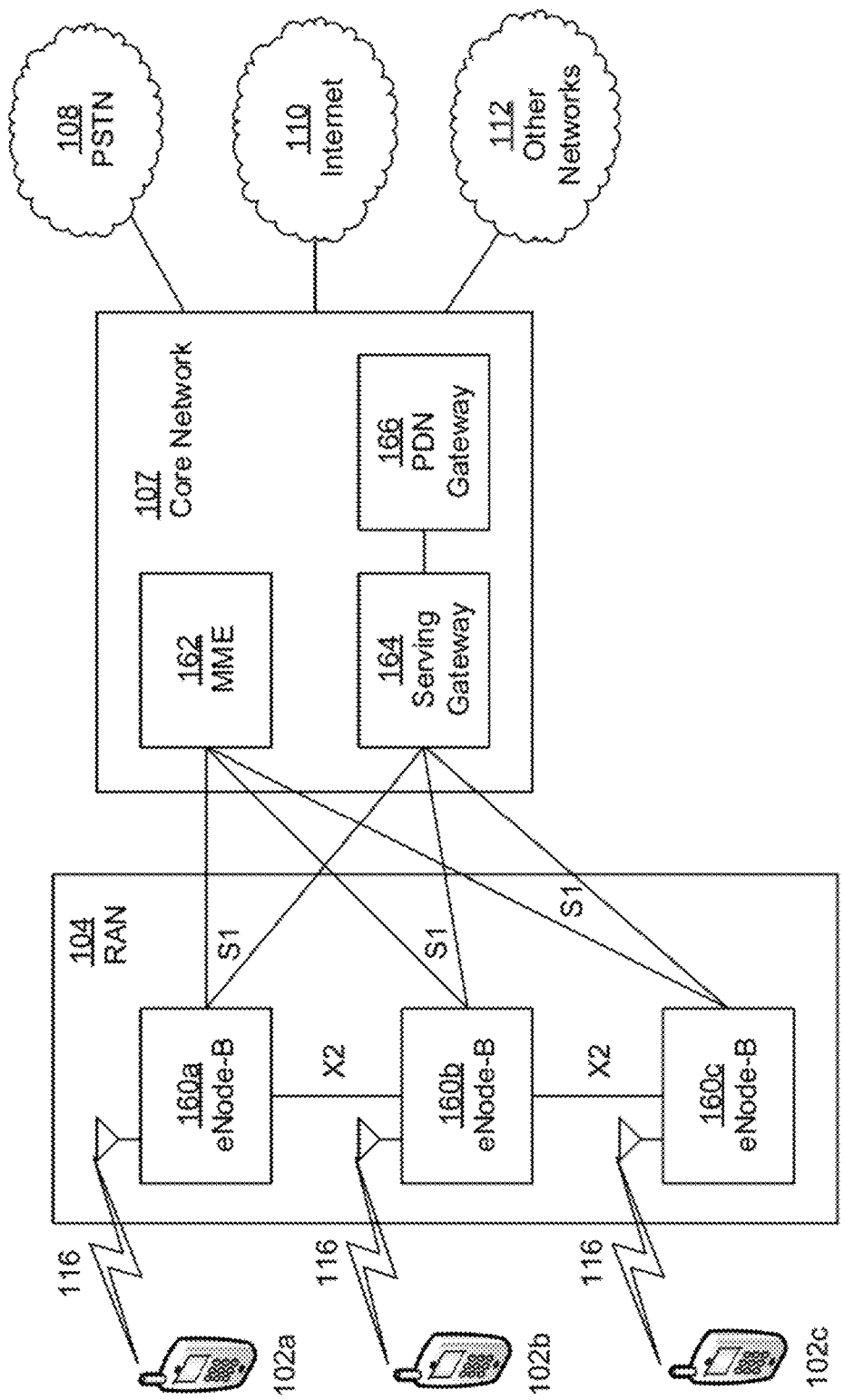
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
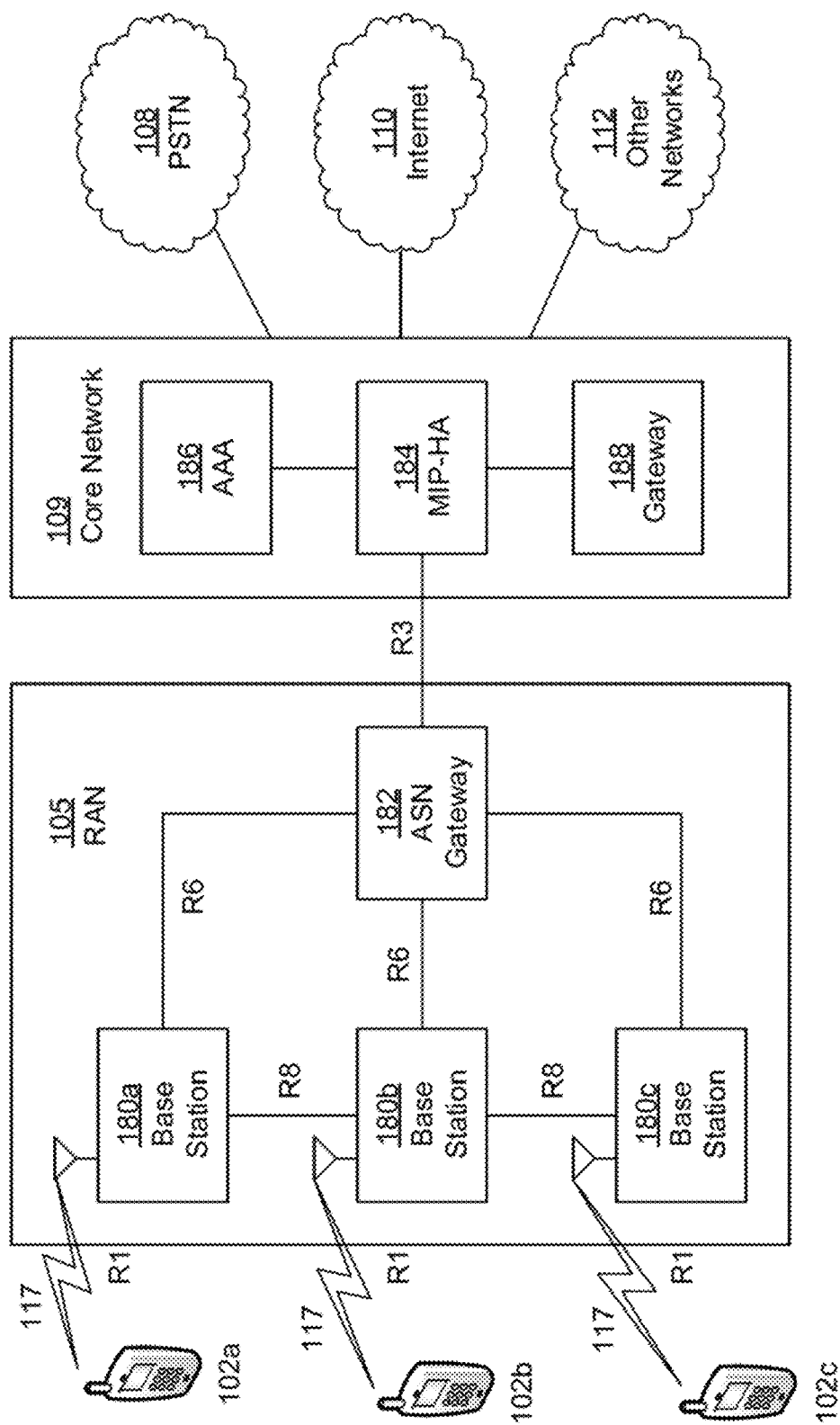
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a. 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The mmW Hotspot (mmH) architecture may be driven by the use of small cells and the use of mmW carrier frequencies. These two drivers may be compatible and/or complimentary. The mmH architecture may include small mmW basestations that may be overlaid on a cellular network. The mmW basestations may be denser than macro eNBs and self-backhaul using a mmW MESH network to the macro eNB (or other wired/wireless aggregation point). Phased array antennas may close the links due to limited available transmit power and may provide a low interference environment, possibly enabling a flexible backhaul architecture. These phased array antennas may create narrow steerable beams that may provide backhaul links rather than additionally deploying a wired backhaul. The beams may be narrow and steerable. The beams may enable an adaptable MESH backhaul with pseudo-wired low interference connections between backhaul links. The beams may enable nodes to self-configure and join the MESH as they are installed. P2P links may not need to be pre-planned, unlike fixed beam mmW links in many cases.

The large bandwidth available at mmW frequencies may provide capacity improvement for user-specific data transmission. The required narrow beam pattern may pose challenges for a standalone mmW-only eNB solution, e.g., in delivering cell-specific/broadcast information. An mmW system may incorporate downlink-only mmW data transmission into a small cell LTE network. An mmW system may include a standalone mmW eNB.

An mmW Small Cell mmW eNB (SCmB) deployment may be based on a 3GPP R12 small cell deployment. The mmW operation may be performed by two network nodes.

A Small Cell mmW eNB (SCmB) may be an LTE small cell eNB capable of operating an mmW air interface in parallel with the LTE air interface in the downlink. An SCmB may be equipped with an antenna configuration and associated beam forming to simultaneously transmit LTE channels in a wide beam pattern and mmW channels in a narrow beam pattern. To support WTRUs without mmW transmitters, the SCmB may support a mode where the uplink operates the LTE air interface (e.g., only the LTE air interface).

An mmW WTRU (mWTRU) may be an LTE WTRU capable of operating an mmW downlink air interface in parallel with the LTE air interface in the downlink. A WTRU may be a UE, as previously described, and the terms are used interchangeably throughout. The mWTRU may have two sets of antennas and the associated RF chains, one operating on the LTE band and the other in mmW frequency band. There may be two independent baseband processing functions. The two baseband functions may share certain blocks if the mmW air interface bears similarity with the LTE system. The mmW hardware and software may be implemented as a receiver.

The term mmW layer and small-cell layer may be used interchangeably herein. The terms mmW base-station (mB), SCmB and small-cell eNB (SCeNB) may be used interchangeably herein.

The add-on mmW channels may be an extension of carrier aggregation where a carrier type is in the mmW frequency band but applies a different air interface. The mmW channels may apply for high-throughput or low-latency traffic data application. Control signaling, including system information update, paging, RRC and NAS signaling (signaling radio bearers), and multicast traffic may be carried in LTE channels. In addition, certain mmW control signaling may use LTE channels.

Figure 2:
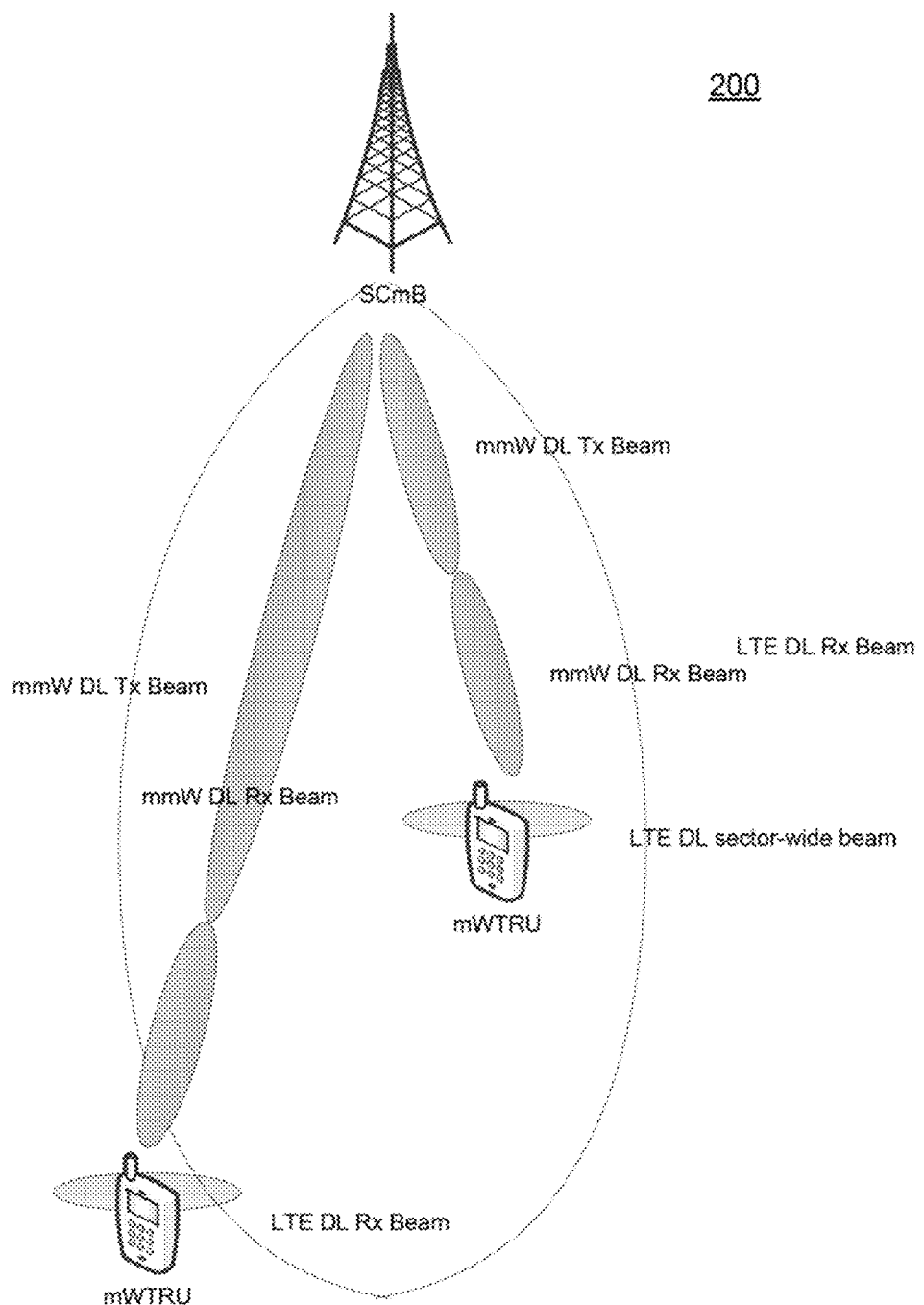
FIG. 2 is a diagram illustrating an example millimeter wave (mmW) downlink.

FIG. 2 illustrates an example mmW downlink 200. As shown due to propagation loss, for example in NLOS at mmW frequency band, SCmB and mWTRU may employ narrow beam forming in both transmit and receive directions, e.g., to ensure satisfactory link budget for high-throughput and low-latency traffic data. An outage study conducted at 28 GHz and 38 GHz in urban area using steerable 10° beam 24.5 dBi horn antenna at both transmitter and receiver showed that a consistent coverage may be achieved with a cell-radius of 200 meters when such antennas are used.

The SCmB and mWTRU may employ a wider beam pattern for LTE operation including cell search, random access, cell selection/reselection, etc. An omnidirectional radiation pattern with an antenna gain of 0 dBi may be used in simulation and development of LTE technologies, including 3D beamforming.

Figure 3:
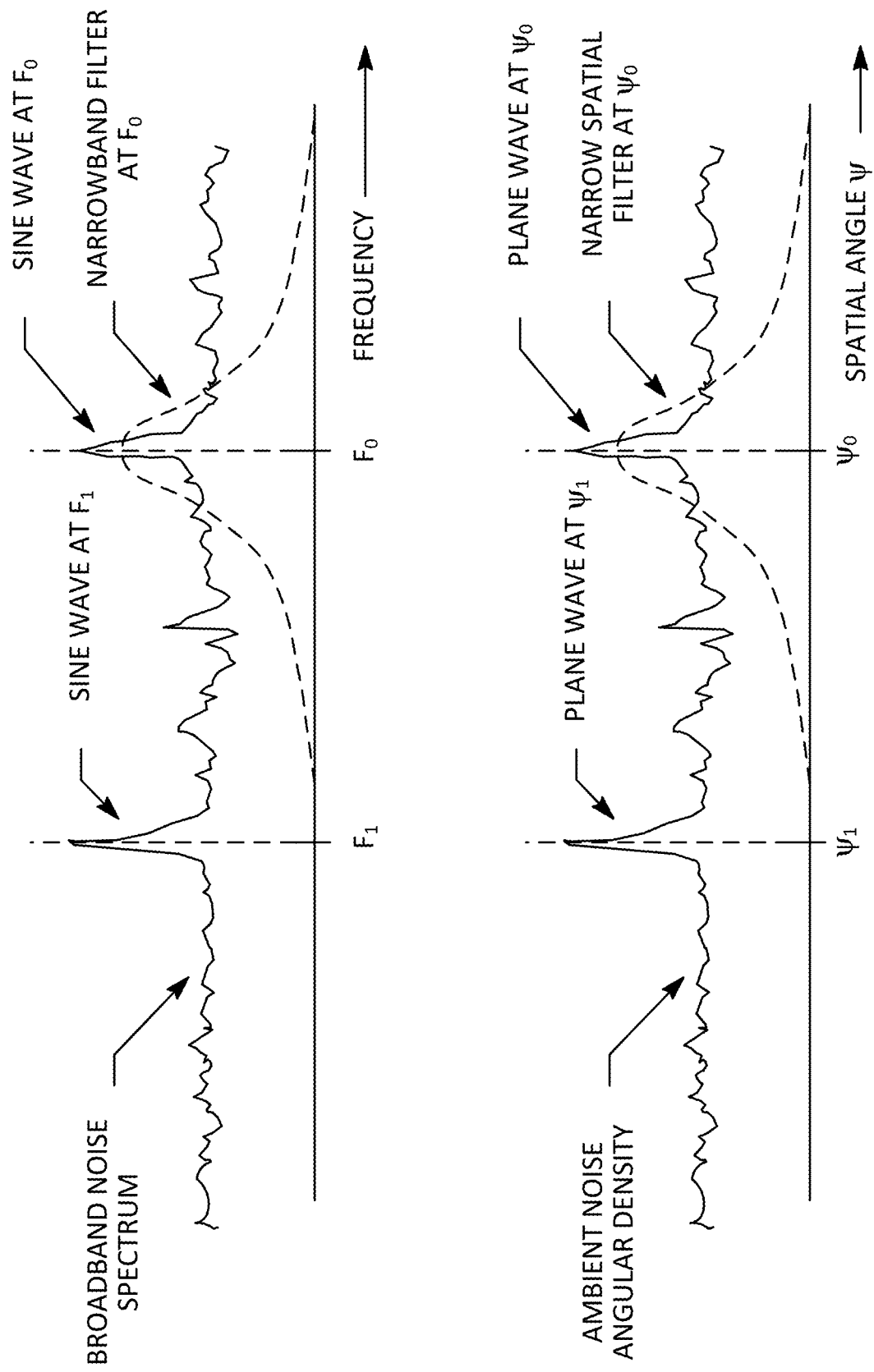
FIG. 3 is a diagram illustrating examples of frequency and spatial filtering.

An mmW system may identify and mitigate the impact of the directivity in both mmW transmit and receive beam patterns using, for example, mmW physical layer control signaling, physical layer data scheduling, beam/channel measurement and feedback, transmit and receive beam alignment, and other procedures. The receive beam forming may perform a narrow spatial filtering as shown in FIG. 3 so that a mWTRU only sees a channel impulse response in a specific spatial direction. A WTRU may have an omnidirectional receive beam pattern and may perceive a superimposed channel impulse response over the angular domain.

FIG. 3 is a diagram 300 of examples of frequency domain filtering and spatial/angular domain filtering. An aligned transmit/receive beam may provide an extra degree of freedom in the angular domain and may afford the mmW layer a greater degree of spatial separation relative to an LTE system. This may be a result of the both the propagation of mmW and the large number of antenna elements that may be included in an mmW antenna. For example, the spatial filtering may result in an effective channel that is relatively flat by excluding paths outside of its beam width.

The mmW system may be deployed as a downlink (DL) system (e.g., a DL-only system) assisted by a collocated LTE carrier in the base station and dual LTE+mmW capable WTRU. The operator may have a Rel.12-complaint small cell eNB deployment.

Figure 4:
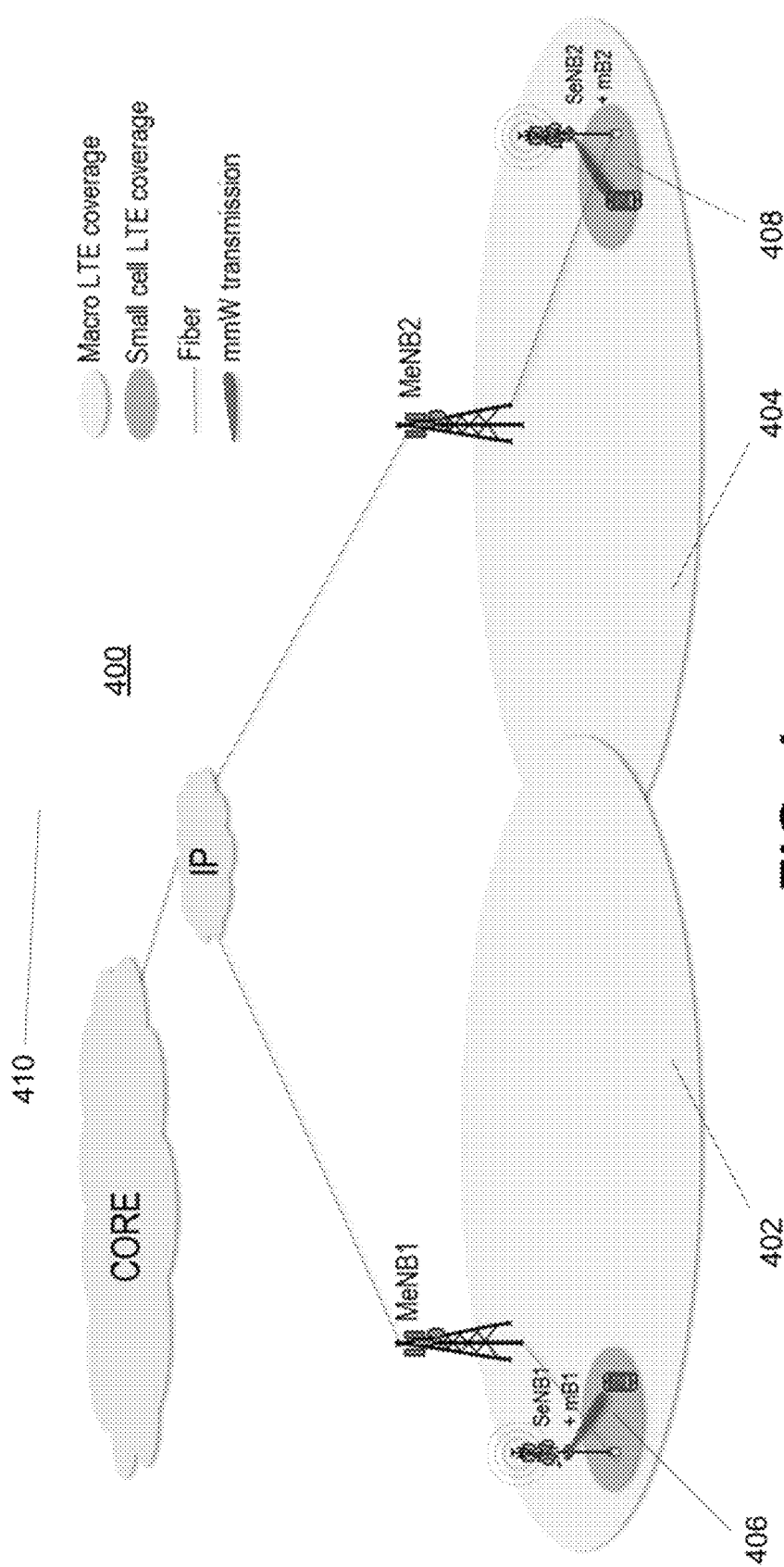
FIG. 4 is a diagram illustrating an example mmW system.

FIG. 4 illustrates an example mmW system 400 including macro cells 402, 404 and small cells 406, 408. A WTRU may have two links simultaneously, e.g., one to a small cell and another to a macro eNB. A macro eNB may terminate S1-MME; the macro eNB may be seen as the mobility anchor towards a core network (CN) 410. A control plane and a user plane may be separated, and the control plane may be located in the in the macro (L2 transport may be via small cell). Macro eNBs and small cell eNBs may be connected by a backhaul (e.g., 5 ms-60 ms, 10 Mbps to 10 Gbps). The backhaul may be a non-ideal backhaul.

The small cell eNB may use an mmW carrier to enable the operator to satisfy capacity demand at the hotspot. This may be referred to as a collocated mmW+LTE small cell. The mmW carrier may provide downlink capability, for example, to keep the WTRU prices low and to provide an evolutionary path to a 3GPP mmW system.

In the absence of mmW uplink (UL) capability, the WTRU may use an LTE UL carrier for the mmW feedback. These UL transmissions may reuse Rel.12 UL channels or channels that may be defined to carry mmW feedback, or both. The backhaul between the small cell and the macro eNB may be non-ideal. To support some user plane options, the small cell may have a direct S1-U interface to the core network. The core network may be transparent to the addition of mmW carrier to the small cell and the impact may be limited to increased backhaul capacity requirements on the S1 interface and OAM features to support a radio interface.

Additional small cells may provide uniform quality of experience (QoE) for users. A WTRU may support mmW uplink capability. Small cells may have mmW uplink capability, while maintaining backward compatibility to WTRUs that may be limited to mmW downlink capability. DL/UL mmW capable small cell eNBs may be deployed in a standalone fashion, e.g., without assistance from a collocated LTE carrier. Macro LTE coverage may provide mobility robustness to WTRUs connecting to mmW small cell base stations.

Figure 5:
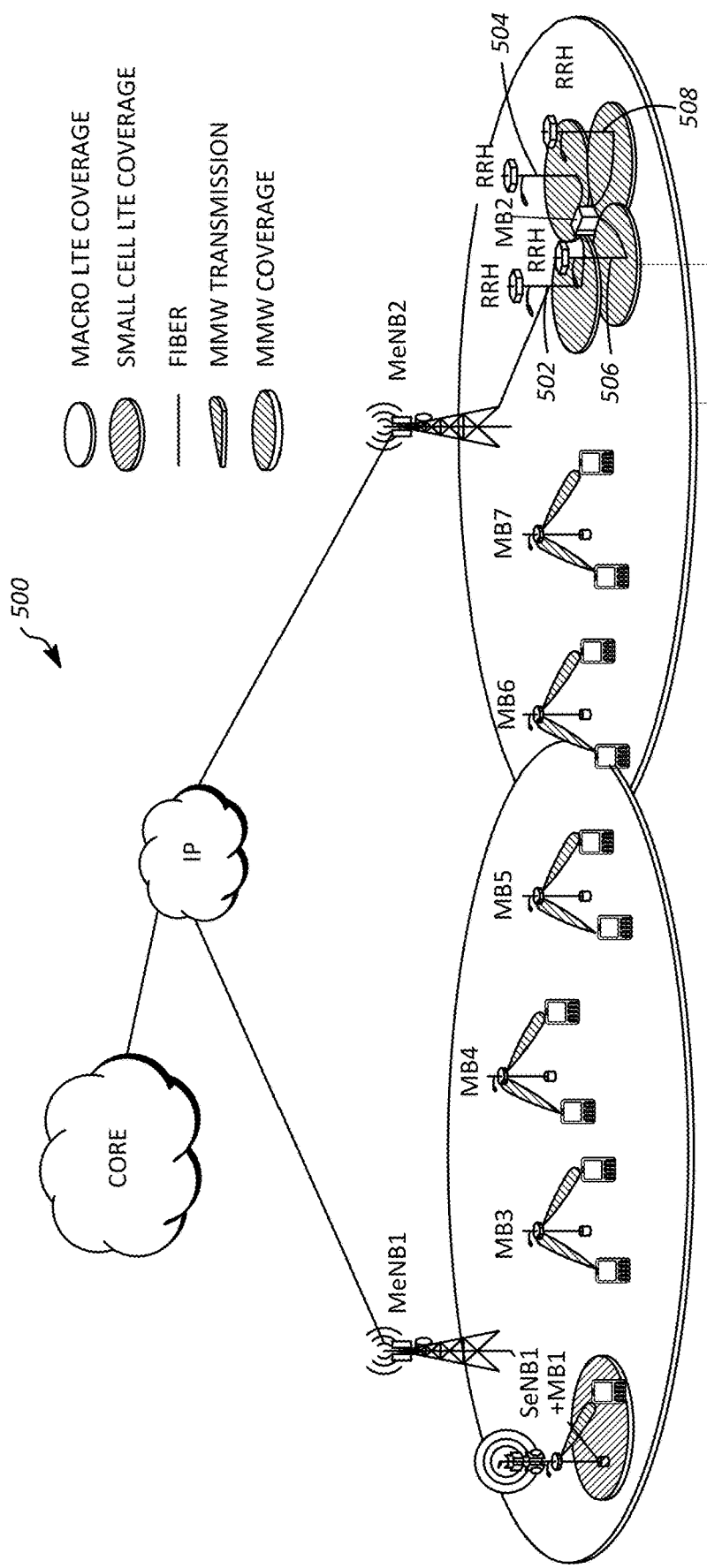
FIG. 5 is a diagram illustrating an example mmW system.

FIG. 5 is an example diagram 500 of an mmW system. A Remote Radio Head (RRH) type deployment may be implemented. A base station mB2 may centrally control multiple mmW RRHs 502, 504, 506, 508. A macro eNB may be shielded from the small cell model by providing a consistent interface. A macro eNB (such as, for example, MeNB2) may consider mB2 as a single mmW base station.

With a dense deployment of mmW small cells, the load on the macro eNB may be high. An aggregator node may concentrate the user plane data from multiple small cell eNBs.

Figure 6:
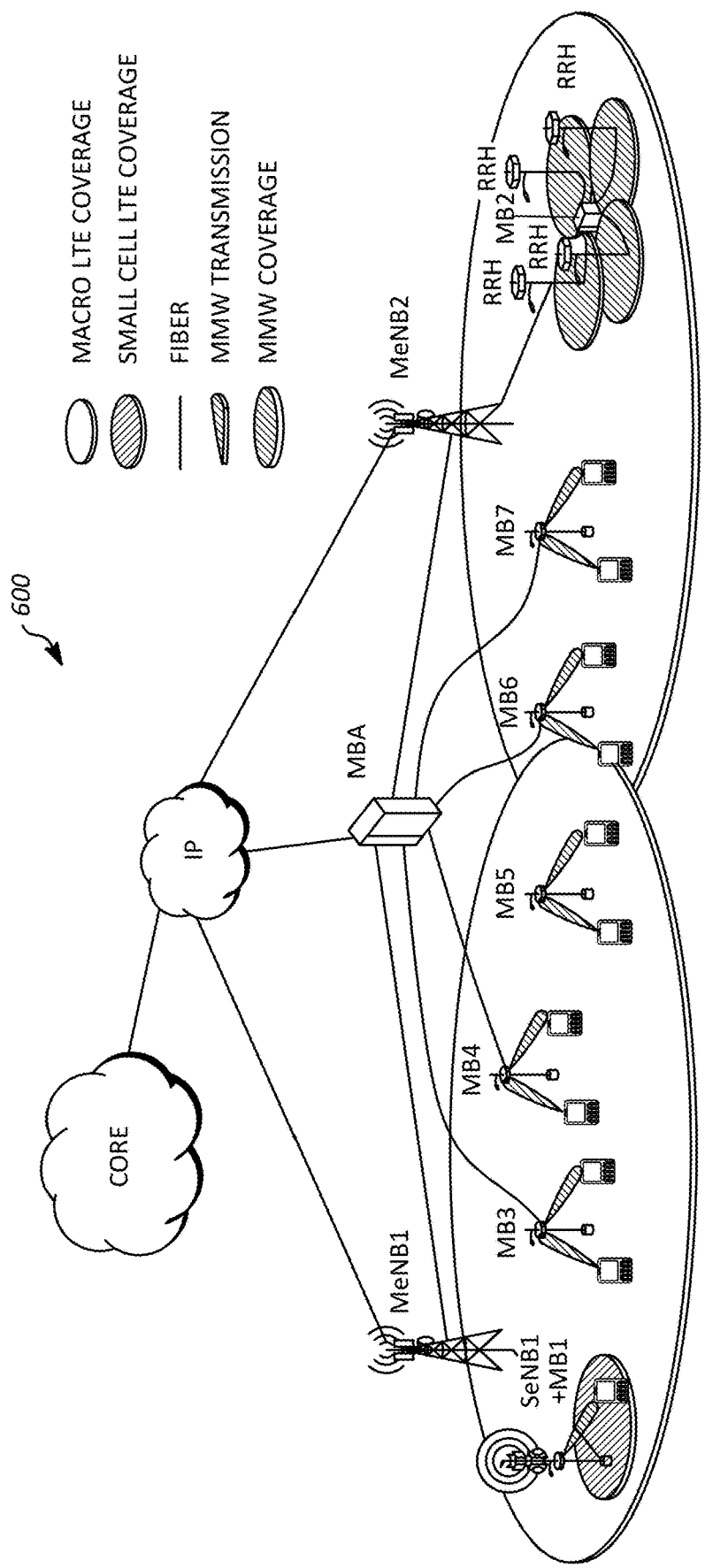
FIG. 6 is a diagram illustrating an example mmW system employing mmW basestations (mBs) and an mB aggregator.

FIG. 6 is a diagram 600 of an mmW architecture with a number of mmW small cells (mB1, mB2, mB3, mB4, mB5, mB6, and mB7). An mB aggregator (mBA) may provide a consistent interface to the core network (similar to S1-U). The Xn interface from the macro eNB may terminate at the mB aggregator. The logical mB aggregator functionality may be performed physically in a cloud infrastructure.

This architecture may also lend itself to small cell sharing between macro eNBs. As shown in FIG. 6, MeNBs MeNB1 and MeNB2 may share base stations mB5 and mB6. Such a shared small cells deployment may also help in the handover between macro eNBs. For example, the base station mB5 may anchor the radio bearers when the WTRU is handing over from MeNB1 to MeNB2.

When the mB density is high, it may not be cost-effective to pull fiber to each of the small cell locations. The backhaul may use mmW technology and reuse access link components that may be available at the small cell base stations.

Figure 7:
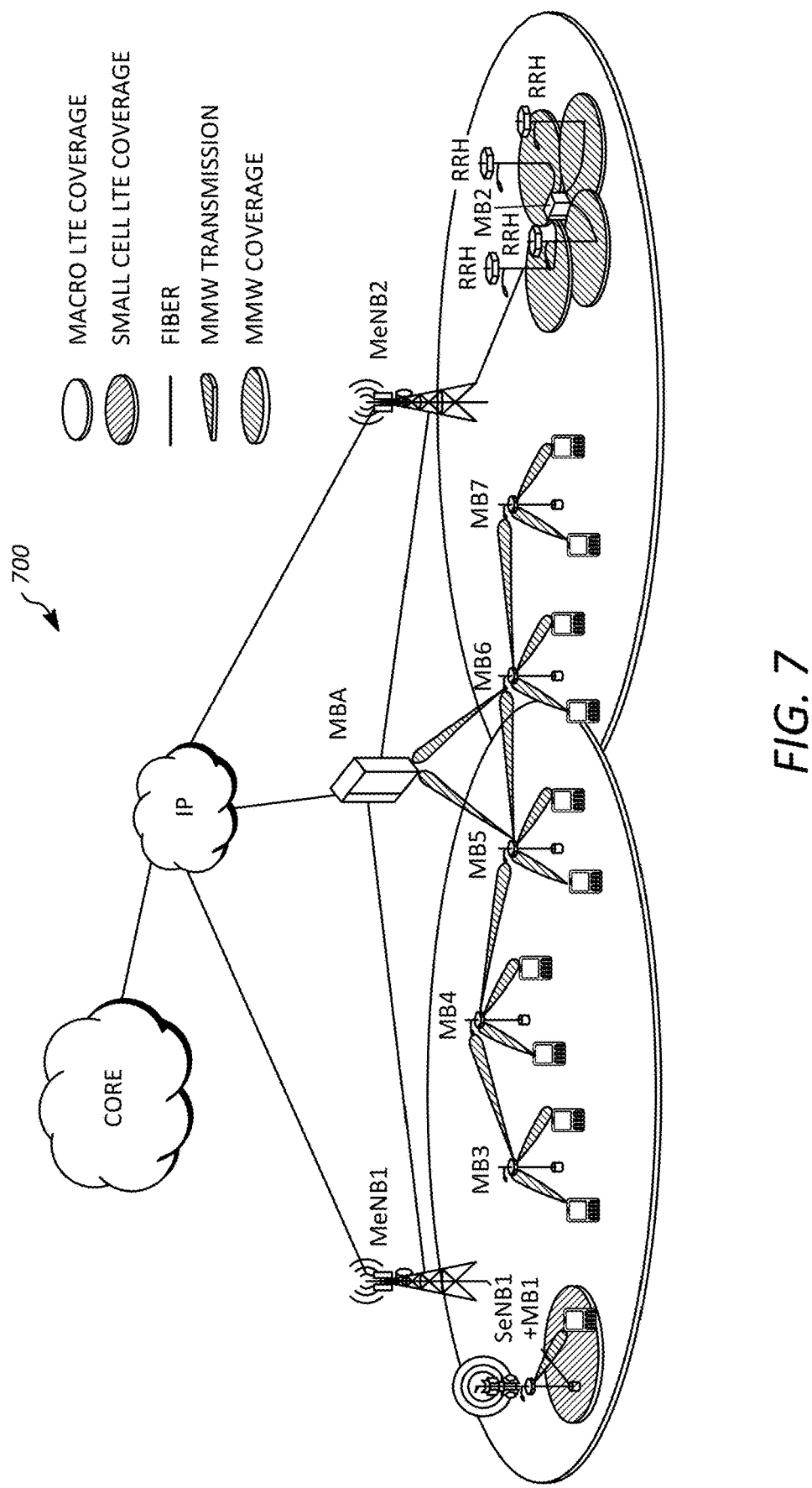
FIG. 7 is a diagram illustrating an example mmW system.

FIG. 7 is a diagram 700 of a mmW system with joint access and backhaul. The same mmW radio interface may be used for access and backhaul. The access and backhaul links may be time division multiplexed. Due to the directional nature of mmW transmissions, the access and backhaul may use directional full duplex. A 3GPP relay interface, e.g., Un, may support backhaul features, such as meshing, routing, joint access and backhaul, interference management, access aware backhaul, etc. The backhaul may include SON aspects of how to form the mesh, scheduling, etc. Such architecture may enable plug and play of small cells.

Small cell deployment planning may present a challenge. Operators may make planning decisions based on capacity and not coverage as done in macro planning. Due to increasing capacity requirements and the directional nature of mmW transmissions, there may be an overlap in the mmW small cell coverage.

Figure 8:
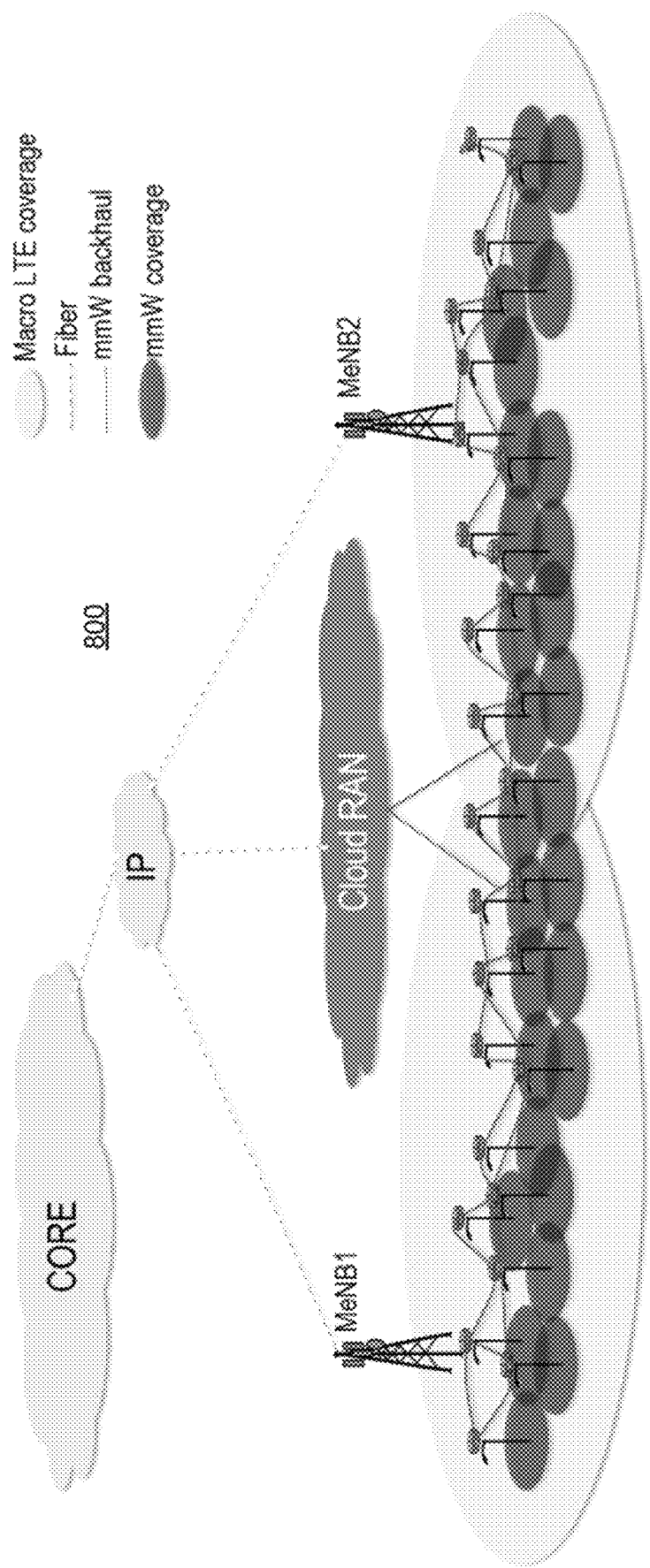
FIG. 8 is a diagram illustrating an example mmW cloud-based radio access network (RAN).

FIG. 8 is a diagram 800 illustrating an example mmW cloud-based radio access network (RAN). As shown in FIG. 8, some processing (e.g., for the data plane) may be moved to a centralized node. For example, base band processing may be moved to an mmW RAN cloud. Such an mmW cloud deployment may bring significant cost savings to the operator due to centralized processing, collaborative radio processing, and availability of cheap commodity hardware. An mmW small cell cloud may have a fronthaul requirement, which may be addressed by a compressed CPRI interface, CPRI friendly access link changes, and the like.

Figure 9:
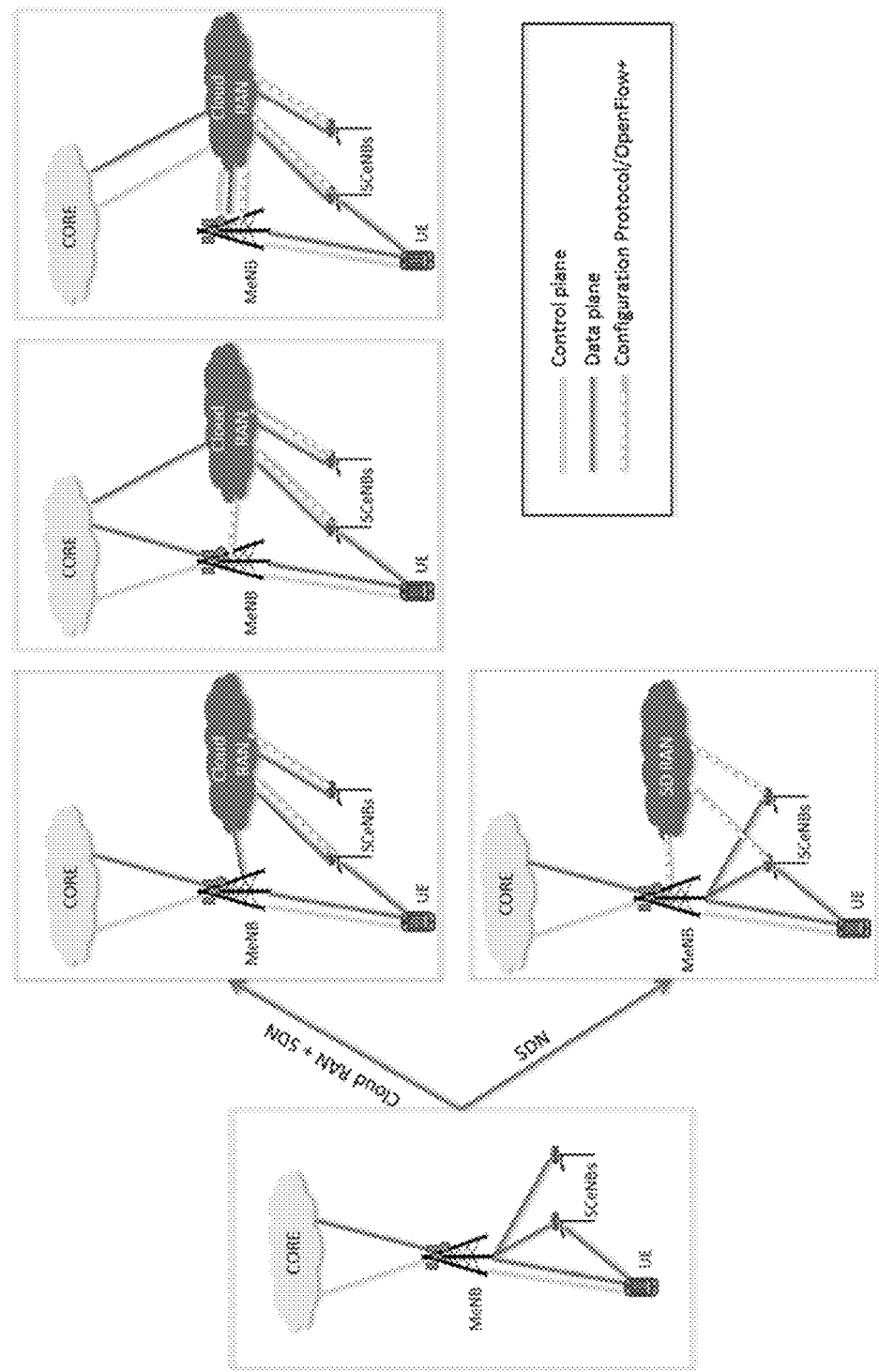
FIG. 9 is a diagram illustrating an example software-defined mmW RAN.

FIG. 9 illustrates an example software-defined mmW RAN 900. A software-defined mmW RAN (SDRAN) may be employed. An mmW SDRAN may enable small cell infrastructure sharing between eNBs and among operators. This may bring down the cost of small cell deployment, as both the access and backhaul may be shared. SDN may bring in some degree of centralized control and unified management for the mmW small cell layer.

Control and management of small cell layers may be performed in a centralized entity, similar to an SDN controller that may interface with the small cells with an API (e.g., a standardized southbound API), e.g., Openflow. A protocol may capture abstractions relevant to wireless links. A macro eNB may interface with the centralized controller with an east/west API or the macro eNB may interface with the northbound API. The controller may expose an application interface to the wireless NOX. Some of the data plane operation in the small cell may be moved to the cloud infrastructure. The amount of functionality performed in the cloud may be dynamically determined by the backhaul capacity available to the small cells. The S1-U may terminate in the macro eNB. The macro eNB may be removed from the data path. Some of the macro processing or control may be moved to the cloud.

Figure 10:
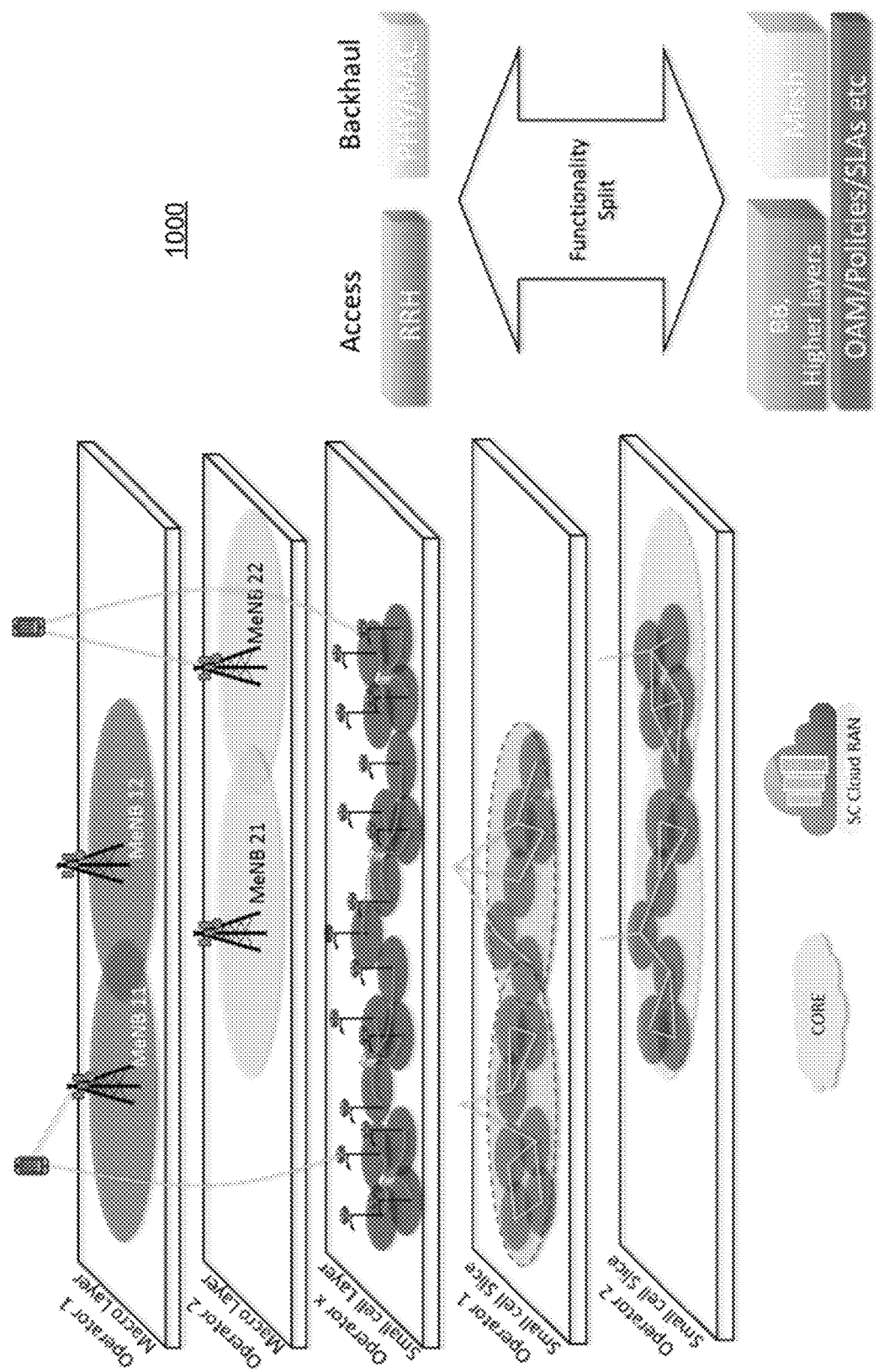
FIG. 10 is a diagram illustrating an example mmW small cell as a service.

FIG. 10 a diagram 1000 illustrating an example of an mmW small cell infrastructure that may be provided as a service. For example, a third party operator may deploy a mmW small cell network. The third party operator may not have the infrastructure or spectrum to layout the macro network. There may be multiple macro operators willing to share the small cell network provided by the third party operator. The macro operators may enjoy reduced capital expenditure to deploy small cell infrastructure and associated backhaul. The small cell operator may also gain revenue by leasing the small cell infrastructure and may share the same small cell infrastructure. This may be advantageous for both the macro operators and the small cell operator. With a software-defined mmW small cell as a service, a macro operator may configure and manage the underlying small cell infrastructure as a dedicated logical network, and the SDN framework may provide sandboxing between inter-operator domains. FIG. 10 illustrates how the macro operators 1 and 2 may share the physical small cell infrastructure owned by operator X and how the SDN framework may divide the small cell network into multiple logical access and backhaul infrastructures.

One or more of the following may apply for an mmW system. An mmW system may operate with a carrier frequency of, for example, 28 GHz, 38 GHz, 60 GHz, or other frequency values. The system bandwidth may be variable, e.g., up to 1 GHz. The mmW may have an estimated RMS delay spread of, e.g., 100-200 ns with a narrow beam pattern. Latency may be less than 1 ms MAC RTT. The mmW system may use an OFDM-based or broadband single carrier-based waveform. Connectivity may use an LTE small cell eNB with mmW add-on channels and two separate RF chains that may be connected to two different antennas. Downlink data rates may be at least 30 megabits/second for at least 95% of WTRUs. The mmW system may be able to support an optimized data connection at a mobility of 3 km/h and may be able to maintain a data connection at a mobility of 30 km/h. The mmW system may be able to meet data rate and mobility criteria with less than 100 m cell radius. The mmW system may use a non-ideal macro-small cell backhaul. Handover interruption times may be less than 10 ms.

Candidates for the mmW air interface may include broadband Cyclic Prefixed Single Carrier (CP-SC), OFDM, SC-OFDM, and MC-CDMA. PAPR performance, sensitivity to transmitter non-linearity, bit error rate (BER) performance with different equalization schemes (ZF-DFE or FD-LE), resource channelization, multiple access schemes, and implementation complexity of each candidate may be considered, for example, using a simulation based on mmW channel modeling.

The single carrier waveform may have good PAPR properties compared to OFDM, but may lack the ability to schedule resources dynamically in the frequency domain and may be more difficult to channelize. The narrow beams of the mmW antennas may limit the ability to do frequency domain scheduling. A simulation with accurate mmW channel modeling may be used for evaluation.

The OFDM waveform may be practical. The SCmB may operate both LTE and mmW air interfaces, and a similar waveform may facilitate functional block sharing between these two implementations, e.g., clock distribution and FFT block. While the mmW waveform may be OFDM-based, a single carrier waveform may be used.

To provide more flexibility in coordination between the LTE and mmW channels and possibly enable common functional block sharing in one mWTRU device, the mmW sampling frequency may be an integer multiple of an LTE sampling frequency of 1.92 MHz. An mmW OFDM system may adopt a sub-carrier spacing $\Delta f$ that is an integer multiple of the LTE sub-carrier spacing of 15 kHz, e.g., $\Delta f=15*K$ kHz. The selection of the integer multiple K and the resulting $\Delta f$ may balance between the sensitivity to the Doppler shift and different types of frequency errors and the ability to remove channel time dispersion.

The orthogonality between sub-carriers may deteriorate and inter-sub-carrier interference may increase when the Doppler shift increases in proportion to the sub-carrier spacing.

As the mmW downlink data link approaches 30 km/h, the maximum Doppler shift at 28 GHz may be 778 Hz. The RMS delay spread $\sigma$ may be between 100 and 200 ns. The 90% coherence bandwidth may be estimated at, e.g., $1/5\sigma$ 100 kHz and the 50% coherence bandwidth at, e.g., $1/5\sigma$ 1 MHz. A sub-carrier spacing between 100 kHz and 1 MHz may be reasonable. One example $\Delta f$ may be 300 kHz, e.g., K=20. The wide sub-carrier spacing may be robust against Doppler shift and other types of frequency error, which may reduce the implementation difficulty.

The symbol length of the OFDM system may be $1/\Delta f$. In the example of 300 kHz, the symbol length may be 3.33 μs. The CP length may cover the entire length of the channel time dispersion to eliminate the inter-symbol-interference, but the CP may carry the cost of additional power and reduced data rate, e.g., a system overhead. If the $T_{symbol}$ is 3.33 μs, the CP length $T_{CP}$ may be selected at 1/14 of $T_{symbol}$, e.g., 0.24 μs, and the corresponding CP overhead may be 7% as calculated by $T_{CP}/(T_{CP}+T_{symbol})$.

The TTI length of the mmW Downlink Data Enhancement may be reduced compared to the 1-ms TTI length of an LTE system, e.g., in order to achieve low latency. The mmW downlink may have a sub-frame length of 1 ms and may line up with the LTE 1-ms sub-frame timing. The mmW sub-frame may comprise multiple TTIs, and the TTI length is closely tied to other frame structure parameters, such as sub-carrier spacing, symbol length, CP length, FFT size, etc. An example with a conservative CP (e.g., 4× channel delay spread) is summarized in Table 1 below. The CP length selection may be based on the assumption that the delay spread over mmW frequencies is lower than 200 ns. Table 1 provides exemplary mmW downlink OFDM numerology.

TABLE 1

| OFDM Numerology Parameters | | | | |
| --- | --- | --- | --- | --- |
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |
| Occupied bandwidth (MHz) | 115.2 | 230.4 | 460.8 | 921.6 |
| IDFT(Tx)/DFT(Rx) size | 512 | 1024 | 2048 | 4096 |
| OFDM symbol duration (us) | 3.333 | 3.333 | 3.333 | 3.333 |
| CP length (ratio to symbol length) | 1/4 | 1/4 | 1/4 | 1/4 |
| CP length (us) | 0.833 | 0.833 | 0.833 | 0.833 |

TABLE 1-continued

| OFDM Numerology Parameters | | | | |
|---|---|---|---|---|
| Number of symbols per slot | 24 | 24 | 24 | 24 |
| Slot duration (us) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64QAM (Mbps) | 442.368 | 884.736 | 1769.472 | 3538.944 |
| Spectral efficiency | 3.538944 | 3.538944 | 3.538944 | 3.538944 |

Figure 11:
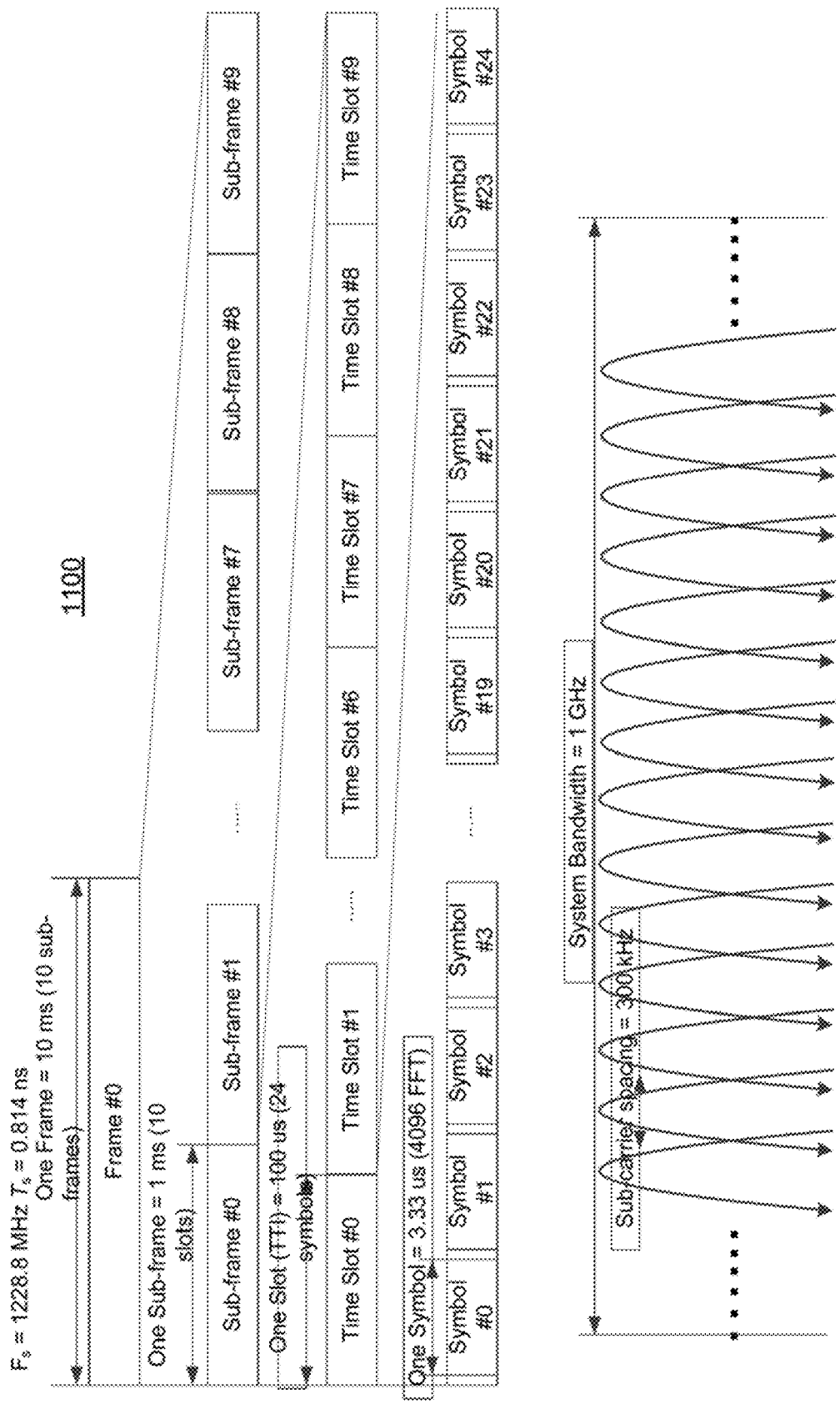
FIG. 11 is a diagram illustrating an example frame structure.

FIG. 11 depicts an example corresponding frame structure 1100. A longer CP may be considered for an extended cell radius as the extended CP is designed for in the LTE system. A longer CP may be considered for a more conservative approach to ensure the channel time dispersion is covered in the CP length. The nominal spectral efficiency may decrease as the overhead caused by the CP length increases.

Certain examples may be disclosed herein assuming an OFDM-based mmW downlink data enhancement, which may be incorporated into the OFDM-based LTE small cell network. Other waveforms, including, e.g., broadband SC and MC-CDMA may lead to different structures and parameters. Some examples disclosed herein may be applicable to other waveform solutions used for mmW transmission.

An mmW downlink may employ physical layer channels and reference signals as disclosed herein in addition to LTE physical channels (e.g., existing LTE physical channels).

A Beam-Specific Reference Signal (BSRS) may be a sequence per transmit beam that may be used for beam acquisition, timing/frequency synchronization, channel estimation for PDDCCH, fine beam tracking, beam measurement, etc. It may implicitly carry beam identity information. There may be different types of BSRS. For example, there may be BSRS for each mmW sector and its member segments.

A Physical Downlink Directional Data Channel (PDDDCH) may carry payload information received in the form of MAC PDU from a MAC layer. The resource allocation of this channel may be determined by the downlink scheduling information carried in PDDDCH. The PDDDCH intended for an mWTRU may be transmitted in a narrow transmit beam and may be received in a paired narrow receive beam. PDDDCHs for different WTRUs in different transmit/receive beam pairs may apply identical time, frequency, or code resources. Multiple PDDDCH may operate in one Tx/Rx beam pair using multiple access in time, frequency or code domain.

A Physical Downlink Directional Control Channel (PDDCCH) may carry data-related control information for an mWTRU to demodulate and decode the associated PDDDCH correctly. Similarly to PDDDCH, the PDDCCH may operate in a transmit/receive narrow beam pair and may apply similar multiple user access. The PDDCCH may consist of a common PDDCCH and a dedicated PDDCCH in certain design solutions. The dedicated PDDCCH may associate with a PDDDCH on a per-TTI basis and may not carry beam specific information. A common PDDCCH may include beam-specific information such as segment identity for an mWTRU to identify the transmit beam. An mWTRU may read the common PDDCCH first to find out if it is scheduled and which mmW beam pair to be used. The common and dedicated PDDCCH may be placed separately in the time and frequency domain. The common PDDCCH may be carried in a narrow or broad mmW beam, depending on the design. The dedicated PDDCCH may be located in narrow mmW beam.

A Demodulation Reference Signal (DMRS) may include symbols embedded in the transmission for channel estimation for PDDDCH. They may be placed in time and frequency domains according to a pre-defined pattern to ensure correct interpolation and reconstruction of the channel.

Each of the channels and reference signals may be beamformed identically and may be considered to be transmitted via one physical antenna port. The channels may use the mmW frequency band and may be applied for high speed, low latency user traffic application. Given the directivity of the transmission of these channels, carrying broadcast or multicast information may not be an optimal application. The system with mmW downlink data enhancement may adopt a channel mapping.

Figure 12:
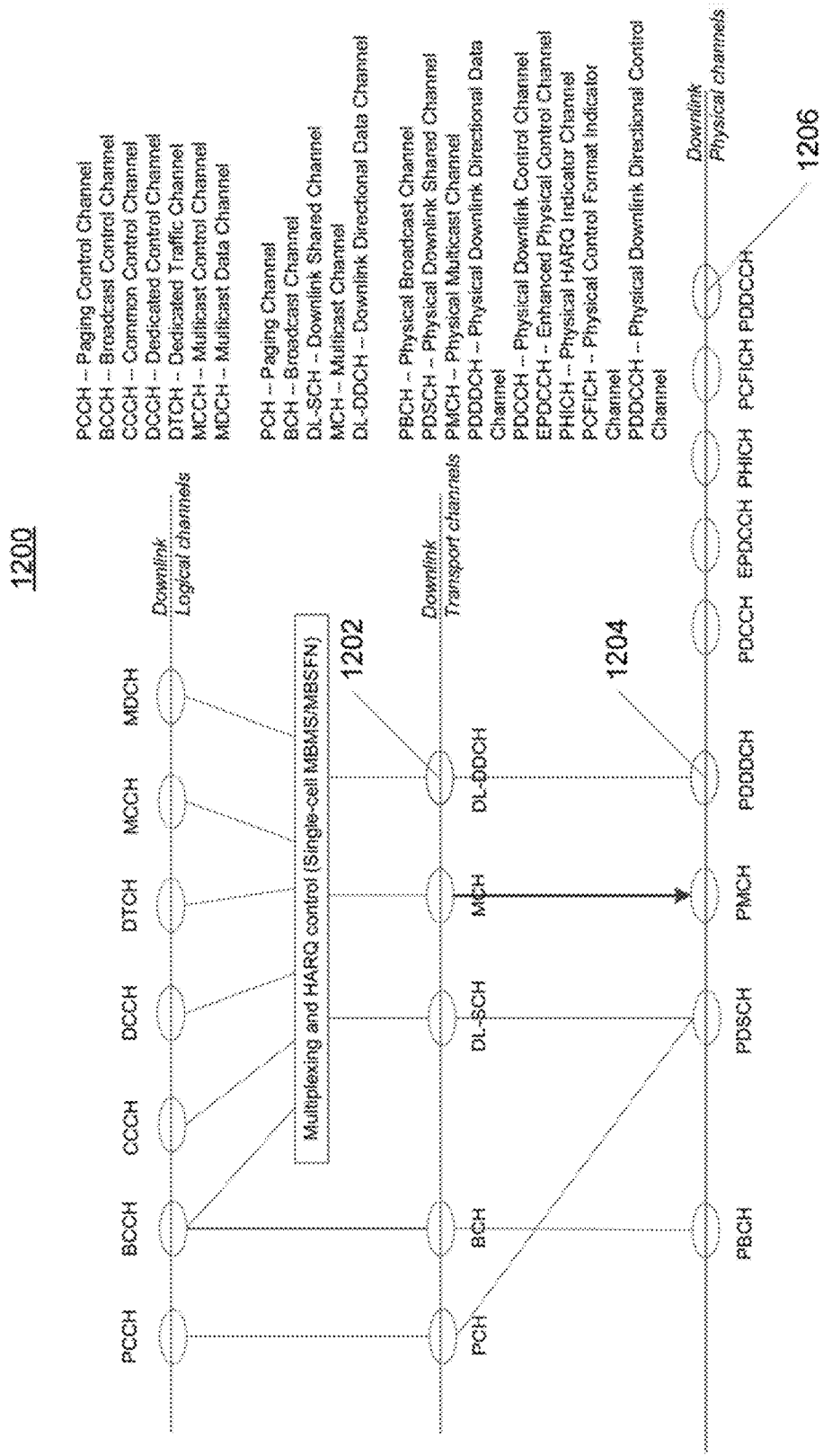
FIG. 12 is a diagram illustrating example mmW downlink logical, transport, and physical channels.

FIG. 12 is a diagram 1200 illustrating example mmW downlink logical, transport, and physical channels. The system with mmW downlink data enhancement may adopt a channel mapping, which may include mmW-related channels 1202, 1204, and 1206.

An mWTRU may have an associated PDDCCH when its data is transmitted in the PDDDCH in its transmit/receive beam pair. The channel multiplexing may apply one or more of the following.

In time division multiplexing (TDM), PDDCCH and PDDDCH may be multiplexed in the time domain in each TTI. The PDDCCH may be decoded, and the PDDDCH demodulation and decoding may start before the end of TTI. TDM may be less demanding on the data buffering and may reduce the latency, but the PDDCCH occupancy of the allocated frequency spectrum may reduce the efficiency.

In frequency division multiplexing (FDM), PDDCCH and PDDDCH may be multiplexed in the frequency domain in each TTI, PDDCCH and/or PDDDCH decoding may start at or after the end of TTI. An mWTRU may use a large buffer for the data because the allocated bandwidth may be large in the mmW frequency band. Latency may be increased. Spectrum efficiency may improve.

In hybrid multiplexing, PDDCCH and PDDDCH may be multiplexed in both time and frequency domains, e.g., to balance between TDM and FDM.

Figure 13:
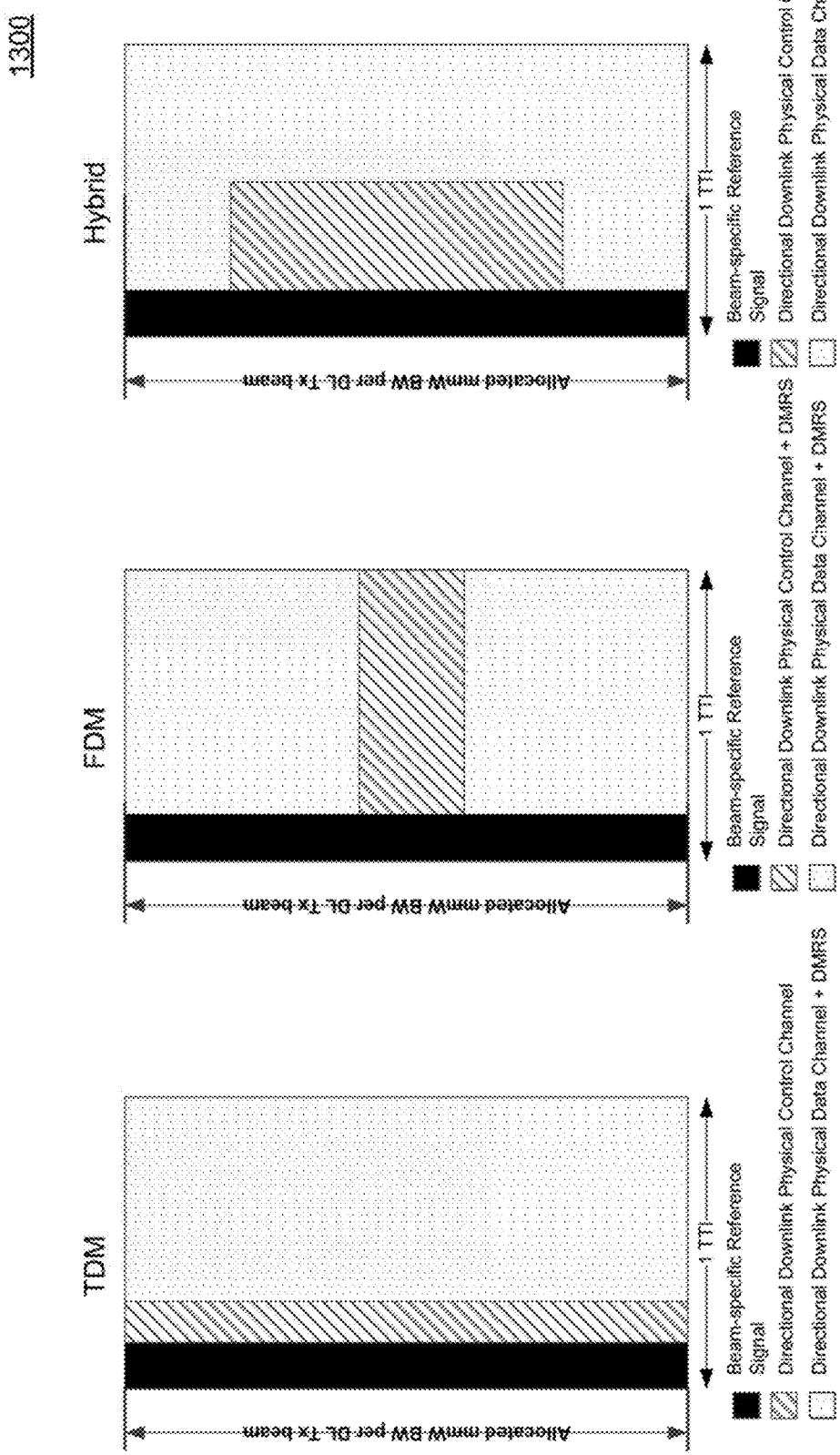
FIG. 13 is a diagram illustrating examples of multiplexing.

FIG. 13 is a diagram 1300 illustrating TDM, FDM, and hybrid examples of multiplexing.

mmW downlink may be unidirectional (e.g., only downlink). Duplexing may be omitted from the mmW downlink. mmW control information in the uplink may be carried in LTE uplink control or data channels. Duplexing, including, e.g., Frequency Division Duplex (FDD), Time Division Duplex (TDD) and Spatial Division Duplex (SDD) may be employed in the mmW uplink.

Multiple access may depend on the beam forming technique and may vary within one beam (e.g., intra-beam) or between different beams (e.g., inter-beam). For example, digital baseband transmit beam forming may be employed at SCmB, and analog receive beam forming may be employed at the mWTRU.

In intra-beam duplexing, multiple mWTRUs may be scheduled in one downlink transmit beam. In Frequency Division Multiple Access (FDMA), the mWTRUs may be assigned with different frequency allocation and may receive simultaneously. The mWTRUs may receive a strong downlink signal in a similar angular incoming direction. The best beam for one mWTRU may not be the best beam for another mWTRU. A jointly optimized beam (e.g., sub-optimal for all) may be used or SCmB may schedule one mWTRU within one beam at one time. In Time Division Multiple Access (TDMA), the mWTRUs may be assigned with all frequencies allocated in the transmit beam. For example, in each slot there may be one mWTRU receiving. In this case, a sub-optimal beam may not be used, but the packet may be comparatively large, which may lead to packing inefficiencies. In Non-orthogonal Multiple Access (NOMA), the mWTRUs may be located relatively far from each other in the transmit beam, and the path loss difference may be large. The mWTRUs may use the same frequency and time resources. e.g., non-orthogonal, but may use superposition coding and Successive Interference Rejection (SIC) to remove the interfering signal successively. Channel estimation for each mWTRU may involve a more complex design.

In inter-beam duplexing, multiple mWTRUs may be scheduled in different downlink transmit beams. In Spatial Division Multiple Access (SDMA), the mWTRUs assigned in different transmit beams may be allocated with identical frequency resources and may receive simultaneously (e.g., MU-MIMO). The receive beam forming may use interference rejection combining (IRC). In Frequency Division Multiple Access (FDMA), the mWTRUs assigned in different transmit beams may be allocated with different frequency resources. In Time Division Multiple Access (TDMA), the mWTRUs assigned in different transmit beams may be assigned with identical frequency resources and may receive in turn according to scheduling.

An mWTRU may use a phase antenna array to achieve an antenna gain to compensate the high path loss at mmW frequencies, at which the short wavelength may allow a compact form factor of the device design. While an element spacing of $0.5\lambda$ may be used in theoretical performance analysis, in practice a large spacing such as $0.7\lambda$ may be applied.

Figure 14:
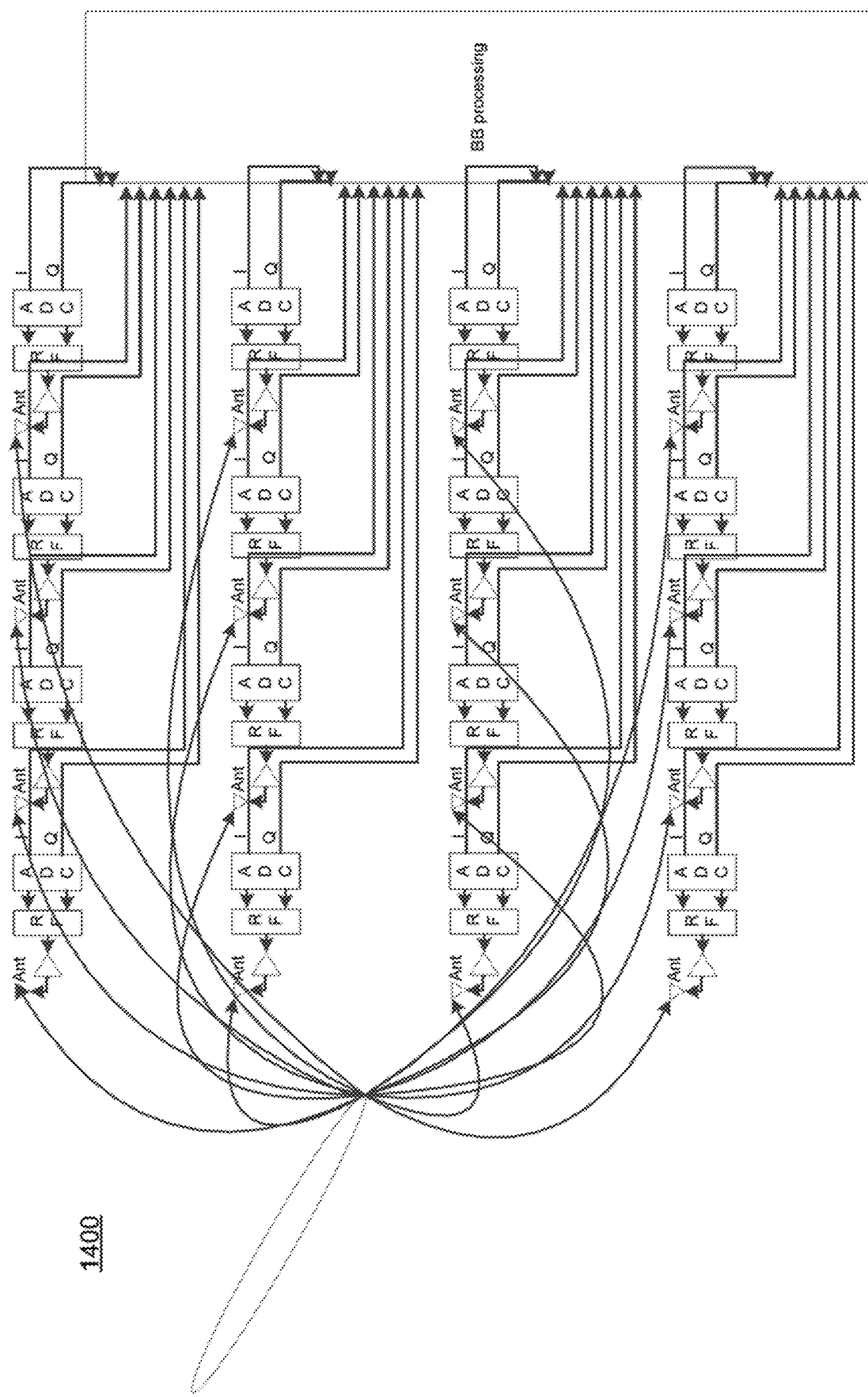
FIG. 14 is a diagram illustrating an example antenna element.

FIG. 14 is a diagram 1400 illustrating an example antenna element. An antenna element may have a dedicated RF chain including RF processing and ADC. The signal processed by an antenna element may be controlled independently in phase and amplitude to optimize the channel capacity. While providing high performance, this mWTRU antenna configuration may have a high cost and complexity in implementation and high energy consumption in operation.

An mWTRU may employ hybrid beam forming in which analog beam forming may be performed over the phase array antenna elements, each associated with a phase shifter and connected to one RF chain. The phase of the signal at each antenna element may be adjusted in the beam forming. Digital precoding may be applied on the baseband signals of RF chains when there is more than one RF chain. Spatial diversity and MIMO schemes may be implemented using digital precoding. System parameters of hybrid beam forming may include a number of data stream, $N_{DATA}$; a number of RF chains (TRX), $N_{TRX}$; a number of antenna ports, $N_{AP}$; a number of antenna elements, $N_{AE}$; and/or a number of phase antenna arrays, $N_{PAA}$. These parameters may be related such that $N_{PAA} \leq N_{AP} \leq N_{TRX} \leq N_{AE}$.

A phased antenna array (PAA) may include multiple antenna elements. For example, a 4×4 PAA may have 16 antenna elements. An antenna port may be defined such that the channel over which a symbol on the antenna port is conveyed may be inferred from the channel over which another symbol on the same antenna port is conveyed. There may be one resource grid per antenna port. Cell-specific reference signals may support a configuration of one, two, or four antenna ports and may be transmitted on antenna ports p=0, p∈{0,1} and p∈{0,1,2,3}, respectively. MBSFN reference signals may be transmitted on antenna port p=4. WTRU-specific reference signals associated with PDSCH may be transmitted on antenna port(s) p=5, p=7, p=8, or one or more of p∈{7,8,9,10,11,12,13,14}. Demodulation reference signals associated with EPDCCH may be transmitted on one or several of p∈{107,108,109,110}. Positioning reference signals may be transmitted on antenna port p=6. CSI reference signals may support a configuration of one, two, four or eight antenna ports and may be transmitted on antenna ports p=15, p∈{15,16}, p∈{15,16,17,18}, and p∈{15,16,17,18,19,20,21,22}, respectively.

Each antenna port may carry a beam formed reference signal that may be associated with this antenna port and that may be used to identify the antenna port.

A PAA may be connected to an RF chain or multiple RF chains, depending on the system.

Figure 15:
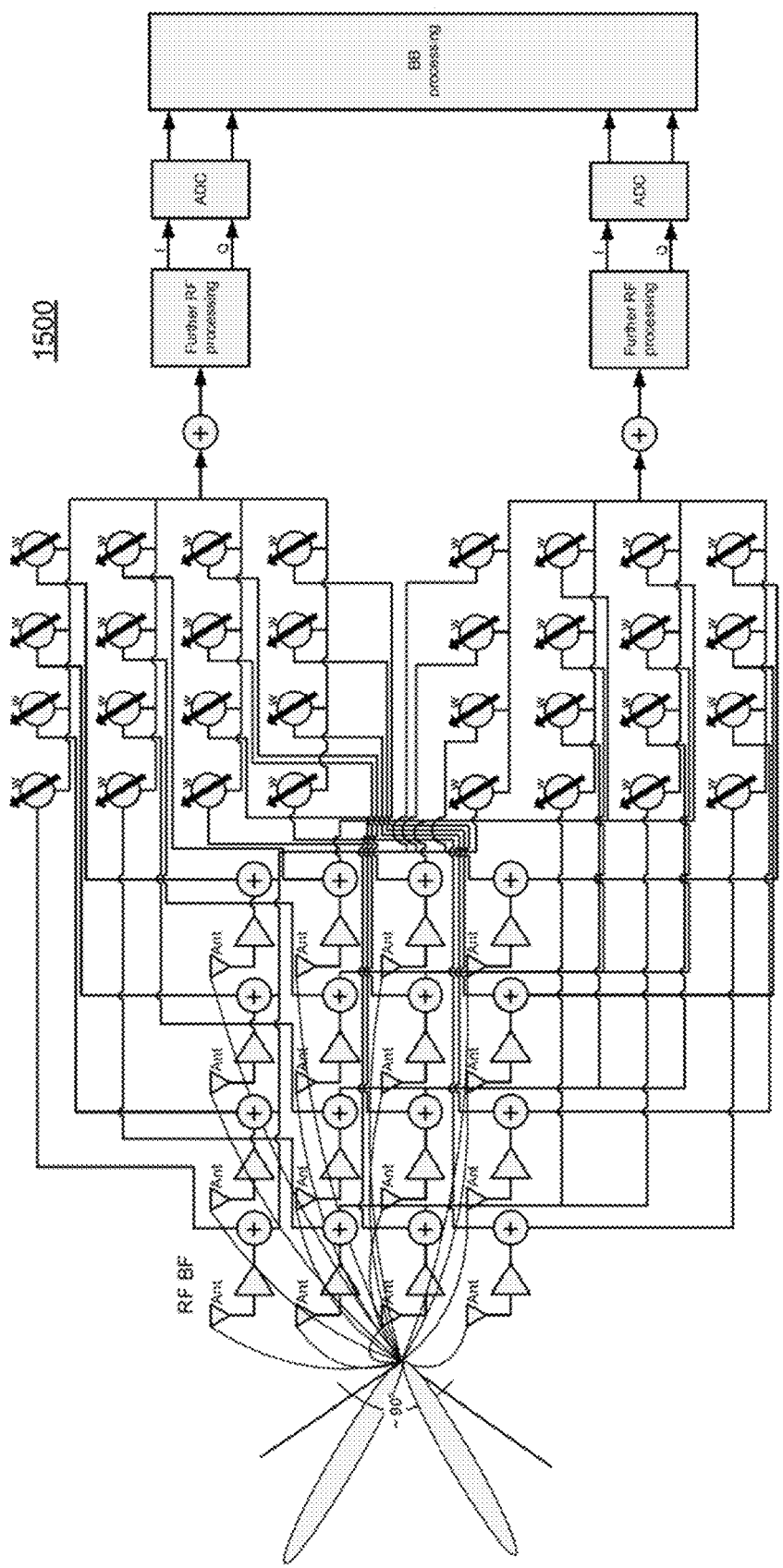
FIG. 15 is a diagram illustrating an example phased antenna array (PAA).

FIG. 15 is a diagram 1500 of a phased antenna array. A PAA of size 4×4 may be connected to two RF chains, and each RF chain may have a set of 16 phase shifters. The PAA may form two beam patterns within a +45° and −45° coverage in an azimuth plane. In this configuration, $N_{PAA} < N_{AP} = N_{TRX} < N_{AE}$.

Figure 16:
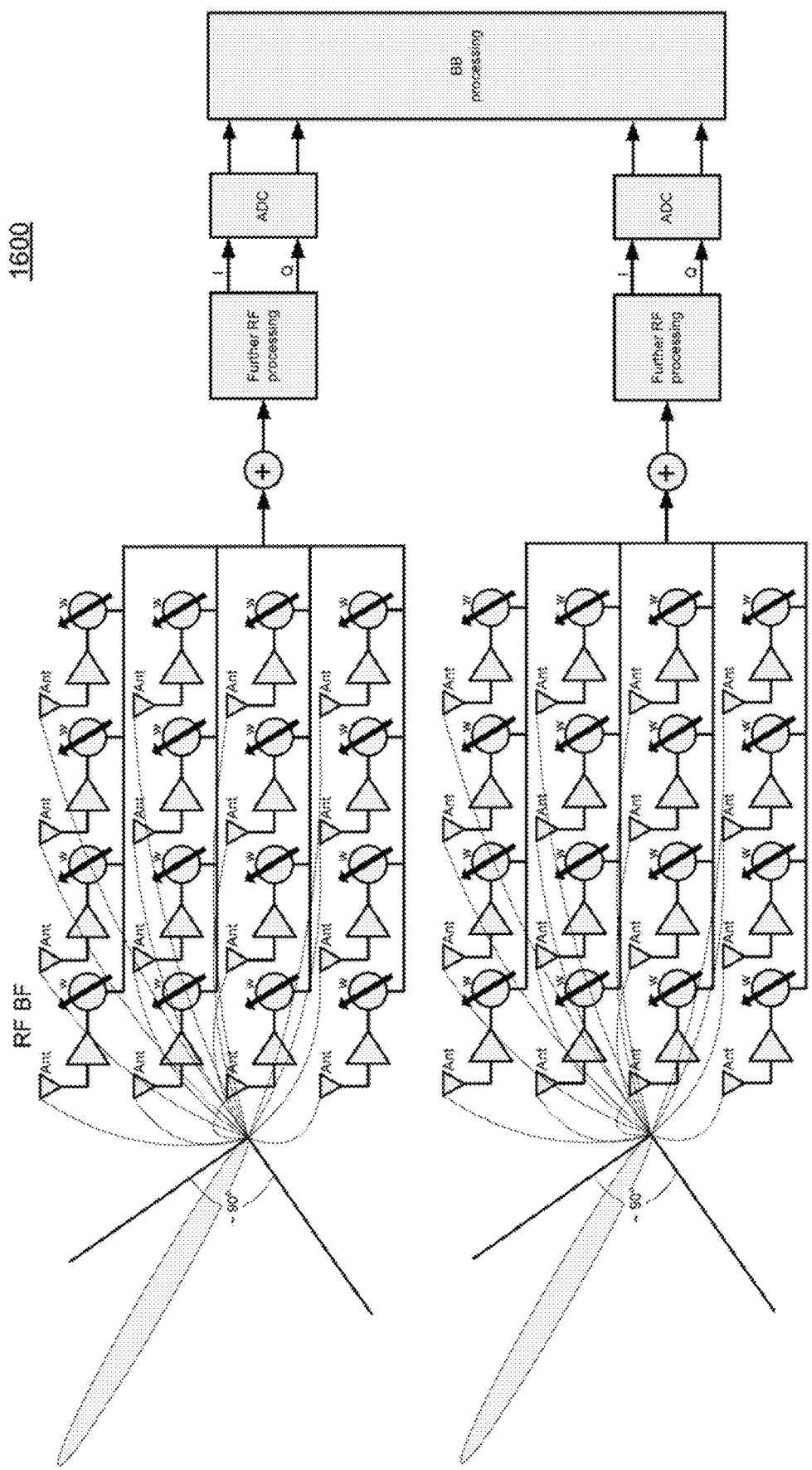
FIG. 16 is a diagram illustrating an example PAA.

FIG. 16 is a diagram 1600 in which there may be two PAAs and each PAA may have a dedicated RF chain, e.g., $N_{PAA} = N_{AP} = N_{TRX} \leq N_{AE}$. This configuration may allow a spatial independence between the two simultaneous beams by placing the PAAs at different orientations, e.g., in the azimuth plane. An aligned PAA arrangement may provide an aggregated larger coverage compared to the configuration of FIG. 15.

When the number of TRX equals the number of antenna elements, e.g., one RF chain per antenna elements, the antenna configuration may become the digitized configuration shown in FIG. 14.

The system parameters may be related such that $N_{DATA} \leq N_{TRX} \leq N_{AE}$. When $N_{DATA}$ and $N_{TRX}$ are both equal to 1, an mWTRU may have a single-beam configuration and may operate one beam at a time.

Figure 17:
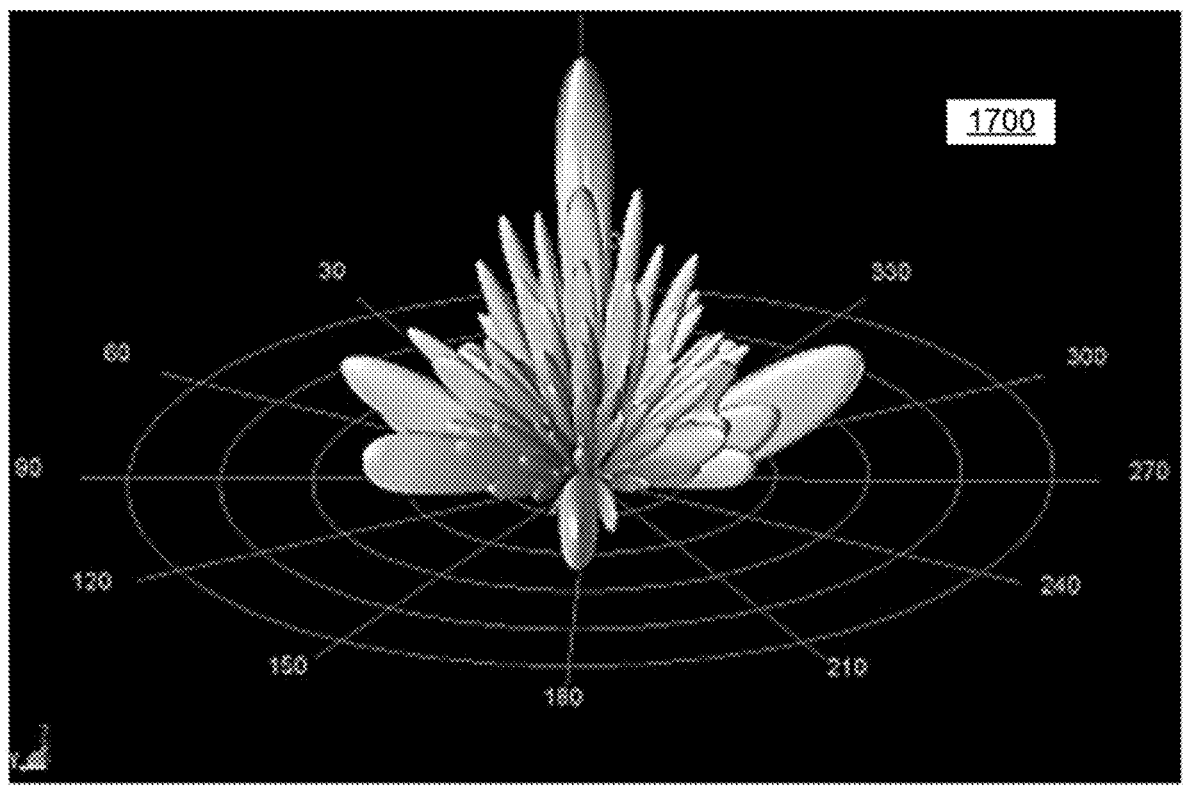
FIG. 17 is a diagram of an example beam pattern.

FIG. 17 is a diagram 1700 of a beam pattern. The mWTRU beam forming may form the narrow beam pattern (such as, for example, is shown in FIG. 17) at the strongest angular direction, e.g., a line of sight (LOS) path estimated from beam measurement.

Figure 18:
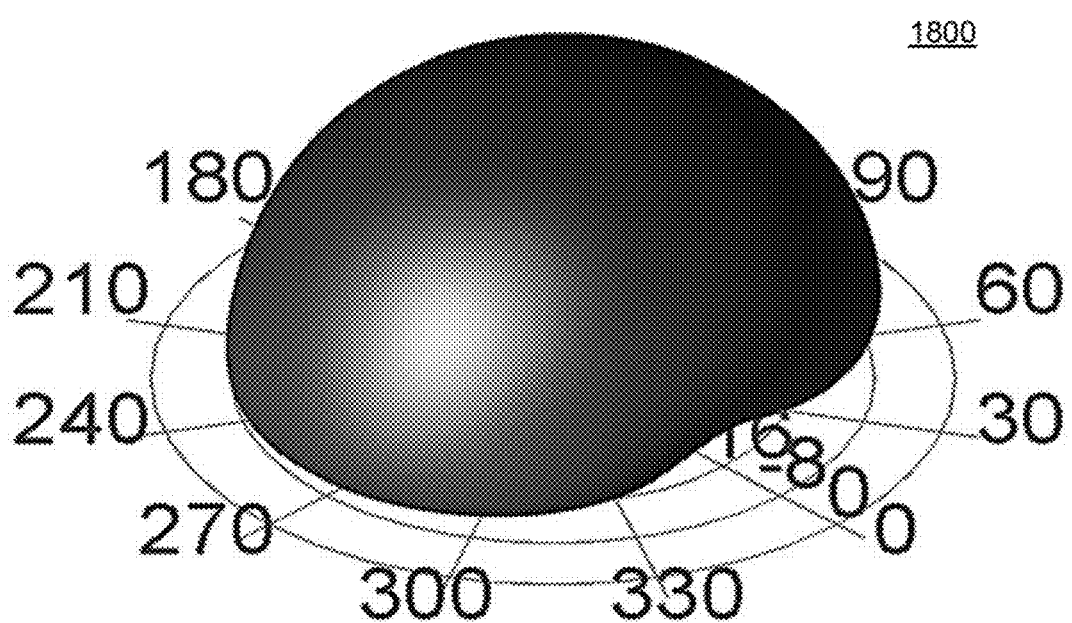
FIG. 18 is a diagram of an example beam pattern.

FIG. 18 is a diagram 1800 of a beam pattern. The mWTRU may form a broad beam pattern, e.g., a wide main lobe (such as, for example, is shown in FIG. 18) to cover a range of continuous angular directions, including both strong and weak ones. Antenna gain may be reduced when forming a broad beam pattern, and the link budget may become worse.

Figure 19:
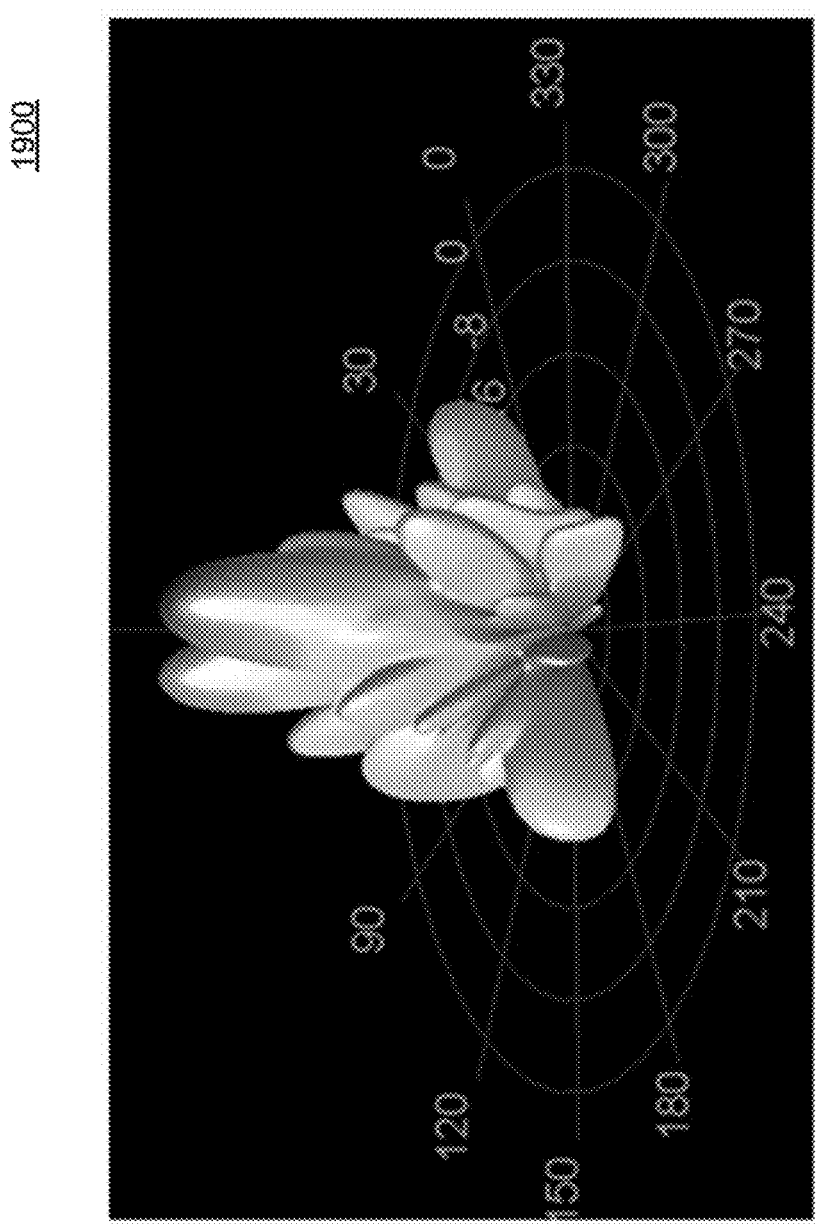
FIG. 19 is a diagram of an example beam pattern.

FIG. 19 is a diagram 1900 of a beam pattern. The mWTRU may adaptively form a beam pattern with multiple distinct strong lobes (such as, for example, is shown in FIG. 19), e.g., to receive at two different incoming angular directions. The two transmit beams may be directed, for example, at two strong specular reflection paths to take advantage of spatial diversity. The forming of this beam pattern may reduce the antenna gain compared to a narrow beam pattern. Adaptive beam pattern forming may use continuous steering and forming to dynamically adjust the beam pattern in response to the estimated channel condition.

When $N_{DATA}=1<N_{TRX}$, for example, when $N_{TRX}=2$, an mWTRU may have two simultaneous beam patterns. The beam patterns may be different. The beam patterns may be used for different applications. The mWTRU may place two narrow beam patterns at different angular incoming directions to utilize the spatial diversity and mitigate the blockage effect and/or weak LOS condition. This may facilitate beam combining. The mWTRU may place two narrow beam patterns at different angular incoming directions and may apply a fast beam switching mechanism when one beam's channel conditions quickly deteriorate. The mWTRU may form one narrow beam and one broad beam for different applications. For example, the narrow beam may be used for traffic and the broad beam may be used for control signaling.

When $1<N_{DATA}=N_{TRX}$, e.g., the transmission may apply MIMO to increase the capacity, for example, in high SNR channel conditions. The mWTRU may place two narrow beam patterns at different angular incoming directions to receive two data streams.

The mWTRU analog beam forming may include one or more of the following. mWTRU analog beam forming may include fixed codebook based beam forming. A grid of beams may include a set of fixed beams. A beam may be formed by the mWTRU applying a beam forming vector v chosen from a predefined codebook $v \in (v_1, v_2, v_3 \ldots v_N)$, where N may denote the number of fixed beams. A vector may include pre-calibrated phase shifts for phase shifters and may represent an analog beam direction (e.g., a beam). The number of beams may depend on the half-power beam width (HPBW) and desired coverage. mWTRU analog beam forming may include eigenvalue based beam forming, e.g., precoding an applied eigenvalue-based weight vector based on short-term channel information. This may perform well in cases with increased multipath and high angular spread and low WTRU mobility. Eigenvalue based beam forming may provide the adaptive beam forming capability to track the channel conditions.

SCmB beam forming may include fixed beam, adaptive beam forming (e.g., codebook-based and non-codebook-based), and classical beam forming (e.g., DoA estimation). Each may involve different procedures and may be suitable for certain cases. For example, DoA estimation may use a smaller angular spread, and a WTRU may transmit a LTE band uplink reference signal for AS range estimation to ensure DoA accuracy. The fixed beam system may use beam cycling and beam switching.

Figure 20:
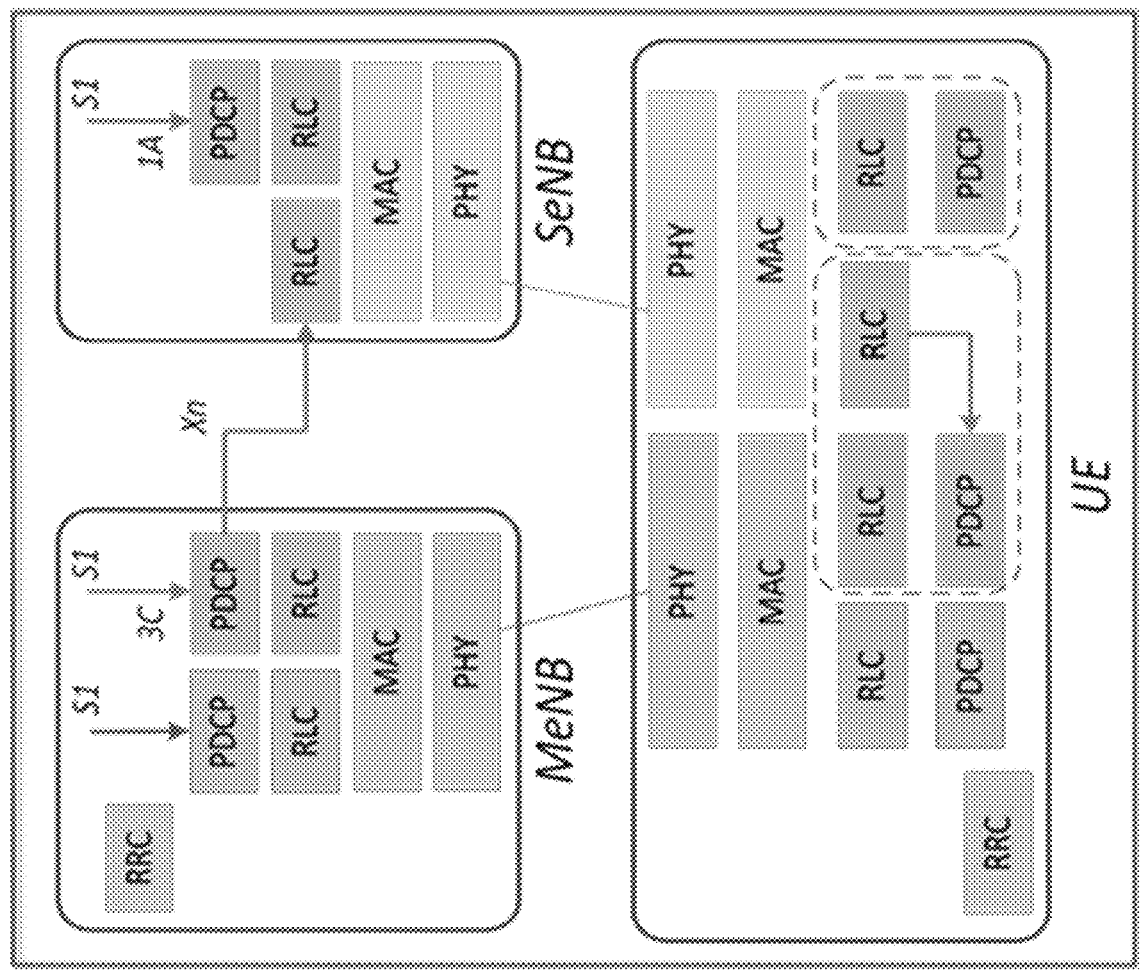
FIG. 20 is a diagram of an example protocol stack architecture.

FIG. 20 is a diagram 2000 of an example protocol stack architecture for dual connectivity (e.g., Rel. 12 dual connectivity). Various user and control plane protocol stack architectures may be used for dual connectivity (e.g., Rel. 12 dual connectivity). These protocol stack architectures may include, for example, C1, 3C. and/or 1A architectures. In a 1A protocol stack architecture, S1-U may terminate at a small cell and independent PDCPs, e.g., with no bearer split. In a 3C protocol stack architecture, S1-U may terminate at the macro eNB and may allow a bearer split feature. Independent RLCs may be employed: one at the macro eNB and one at the small cell per bearer. Xn may be the interface between the macro eNB and small cells; the backhaul may be non-ideal.

Figure 21:
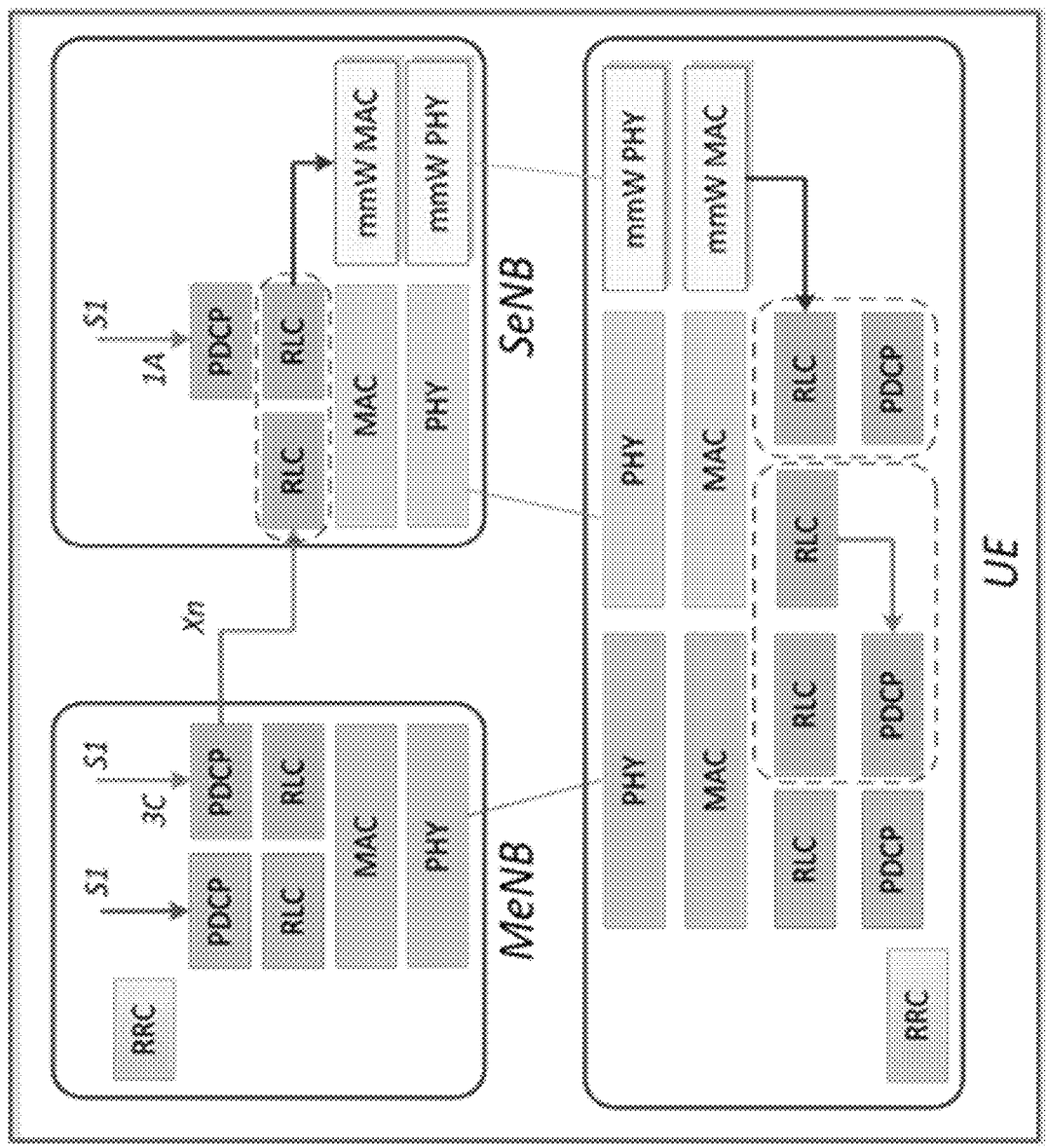
FIG. 21 is a diagram of an example protocol stack architecture.

FIG. 21 is a diagram 2100 of an example protocol stack architecture. An mmW system may be built on top of 3GPP dual connectivity architecture. An LTE carrier may be used for control, system information broadcast, and coverage, while mmW may be used as a data pipe for throughput enhancement. Mobility may be an issue even with LTE small cells. Signaling load to the core network due to frequent handovers may be an issue with small cells. The mmW directional links may suffer from intermittent losses due to blockage, user mobility, and/or user orientation as mmW may lack omnidirectional coverage. LTE carriers may be used to maintain coverage, and mmW carrier may be used as a secondary data carrier. Carrier aggregation may not be applicable for mmW carriers, because mmW TTIs are shorter than LTE TTIs (e.g., multiple mmW TTIs within LTE TTI) due to large bandwidth available in mmW frequencies. A split under RLC may be envisioned for mmW carrier. RLC may support multiple logical channels per RLC entity. RLC segmentation, retransmission, RLC feedback, etc. may be reused from LTE. Such a split may enable dynamic transmission or retransmission of PDUs from mmW to LTE and vice versa. Uplink feedback such as mmW ACK/NACK and CQI may be transmitted using an LTE carrier. A WTRU MAC may receive the mmW transport blocks on the mmW carrier and may forward the RLC PDUs to the configured RLC entity, which may perform concatenation, reassembly, etc. FIG. 21 illustrates an example protocol stack architecture for a downlink mmW carrier.

Figure 22:
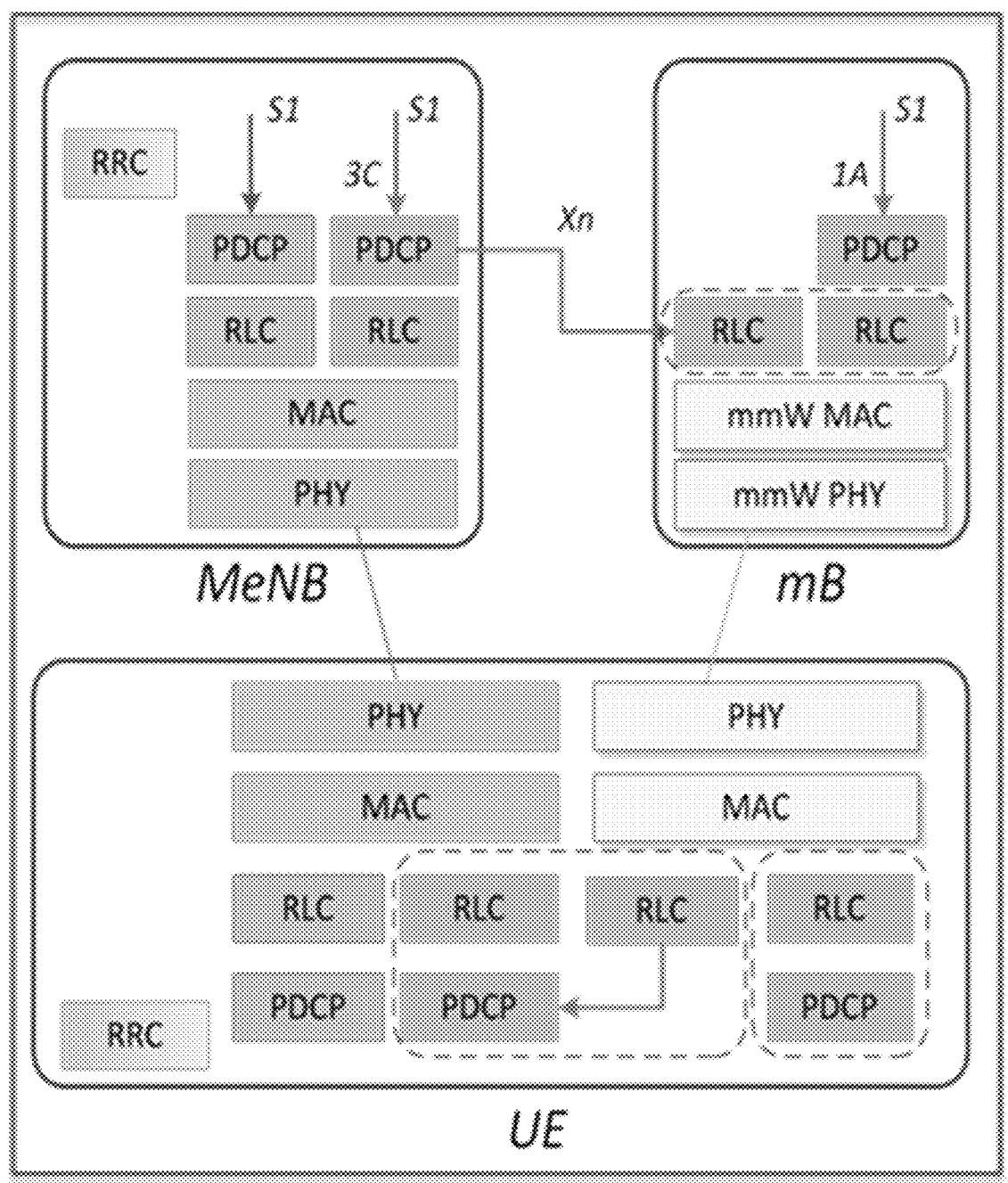
FIG. 22 is a diagram of an example protocol stack architecture.

FIG. 22 is a diagram 2200 of an example protocol stack architecture. In a standalone model, mmW uplink (UL) channels may provide feedback regarding UL beam formation or beam tracking, mmW RACH, UL PUCCH, SR, BSR, CQI, etc. Some RLC/PDCP functionalities may be reused from LTE, e.g., with modifications to timer values and sequence number lengths to accommodate high throughputs from mmW carriers. A standalone mmW protocol stack architecture, an example of which is shown in FIG. 22, may be based on dual connectivity architecture and may employ a macro eNB to provide coverage in case of radio link failure (RLF) on the mmW layer.

Figure 23:
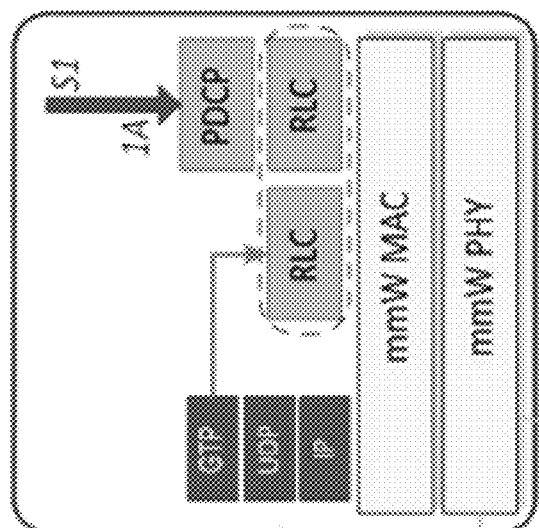
FIG. 23 is a diagram of an example protocol stack architecture.
Figure 23:
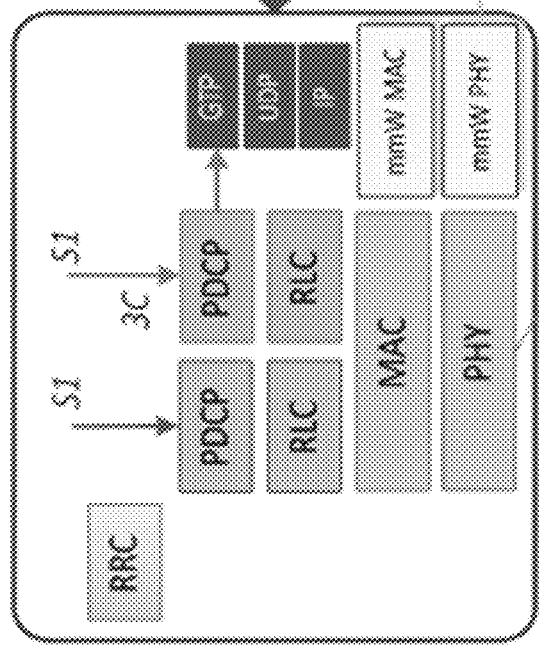
Figure 23:
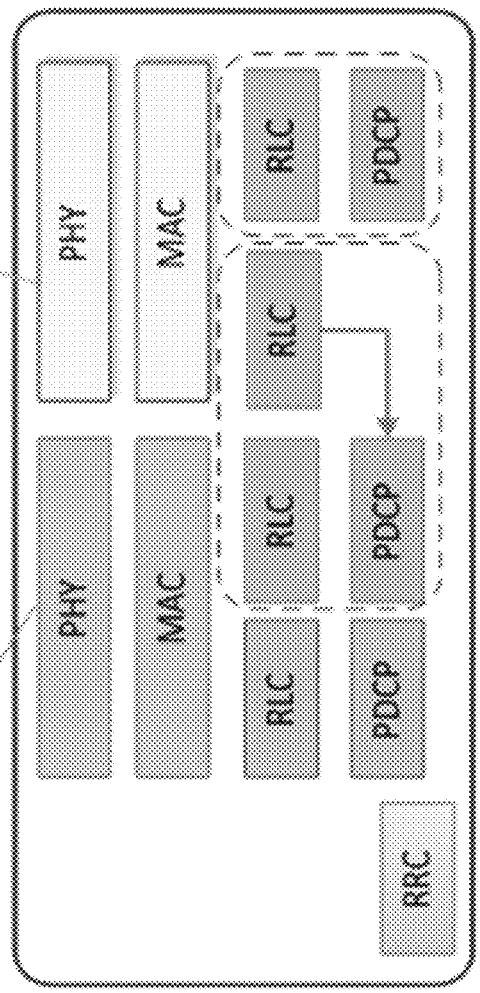

FIG. 23 is a diagram 2300 of an example mmW protocol stack architecture for joint access and backhaul. In case of joint access and backhaul, mmW radio resources may be shared between access and backhaul. The protocol architecture may map the IP packets from the backhaul transport directly to the mmW MAC. From an mmW MAC point of view the backhaul link may look like a special logical channel. The mmW MAC may maintain the associations or mapping between different peer small cell nodes and macro nodes to the special logical channels. More than one logical channel may be created to prioritize between different backhaul traffic, such as data, synchronization, routing, etc. MAC may also map these special backhaul logical channels to special transport channels with different degree of protection, e.g., coding, etc., and may use different beam widths, power levels, etc. For the Xn interface, the macro eNB may have mmW capability.

The mmW MAC scheduler may be backhaul aware and may split (e.g., intelligently split) the resources between access and backhaul and may enable SON procedures specific to backhaul transport.

A hierarchical beam structure (such as, for example, a wide beam and a narrow beam) may be used. A hierarchical beam structure may reduce cell discovery time and/or frequent beam acquisition/tracking activities. In one example, control channels may be mapped to wide beam and data channel may be carried in narrow beams (and optionally using wide beams). The WTRU may be aware of the hierarchical beam structure.

A number of Tx and Rx beams supported at the mB and WTRU may depend on a type of implementation. Reference signal, frame structure and measurement gap configuration may support various implementation options.

A WTRU may track and measure multiple narrow beams. WTRU may track and measure multiple narrow beams for the serving cell, for example, to reduce radio link failure (RLF) events. A WTRU may search, detect, and measure wide beams from neighbor mBs. A WTRU may search, detect, and measure narrow beams from neighbor mBs. A WTRU may track beams from multiple neighbors. Measurement and reporting from the WTRU point of view should be monitored to reduce overhead. Due to the directional nature of mmW transmissions, a WTRU may need measurement gaps for both serving cell measurements and intra-frequency neighbor cell measurements. A cell search may provide the WTRU with Timing, Frequency, Cell ID, and coarse beamforming information.

A mmW beam may refer to a specific transmitter or receiver configuration. The specific transmitter or receiver configuration may be identified by a unique reference signal. The specific transmitter or receiver configuration may be identified by an antenna port configuration. The specific transmitter or receiver configuration may be identified by an index to a set of beam former control words or precoding matrices. The transmitter configuration may also be identified by a unique ID sent using MAC signaling (such as, for example, a MAC Control element, MAC header, or part of the payload).

WTRUs in a dual connectivity operation may receive a set of configurations specific to the mmW carrier from the SeNB using RRCConnectionReconfiguration procedure. The MeNB may provide the set. The reconfiguration procedure may be MeNB initiated. The reconfiguration procedure may be SeNB initiated.

In an SeNB initiated reconfiguration procedure, the SeNB may send to the MeNB a SeNB modification message which may contain mmW carrier information. The message may contain bearer context information. The message may contain WTRU context information. MeNB may initiate the mmW layer addition procedure for the SeNB currently configured for the WTRU. A mmW layer addition procedure may include at least one of WTRU capability to support the mmW carrier; SeNB capability to support the mmW carrier; WTRU mobility estimated to be below a defined threshold; and availability of mmW resources in the SeNB.

The MeNB may request SeNB to allocate radio resources for a specific E-RAB for a WTRU. The MeNB may provide WTRU capabilities related to mmW transmission and reception. The SeNB may respond with acknowledgement (such as, for example, if the RRM entity in the SeNB is able to admit the resource request). The MeNB may initiate RRC-ConnectionReconfiguration procedure towards the WTRU.

The WTRU may receive a RRCConnectionReconfiguration message from the MeNB on the SRB. The message may include at least one of the following: a set of dedicated system information; a set of common mmW radio resource information; a set of dedicated mmW radio resource information; a map of DRBs; and a set of dedicated configuration parameters.

The set of dedicated system information corresponding to the mmW carrier from the SeNB may include at least one of the following: mmW carrier frequency, mmW cellID, number of sectors, number of transmit beams within each sector, periodicity of the mmW Cell specific Reference Signal transmission, configuration/pattern for the mmW Beam specific Reference Signals, sequences used for mmW CRS and mmW BRS, BW of the mmW carrier, and timing offset between the LTE frame timing to the mmW frame timing from the SeNB.

The set of common mmW radio resource information may include at least one of the following: PDDDCH config, PDDCCH config, and AntennaInfo.

The set of dedicated mmW radio resource information may include mmW MAC configuration information.

A MeNB may map DRBs on the mmW layer. The MeNB may choose DRBs characterized by high throughput and latency to the mmW layer. The MeNB may map SRBs and DRBs characterized by low throughput and high reliability to the LTE layer. The MeNB may allow the WTRU to perform preferential mapping of data to mmW MAC. The WTRU may perform a data split operation. The WTRU may use a type of a leaky bucket algorithm, where the data rate in terms of bits per second is configured individually for LTE MAC and mmW MAC by the MeNB. The WTRU may choose to send data via LTE carrier (for example, if mmW radio link deteriorates below a defined threshold, or PDDDCH data decoding failure counter exceeds a defined threshold, or if a number of COUT indication is received from mmW PHY within a pre-defined timer is more than threshold, or if number of consecutive NACKs received on the mmW MAC is more than the defined threshold).

The MeNB may signal a set of dedicated configuration related to the bearer parameters, including at least one of the following: RLC config, Logical channel config. The dedicated configuration related to the bearer parameters which may be mapped to the mmW MAC and in some cases split between mmW and LTE layer.

Upon receiving SeNB reconfiguration complete from the MeNB, the SeNB may determine when the WTRU starts the reception on the mmW carrier using at least one of the following options. The WTRU may instantiate mmW MAC on receiving an activation command from SeNB via L2/L1 signaling. A configuration specific to mmW MAC may be provided by MeNB during mmW addition procedure. The WTRU may start synchronization on the mmW carrier upon receiving a MAC control message from the SeNB. The WTRU may start synchronization on the mmW carrier upon receiving physical layer signaling from the SeNB. The WTRU may start synchronization on the mmW carrier upon expiry of the timing offset provided in the RRC reconfiguration by the MeNB. The synchronization step may include mmW cell discovery and beam forming procedures.

A mmW small cell may broadcast synchronization signals and reference signals different from signals (PSS/SSS, cell-specific reference signals) used for the purpose of detection and measurement of LTE cells. Due to the lack of omni-directional transmissions in the mmW carrier, a repetitive directional transmission in mmW carrier may be used to replace broadcast transmission.

A WTRU may be configured to detect and/or measure mmW cells that support the newly defined synchronization and reference signals. As part of its measurement configuration, the WTRU may be indicated that such new types of signals may be present in a given frequency (or mmW measurement object). The WTRU may be provided with additional information assisting the detection of the signals, such as at least one of periods of time where the signals may be received and/or at least one property of one or more of the signals.

Periods of time where the signals may be received may be expressed as a function of frame and/or subframe numbers of the LTE layer. Signals may be a pattern of subframes repeating periodically. Periodicity of the mmW reference signal transmission may be signaled via the LTE layer. The number of transmit beams (possibly for wide beam or narrow beam) may be signaled. The cell IDs of the mmW cells collocated with the LTE small cell may be explicitly signaled.

At least one property of one or more of the signals, such as an index or identifier used in the generation of a signal (such as a Zadoff-Chu base sequence index), may be used to implicitly identify at least one of the following: the cell ID of the mmW node (transmit beam ID information may be used additionally); different sectors/Cell ID/beam ID belonging to the same mmW node; and mmW subframe number and slot timing.

The WTRU may use directional reception to detect and measure mmW reference signals. The WTRU may measure using each receive beam at least for the duration greater than the reference signal symbol period. The WTRU may measure at least for the duration of the number of transmit beams used by the mB.

The network (MeNB/SeNB) may signal a new L2 filtering or measurement quantity configuration (such as, for example, to limit the amount of WTRU feedback during mmW measurements). The WTRU may apply the L2 filtering configuration provided by the network while reporting the measurement results. Such filtering configuration may include at least one of: signal/power threshold for detected mmW cells; max number of transmit beams to be reported; max number of Cell-IDs to be reported (for example, collocated mmW cells and the best transmit beams for those reported Cell-IDs); max number of receive beams and/or max number of transmit beams within each WTRU receive beam; minimum spatial separation above specified threshold for the reported transmit beams; and coefficients for moving average filter to smoothen the measurement samples.

A WTRU may scan 360 degrees with multiple receive beams. A WTRU may scan 360 degrees with all supported receive beams. The WTRU may collect a configured number of measurement samples before applying the L2 filter. The network may configure a guard timer for mmW cell detection. The WTRU may report one or more mmW cells/beams in the measurement results on expiration of the guard timer. Upon expiry of the guard timer, the WTRU may start a retry timer whose value is multiplied by a constant every time the mmW cell search returns empty results. If the WTRU cannot detect at least one mmW cell, then the WTRU may retry the mmW beam search based on at least one of the following conditions: upon expiry of the retry timer; when the average data rate over a time window is greater than a threshold-slight changes to the WTRU orientation/position. During retry operation for cell search, upon failure, the WTRU may use following beam patterns in sequence: wide receive beam, narrow receive beam.

WTRUs in dual connectivity operation may be configured with rules that specify the destination for measurement report. A WTRU may be configured to transmit the L2/L1 measurement report to the serving mB if the measurement events correspond to the intra-mB beam switch (such as, for example, intra-cell, inter-cell collocated in the same mB, different sectors). A WTRU may be configured to report RRC/L2 measurement report to the MeNB if the measurement event corresponds to the inter-mB beam switch or handover.

The WTRU may report measurement results of at least one detected mmW small cell. Such reporting may take place after (e.g., immediately after) detecting at least one such mmW cell or according to a trigger (such as, for example, received power or quality above a threshold). The WTRU may include in the report at least one of the following information: an identifier of the mmW cell (Cell-ID); an identifier of the mmW sector ID; an identifier of the transmit beam; an identifier of the WTRU receive beam; received power or quality for the corresponding Tx-Rx beam pair; a unique sequence number that identifies the received reference signal (for example, a combination of one or more cell ID/sector ID/beam ID).

The WTRU may transmit the mmW measurement report using a RRC measurement report on the LTE carrier towards the MeNB. The WTRU may transmit the mmW measurement report using an L2/L1 control message on the LTE carrier towards the SeNB.

A WTRU may undertake different types of measurement. A WTRU may undertake periodic measurements, scheduled measurements, and/or opportunistic measurements. Periodic measurements are made on reference signals that are periodically transmitted from the mB. Scheduled measurements are made on the reference signals that are scheduled dynamically by the mB and dedicated for the WTRU. Opportunistic measurements are made on the reference signals that are dynamically scheduled for another WTRU in the cell.

WTRUs capable of mmW reception may support mmW specific measurement procedures, such as, for example, based upon the directional nature of transmission/reception and limited support for broadcast transmissions. The WTRU may be configured with a measurement configuration specific to mmW serving cell. Such configuration may be identified by a special measurement identity. In case of serving cell measurements, a WTRU may measure and report more than one beam. mBs may use one or more wide beams for control transmissions and one or more narrow beams for data transmissions. In such deployments, a WTRU may be configured with RRC signaling to perform measurements for a wide beam and a narrow beam separately. The mB may transmit multiple non-overlapping wide beams with at least one beam covering a mmW sector. A WTRU may determine the cell ID and sector ID by reading the control information from the wide-beam. The wide beam may include information regarding the narrow beam information within the wide beam, which may then be used for subsequent narrow beam acquisition and measurement.

For example, such configurations may signal, for one measurement object (e.g., mmW carrier frequency) two sets of reporting configurations. The report triggers for control beams may be different from report triggers for data beams. The reporting configurations may include two measurement IDs, two separate quantity configurations, and/or two measurement gaps, as control beam periodicity may be different from data beam periodicity. For each mmW measurement object, two sets of additional parameters may be configured, one for a wide control beam and another for a narrow data beam. The measurement of narrow beams may be limited to the wide beam, e.g., the WTRU may report the preferred control beam and may be implicitly or explicitly signaled the set of data beams to measure, based on the reported control beam.

The mB may periodically transmit beam forming reference signals corresponding to wide beams in a predefined set symbols (e.g., first few symbols of every subframe), while the beam forming reference signals corresponding to the narrow beams may be transmitted in a dedicated time, frequency resource for a particular WTRU. The reference signals corresponding to narrow beams may be limited to specific allocated (e.g., semi-static) subframes and at required spatial directions (e.g., determined by presence of active WTRUs/active wide beams).

Measurement events specific to WTRU narrow beam measurement and wide beam measurement may be configured. For example, events W1, W2, W3, and W4 may be defined: W1 may occur when a narrow beam m_metric becomes below a defined threshold and wide beam m_metric is above a defined threshold; W2 may occur when narrow beam m_metric becomes offset below wide beam m_metric; W3 may occur when narrow beam m_metric becomes above a defined threshold and wide beam m_metric is below a defined threshold; and W4 may occur when narrow beam m_metric becomes offset better than wide beam m_metric. m_metric may be quantized received power, RSSI, RSRP, RSRQ, SINR, etc.

A WTRU may be configured to report the wide beam measurement results when any of the above events W1-W4 are entered and a defined trigger (e.g., time) is expired. Such measurement result may be sent over the LTE L2/L1 signaling or via mmW L2/L1 signaling. mB may command (e.g., explicitly command) the WTRU to switch to a better mmW Rx beam (narrow or wide beam). Such a command may be sent either via LTE L2/L1 signaling or could be signaled via mmW L2/L1 signaling. A WTRU may be implicitly configured to switch from narrow beam to wide beam or vice versa based on the criteria specified by different events.

The WTRU may report multiple beams, for example, one for LOS beam and another for near LOS or non-LOS beam. In such cases, mB may configure multiple measurement opportunities for the WTRU to measure both the beams. The mB may consider WTRU capability in terms of number of receive beams supported by the WTRU. For each receive beam supported by the WTRU, mB may transmit the beam forming reference signals using all or subset of transmit beams.

A WTRU may be configured to track more than one narrow beam from the serving mB. A serving mB may provide measurement gaps to measure multiple narrow beams and track the backup narrow beam. The backup beam may be spatially separate from the serving beam.

Measurement events specific to multiple narrow beam measurement may be configured. For example, events S1 and S2 may be defined: S1 may occur when serving beam m_metric becomes below a defined threshold and a backup beam (e.g., from the same serving mB) becomes above a defined threshold; S2 may occur when serving beam m_metric becomes offset better than backup beam (e.g., from the same serving mB) m_metric. Where m_metric may be quantized received power, RSSI, RSRP, RSRQ, SINR etc. These principles my apply to more than one backup beam. Backup beams may be wide beams, narrow beams, or both.

A WTRU may be configured to report the narrow beam measurement results when any of the above events are entered and a trigger (e.g., time) is expired. Such measurement result may be sent over the LTE L2/L1 signaling or via mmW L2/L1 signaling. mB may explicitly command the WTRU to switch to a better mmW narrow Rx beam. Such a command may be sent either via LTE L2/L1 signaling or via mmW L2/L1 signaling. A WTRU may be implicitly configured to promote backup beam to serving beam based on the criteria specified by different events.

A WTRU may be configured to maintain a list of best Rx-Tx beam pairs between the WTRU and the mB. The Rx-Tx beam pair list may be updated after each measurement cycle. Such Rx-Tx beam pair list may be sorted according to a configured quality metric (such as, for example, RSSI/RSRP/RSRQ and/or an additional quantity metric to specify the size of the list (number of entries in the list) in terms of max number of Rx beams, max number of Tx beams or max number of Rx-Tx beam pairs, max number of mBs (in case of neighbor measurements). The WTRU may be provided with basic entry criteria to the list, for example add a new Rx-Tx pair to the list if the quality metric RSSI/RSRP/RSRQ is above a specified threshold. The WTRU may be configured to report the Rx-Tx list to the mB based on different reporting criteria (such as, for example, event driven or periodic criteria).

The event driven reporting may be based on one or more events. For example, events L1, L2, L3, and L4 may be defined: L1 may occur when a new Rx-Tx beam pair is added to the list; L2 may occur when an existing Rx-Tx beam pair is removed from the list; L3 may occur when the order of Rx-Tx beam pair changes within the existing list; and L4 may occur when the topmost Rx-Tx beam pair changes.

In the steady state, a WTRU may be configured to use the topmost beam pair in the Rx-Tx list. When the topmost Rx-Tx beam pair changes, the WTRU may be configured to switch to a different beam pair. Switching may be based on the switching rules: 1) When the topmost Rx-Tx beam pair changes and the new beam pair differs by only the Rx beam, then the WTRU may implicitly switch the Rx beam for subsequent data reception; 2) When the topmost Rx-Tx beam pair changes and the new best beam pair has a different mB Tx beam, then the WTRU may trigger a measurement report/L1/L2 indication to the mB using LTE carrier and such a report may include the preferred mB Tx beam ID or an index to the entry Rx-Tx beam pair list that corresponds to the preferred Rx-Tx beam pair. Similar switching rules may be defined at the serving mB: 1) When the topmost Rx-Tx beam pair changes and the new beam pair differs by only the Tx beam, then the mB may implicitly switch the Tx beam for subsequent data transmission; 2) When the topmost Rx-Tx beam pair changes and the new best beam pair has a different mB Tx beam, then the mB may trigger a L1/L2 beam switch command to the WTRU using LTE carrier/mmW carrier and such a command may either explicitly include the receive beam ID at the WTRU or alternatively an index to the entry Rx-Tx beam pair list that corresponds to the preferred Rx-Tx beam pair.

A wide beam may carry data channels (e.g., in addition to control channels). The WTRU may switch to wide beam reception if the narrow beam is blocked by obstacles/environment or if the WTRU loses tracking with the narrow beam (e.g., due to sudden orientation change), while the WTRU and mB perform narrow beam search/refinement procedures.

Figure 24:
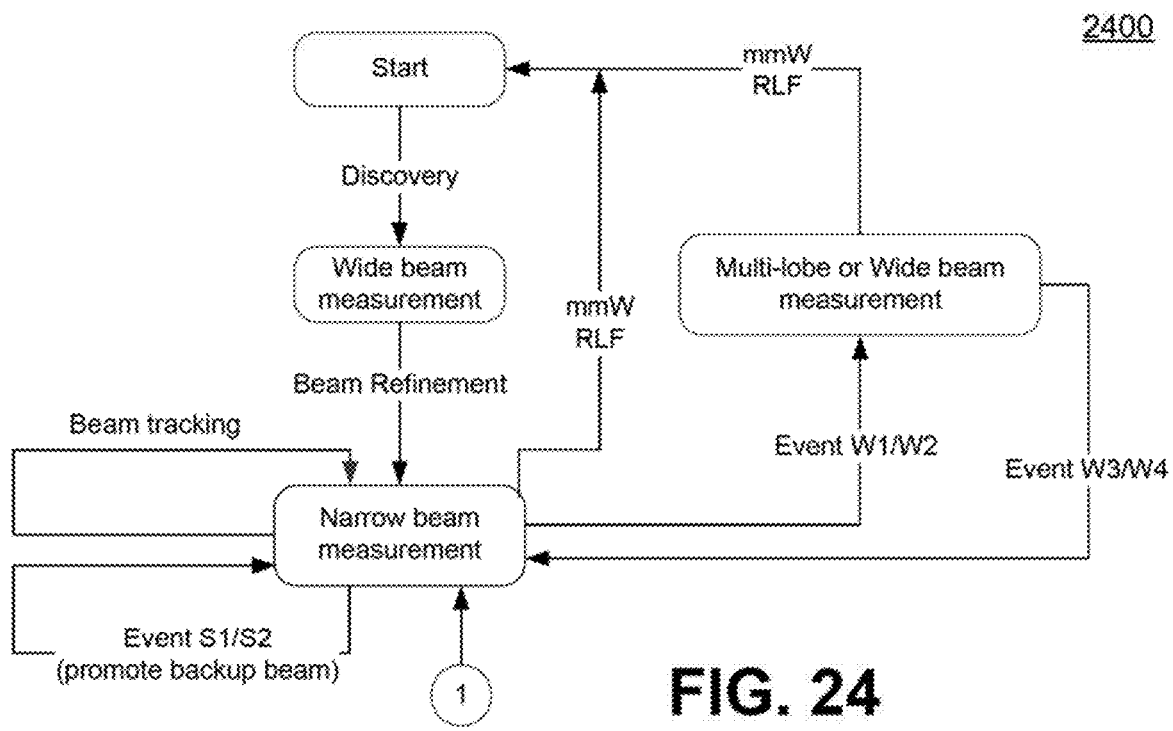
FIG. 24 is a diagram of an example of a process for measuring states and transitions in a serving mmW basestation (mB).

FIG. 24 is a diagram 2400 of an example of a process for measuring states and transitions in a serving mmW basestation (mB). Wide beams ID may be numbered as B1, B2, B3 at the mB side and at the WTRU side b1, b2, b3, while the narrow beams within the wide beams may be numbered using the wide beam index as the most significant digit and index of narrow beam within the narrow beam as the least significant digit, e.g. B11, B12 for the mB beams and b11, b12 etc for the WTRU beams. Such an assignment scheme may provide implicit mapping between the wide beam and the narrow beams within those wide beams.

Figure 25:
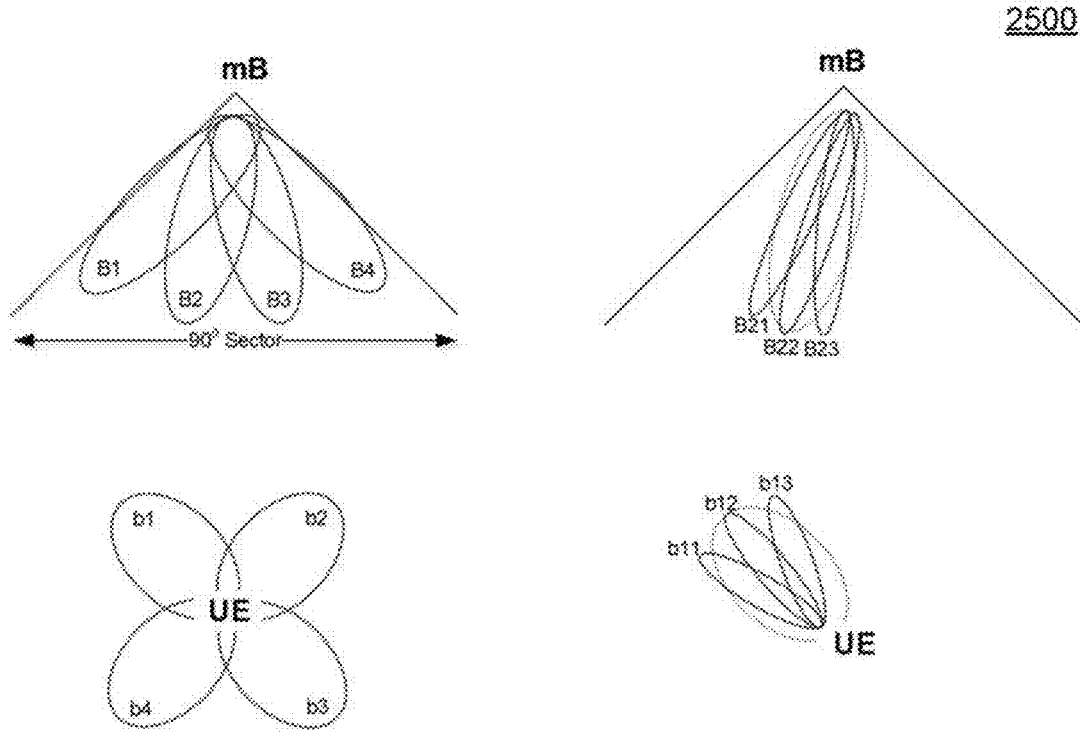
FIG. 25 is a diagram of an example of wide beam and narrow beam configurations.

FIG. 25 is a diagram 2500 of wide beam and narrow beam configurations. An mB may use multiple antenna arrays. WTRUs may transparently measure different beams from the antenna arrays or an antenna array may have a virtual cell ID, and a WTRU may filter and report a best beam for a virtual cell ID/antenna array. The mB may broadcast using SIB the set of virtual cell IDs associated with the mB and possibly the range of beam IDs used by each of the virtual cells so that the WTRU may also distinguish a serving cell (e.g., and may distinguish a set of virtual cells) from the neighboring cells.

The WTRU may be configured with a neighbor mB measurement configuration. A neighbor mB measurement configuration may include at least one measurement identity (e.g., mmW measurement object linked to a reporting configuration). The WTRU may use a directional receive beam to perform measurement on the neighbor mB. The WTRU may be provided measurement gaps to perform for intra-frequency mmW neighbors. The mmW neighbor measurement may include the WTRU may searching for mmW neighbor cells. Such neighbor search is similar to the small cell discovery and synchronization described above.

The WTRU may obtain the association between the neighbor LTE cells and the mmW cells co-sited with the LTE neighbors, for example, from the serving LTE cell. Such association information may also include the timing assistance for mmW discovery and synchronization. The serving mB may configure measurement gap patterns, taking into account the WTRU capability (in terms of number of wide beams that the WTRU can support) and the periodicity of the mmW reference signals. The WTRU may receive a particular measurement gap pattern for mmW cell search different from gaps for actual mmW measurement. Further the measurement gap patterns may be different for wide beam measurement stage and narrow beam measurement stage. The measurement gaps may be specified by gap length and gap periodicity. The WTRU may apply the measurement gap configuration for the mmW cell search, such that WTRU may switch its receive beam after n measurement gaps. The value n may depend on the number of transmit beams used by the mB, periodicity of the reference signal transmission, and number of measurement samples required for a successful mmW cell search. The WTRU may remember the receive beam pattern used in the previous measurement gap and either choose next receive beam in sequence (clockwise or anti-clockwise) or choose a random unused receive beam in the subsequent measurement gap.

The WTRU may also receive L2 filtering configuration to limit the amount of neighbor measurement feedback. The WTRU may trigger the L2 filtering operation upon completing the receive beam sweep (360 degree scan or, for lower capability WTRUs, all supported receive beams). The WTRU may report the number of mmW neighbors detected, so that the serving mB may allocate the measurement gap patterns accordingly. The WTRU may report the number of receive beams valid for measurement based on the detected mmW neighbors and the serving mB may allocate measurement gap patterns accordingly.

mmW neighbor measurements with a wide control beam and a narrow data beam may be support multi-stage neighbor measurements. The serving mB may configure the WTRUs to measure wide control beams of the neighbor mB. The serving mB may configure the WTRUs with the measurement gaps with timing information for the neighbor mB control beam measurements. Based on receiving the control beam results, the serving mB may configure the WTRU with a set of measurement gaps to measure the narrow data beams from the neighbor mB. The serving mB may negotiate with the neighbor mB to determine the measurement gap configuration. In case of periodic control reference signal transmission, the serving mB may request the neighbor mB to provide the timing information for the control beam transmission. The Xn negotiation may be employed in case the neighbor mB does not support periodic reference signal sweeping but supports on demand reference signal transmission. In the latter case, the serving mB may provide the approximate location of the WTRU, so that the neighbor mB may determine a subset of transmit beams and provide the scheduling information of those beams. The current serving cell or the neighbor mB may determine the set of beams for measurement based on the current serving beam. The serving mB may store mapping information of neighbor beams for each serving beam, for example, using a table. This table may be built using a SON framework, e.g., utilizing WTRU-based measurements. The serving mB may use this mapping information when requesting for the timing information or scheduling information for the neighbor beams.

The mBs may periodically sweep the transmission of reference symbols for control and data beams. An mB may decide to sweep control beams more frequently than the data beams. The serving cell may, as a part of negotiation procedure, obtain the periodicity with a common reference, e.g., serving cell SFN and may signal them to the WTRU.

The WTRU may maintain the mmW neighbor measurement states. Upon a successful mmW neighbor detection procedure, a WTRU may periodically measure the neighbors using a wide receive beam. The WTRU may be configured to report the event N3/N4 to the serving mB. On receiving event N3/N4 from the WTRU, the serving mB may provide the WTRU an updated measurement gap pattern. Measurement gaps may be tagged with the neighbor mB cell ID. A WTRU may then perform beam refinement procedure with a neighbor entering N3/N4 criteria. During beam refinement procedure, the WTRU may performs the measurement using different narrow beams (e.g., within the wide beam satisfying event N3/N4). At the end of the beam refinement procedure, the WTRU may select at least one preferred narrow receive beam for the corresponding neighbor. The WTRU may measure the narrow receive beam. The WTRU may use the selected narrow beam to measure and track the selected neighbor.

Figure 26:
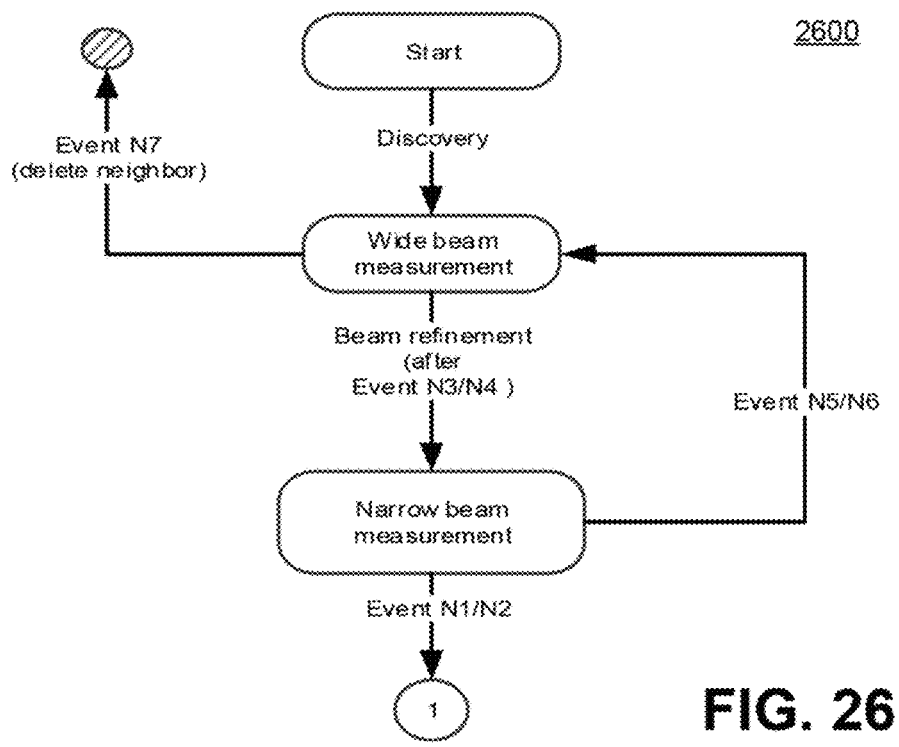
FIG. 26 is a diagram of an example of a process for measuring states and transitions in a neighbor mB.

FIG. 26 is a diagram 2600 of an example of mmW neighbor measurement. Measurement events specific to wide beam and narrow beam measurements for neighbor mBs may be configured. For example, events N1-N7 may be defined: N1 may occur when serving beam m_metric becomes offset below than neighbor beam; N2 may occur when serving beam m_metric becomes below a defined threshold and neighbor beam becomes above a defined threshold; N3 may occur when backup beam m_metric becomes offset below than neighbor beam; N4 may occur when backup beam m_metric becomes below a defined threshold and neighbor beam becomes above a defined threshold; N5 may occur when backup beam becomes offset better than neighbor beam m_metric; N6 may occur when backup beam m_metric becomes above a defined threshold and neighbor beam becomes below a defined threshold; and N7 may occur when neighbor beam m_metric becomes below a defined threshold. m_metric may be received power, SNR, RSRP, RSRQ, or SINR etc. The backup beam may be a narrow receive beam. The backup beam may be a wide receiver beam corresponding to the serving mB.

Figure 27:
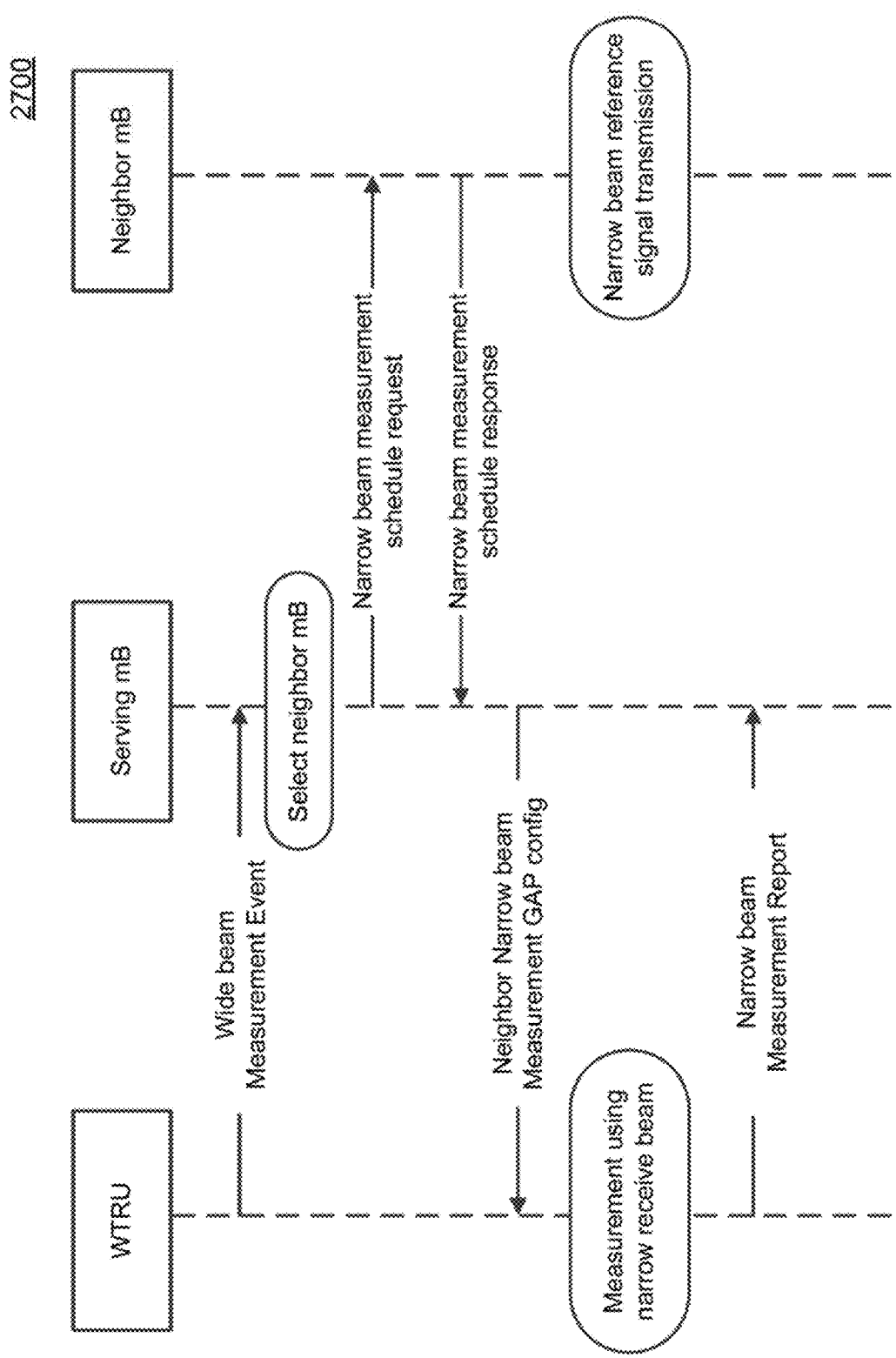
FIG. 27 is a diagram of an example of a call flow for measurement of a serving mB and a neighbor mB.

To handle the mmW neighbors in the narrow beam MX/TX state, inter-mB coordination procedure as shown in FIG. 27 may be used to determine the transmission schedule for narrow beam reference signals. A WTRU may report that the wide beam pair corresponding to the neighbor mB becomes better than the serving backup beam (e.g., event N3/N4). The serving mB may identify the appropriate neighbor mB from the measurement report and transmit a narrow beam schedule request to the corresponding neighbor mB.

The serving mB may include the wide beam ID of the neighbor mB reported by the WTRU in the schedule request message. The neighbor mB may calculate a schedule for transmission of narrow beam reference signals, considering the own cell data transmissions. The WTRU may consider transmission of measurement reference signals for other WTRUs (both own cell and in other neighboring cells). The neighbor mB may choose to limit the narrow beam transmission which corresponds to the reported wide beam. The neighbor mB may then signal the schedule, which may include one or more gap start times, gap length and periodicity back to the serving mB. The serving mB may configure measurement gap to the WTRU, such that the gap is aligned with the schedule provided by the neighbor mB. The WTRU may measure the neighbor mB narrow beams with narrow receive beams and report the measurement results to the serving mB.

The neighbor mB may periodically exchange the schedule for narrow beam reference signals that are transmitted for its own WTRUs. The serving mB may opportunistically use those periods for scheduling measurement gaps. The serving mB may consider the neighbor mBs satisfying event N3/N4 as handover target, and may forward the data traffic to those neighbor mBs.

FIG. 27 is a diagram 2700 of an example of mmW neighbor measurement. Inter-mB coordination may be simplified, so that the neighbor mB may receive an ON/OFF request for narrow beam transmission from the serving mB. The neighbor mB may transmit the narrow beam according to a predefined schedule and duration. The neighbor mB may suspend the transmission of narrow beam reference signals if there are no pending requests from the serving mBs.

A serving mB may enable narrow beam measurements from the WTRU point of view, while the neighboring mB still uses wide beam reference signal transmission. For example, when the WTRU reports event N3/N4 for a neighbor n1, the serving mB may provide gaps for measurement using narrow receive beam from WTRU point of view, while the neighbor n1 may still transmit using periodic wide transmit beam. The serving mB may transmit a L2/L1 control message to the WTRU to enable transition from wide beam to narrow beam measurements. The command may include the identity of the neighbor mB. The serving mB may tag the measurement gaps with information such as at least one of the neighbor mB, the type of measurement, wide or narrow beam, and the beam IDs to use for measurements. Inter-mB coordination may not be necessary.

The serving mB may determine the handover criteria based (e.g., just based) on the control beam quality and the narrow beam forming may be carried out after the handover in the target mB.

Figure 28:
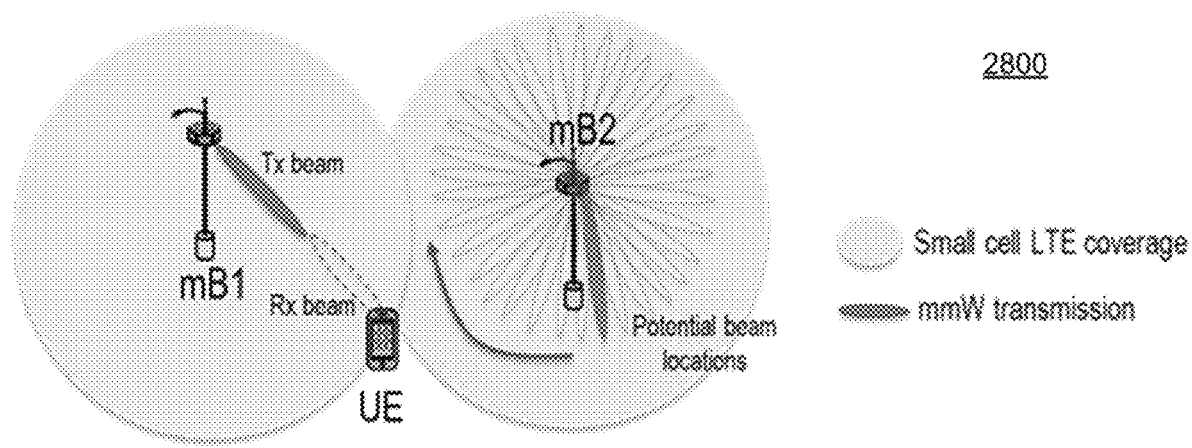
FIG. 28 is a diagram of an example of mmW measurements.

FIG. 28 is a diagram 2800 of an example of mmW measurements. In case of collocated LTE and mmW carriers, the mB may determine the handover based on the LTE measurement and/or on mmW carrier measurements. To enable such handover criteria, when the serving mB receives the measurement results for the LTE frequency, it may determine a set of candidate target mBs. The serving mB may configure measurement gaps for the WTRUs for the mmW measurements in one or more neighbor mBs. Based on receiving the measurement results for LTE and mmW carrier, the mB may determine the target mB for handover. The mB may consider the ability of the WTRU to receive the SRB on the target LTE frequency as one criterion to determine the first set of handover targets. Among the first set of handover targets, the serving mB may then calculate the estimated combined CQI of the LTE+mmW carrier, accounting for additional bandwidth on the mmW carrier and then determine the second set of handover targets. Based on the cell loading and interference metric, the serving mB may determine the actual handover target from the second set. The serving mB may prepare multiple target mBs from the second set, to handle reestablishment.

Inter-mB coordination may be used if the neighbor mBs do not perform periodic reference signal sweeps. The serving mB may determine the candidate mmW neighbors based on the LTE measurement results. The serving mB may configure the WTRU, for example, via RRC signaling to provide one or more mmW measurement configurations that may include directional assistance, timing assistance (e.g., via measurement gaps), and the like.

A WTRU connected on mmW (WTRU e.g., an mWTRU herein) may require measurement gaps to measure even the intra-frequency neighbors. A measurement gap may be referred to as a gap. A mWTRU may be configured to measure one or more beams (e.g., a wide beam and/or narrow beam) from the serving mB and/or one or more beams from a neighbor cell. One or more gaps may be configured to perform such operation.

Depending on the operation performed during the gap period, the gaps may be classified into different types, for example based on the measurement activity performed during those gaps. A measurement gap type may include at least one of: a serving mB wide beam measurement; a serving mB narrow beam measurement; an intra-frequency mmW neighbor search; an inter-frequency mmW neighbor search; an intra-frequency mmW neighbor wide beam measurement; an intra-frequency mmW neighbor narrow beam measurement; an inter-frequency mmW neighbor wide beam measurement; an inter-frequency mmW neighbor narrow beam measurement; and an inter-RAT measurement (such as, for example, LTE, UMTS, GSM, etc). A mWTRU in mmW CONNECTED STATE may be required to perform one or more of the above measurements.

Figure 29:
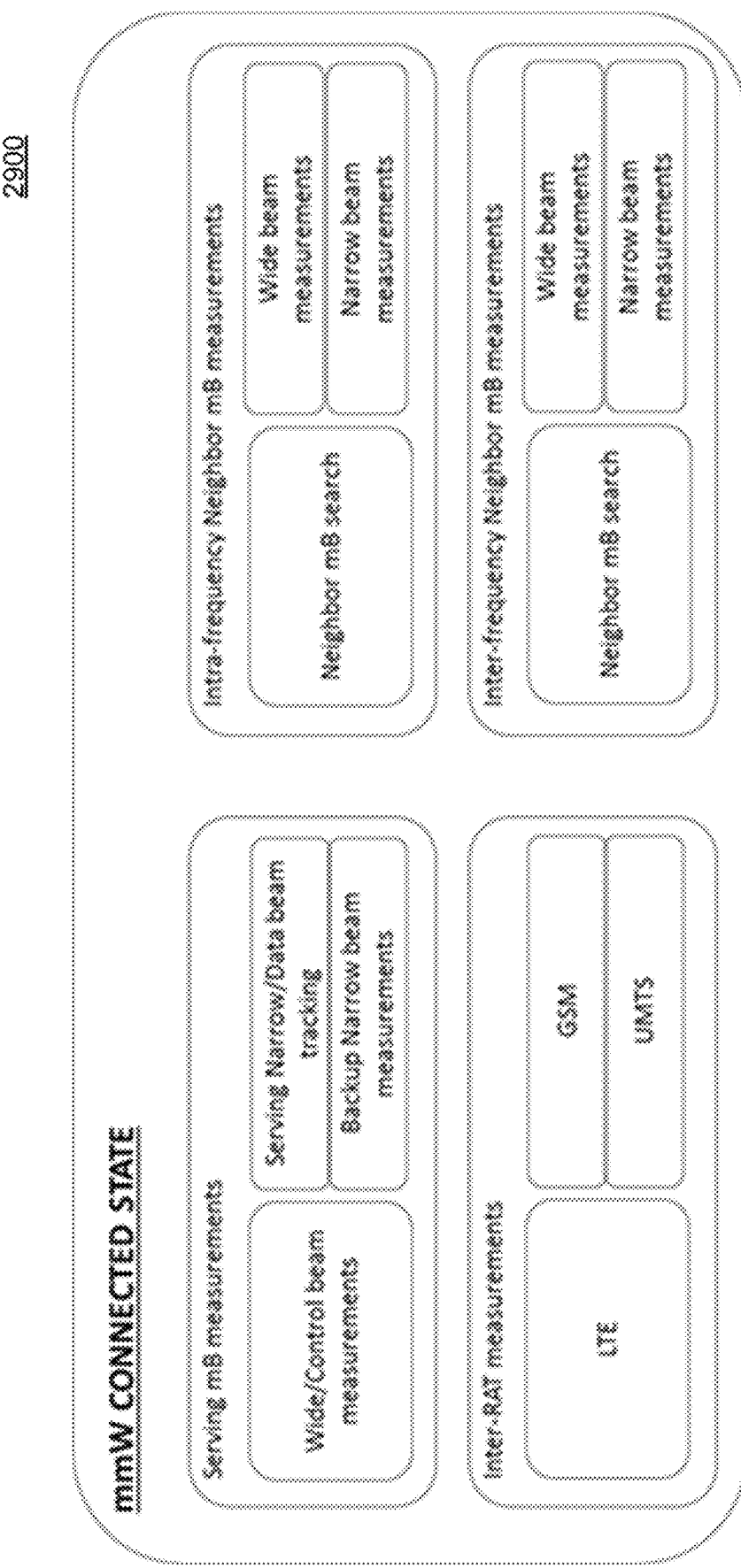
FIG. 29 is a diagram of an example of mmW measurement activities.

FIG. 29 is a diagram 2900 of a different measurement sub-states associated with the foregoing measurement types. The mB may provide a fixed schedule for top level measurement sub states. A WTRU may determine when to schedule the individual measurements.

Figure 30:
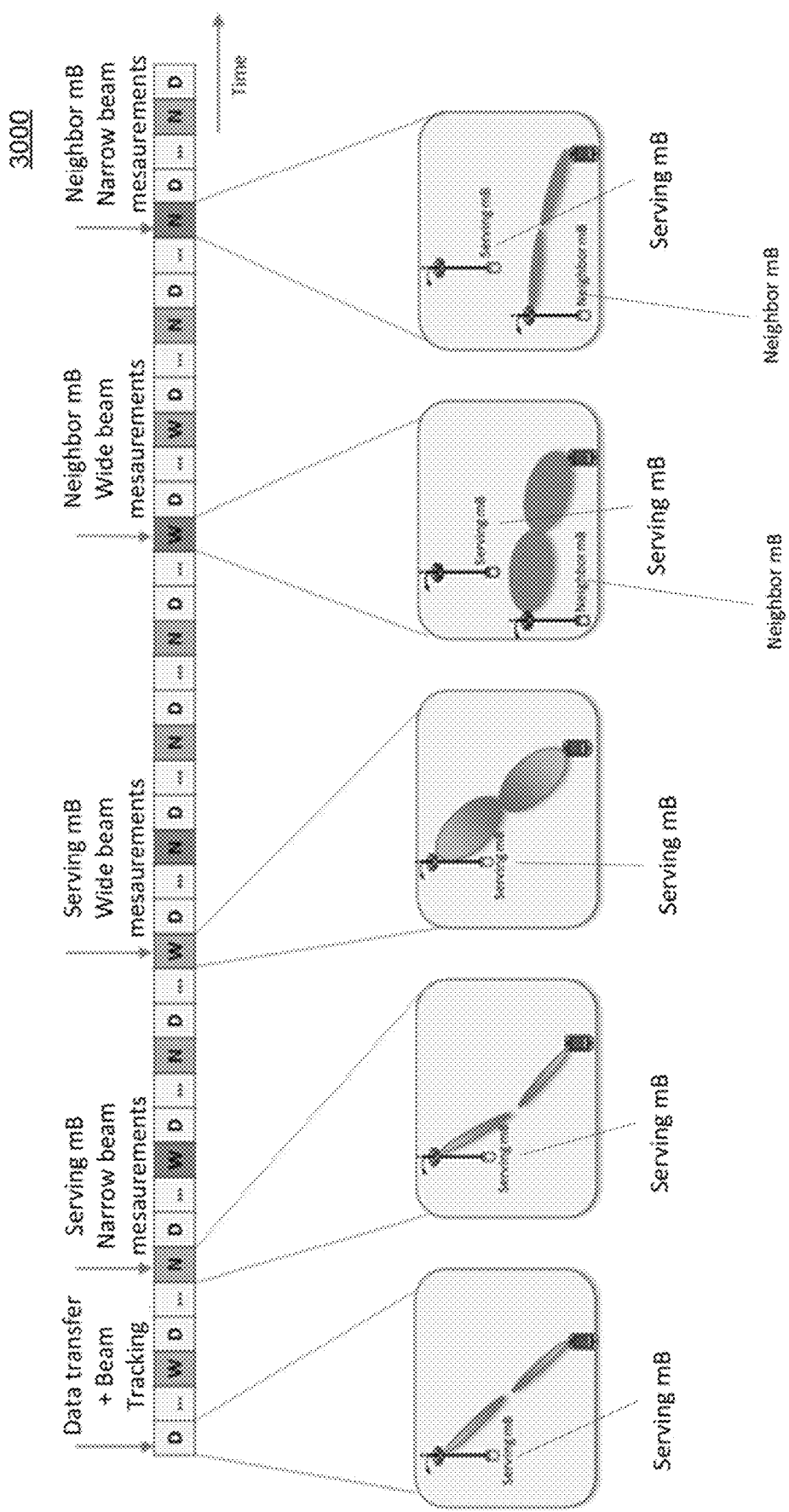
FIG. 30 is a diagram of an example of mmW measurement activities.

A WTRU may be configured with multiple measurement gap patterns that co-exist simultaneously. For example, multiple measurement gap patterns may be interleaved in a time period as illustrated in the example of FIG. 30, where narrow beam measurement gaps and wide beam measurement gaps co-exist in the same time period illustrated in FIG. 30. At least one parameter in a measurement gap configuration may be different between different measurement gap types (e.g., a measurement gap pattern may be referred to as a measurement gap configuration). The WTRU may be configured with concurrent (e.g., interleaved) measurement gap patterns, e.g., pattern-s and pattern-n, for example, one for serving mB measurements and the other for neighbor mB measurements. A measurement gap pattern may include at least one of the following: a gap pattern Id; a gap start offset; a gap length; a gap Repetition period; or a gap Purpose, where a gap purpose may be related to an activity (e.g., measurement gap type associated with a gap pattern). A gap pattern Id may be a unique identifier to differentiate different gap patterns. A gap start offset may identify the starting subframe number of a measuring gap pattern. A gap length may set the duration of a measurement gap. A gap Repetition period may set a repetition rate for a measurement gap in terms of number of subframes or slots. A gap Purpose may identify the measurement activity to be performed during the measurement gap (e.g., gap Purpose may have an identifier for each measurement activity, for example: serving mB wide beam measurement; serving mB narrow beam measurement; intra-frequency mmW neighbor search; inter-frequency mmW neighbor search; intra-frequency mmW neighbor wide beam measurement; intra-frequency mmW neighbor narrow beam measurement; inter-frequency mmW neighbor wide beam measurement; inter-frequency mmW neighbor narrow beam measurement; and inter-RAT measurement).

Each measurement activity may be associated with an individual measurement gap pattern. Different measurement gap patterns may be established for the gap Purpose of neighbor measurements, e.g., wherein each measurement gap pattern may be associated with a particular neighbor mB.

FIG. 30 is a diagram 3000 of a different measurement activities depicting exemplary sub frame level timing for different measurement gap operation. The relative widths of different slots labeled as 'D', 'W', 'N' are not to scale and may be determined according to the reference signal design and RRM requirements. The length and periodicity of slots labeled 'D', 'W', 'N' may be different from each other and even for the slots labeled 'W,' the serving mB may configure different gap patterns for the serving and neighbor measurements.

FIG. 30 may be extended to support any number (e.g., all) of the measurement activities (e.g., which may include inter-RAT configuration etc.). Beam tracking may be performed during the data slot, where pre-defined reference signal sequences may be added to the tail bits of the data symbols. The serving mB may indicate the presence of beam tracking tail bits/symbols, e.g., in the DCI message or the beam tracking signals may placed at predefined symbol location during the data slot. The serving mB may schedule a separate measurement gap for beam tracking and it may be scheduled along with serving beam narrow beam measurement gap.

An mB may configure the mWTRU such that the concurrent gap patterns do not overlap in time. An mB may configure the mWTRU such that the gap patterns do overlap and in such case the mWTRU may be provided with a rule such that certain gap purposes take priority over others. Prioritization may be based on the measurement gap type. Prioritization may be based on specified criteria, for example, if the serving mB beam is below a threshold, then serving mB measurement may take a higher priority than inter-frequency neighbor mB measurement.

Two types of measurement gap patterns may be configured for the mWTRU (e.g., hybrid measurement gap configuration). For the neighbor measurements, a common measurement gap pattern with fixed periodicity may be configured. The WTRU may choose what type of neighbor measurement may be performed in a measurement gap (e.g., such that RRM requirements defined in a standard are satisfied). For the serving cell measurements, the serving mB may create dynamic measurement gaps for the mWTRU, e.g., using a new DCI format or using a L1 signaling. The new DCI format may address the mWTRU or group of mWTRUs using a separate RNTI called a measurement RNTI or m-RNTI. This new measurement DCI format may convey the time and frequency resources to be used for measurement, a beam ID corresponding to the measurement reference signal. The mB may use L1 signaling to command the mWTRU to perform measurements.

A mWTRU may be configured with a single measurement gap pattern and the parameters for the measurement gap pattern may be chosen, e.g., according to the measurement type with the most stringent requirements. A mB may provide the mWTRU with rules/criteria for determining the type of measurements to be performed during each gap. Different timer values may be configured to control the periodicity of different measurement activities. The mB may configure different events that may be satisfied for a particular measurement activity to be performed during a measurement gap.

The mB may configure mWTRUs with a fixed measurement gap pattern (fixed length and periodicity) for each of the mWTRUs in the cell. Depending on the mWTRU capability, certain mWTRUs may not use each of the configured measurement gaps, while still conforming to RRM requirements. Those mWTRUs may indicate to the mB availability of unused measurement gaps, which may enable the mB to schedule data to the mWTRU. The mWTRU may use a MAC CE or L1 control signaling to indicate an offset to the next unused measurement gap. The number of such measurement gaps may be signaled. The serving mB may take into account the unsued measurement gaps while scheduling the mWTRU.

The length and periodicity of measurement gap configuration may be dependent on one or more of mWTRU capability (e.g., number of PAAs, number of beams supported, support for analog or digital beamforming, support of two or more simultaneous RX beams, etc.), mWTRU mobility status (e.g., location and/or speed of the mWTRU), and the status of mWTRU measurement results (e.g., number of neighbor mB beams detected). The measurement gap configuration may account for a compromise between desired mobility performance vs degradation in throughput due to measurement overhead. A mWTRU may report minimum measurement gap requirements based on mWTRU capability and measurement status to the serving mB, e.g., to allow for optimal measurement gap configuration. The serving mB may consider the mWTRU inputs when allocating the measurement gaps. The mWTRU may transmit a MeasurementGapRequest (MGR) message with the contents including at least one of: adding/removing/modifying a measurement gap pattern ID, a gap length, a repetition period, a number of repetition, a gap purpose etc. Such a MGR message may be sent using L1 signaling (e.g., PUCCH or MAC CE or RRC signaling).

An mB may signal the mWTRU with a measurement gap related configuration using at least one of: RRC signaling (e.g., measgapconfig); MAC Control element (e.g., measgapCommand CE); Measurement DCI in the control channel (e.g., addressed by m-RNTI or WTRU specific RNTI); in case of duplexing, a NULL subframes configuration may implicitly provide gaps for the WTRU to perform measurements (such NULL subframes may be configured if the mB is using a wide beam during a DL subframe and such a wide beam cannot be received by the mWTRU); mWTRU may use DRX gaps in the RRC CONNECTED mode to perform measurements; mWTRU may explicitly request for a gap duration which may be dependent on the historical WTRU measurement results. WTRU capability (e.g., in terms of number of receive beam configurations), WTRU receiver design, and/or number of detected mBs; certain measurement gaps may be created naturally by the mB scheduler (e.g., driven by DL queue status for the WTRU or driven by scheduler logic for prioritizing other WTRU) and the mB may signal such information using a MAC CE (e.g., measgap command) to the mWTRU; the mWTRU may create gaps autonomously to prioritize measurements over DL data reception (for example, when the serving control beam is below a threshold and if the mWTRU does not have a backup wide beam measurement, the mWTRU may skip subsequent PDCCH reception for one or more TTIs and perform serving cell wide beam measurements. The mB may limit the number of subframes that could be skipped by WTRU autonomous gap creation, by configuring MAX number of contiguous subframes that can be skipped and additionally minimum periodicity of such autonomous operation). Where appropriate, above measurement gap related configurations may be determined by the mWTRU.

Mobility may be a challenge for an mmW access link due to directional transmission and reception. The WTRU orientation may trigger handover or radio link failure. In dense deployment of mBs, the number of handovers may increase even with low mobility WTRUs. This may result in lower QoE for the user and may increase signaling overhead on the network, e.g., toward the MeNB.

The source mB may select the target mB and potential candidate beams in the target cell. The source mB may store a mapping between target candidate beams based on the current serving beam. The target candidate beam may be intra-mB or inter-mB beams. During handover preparation, the source cell may select a set of candidate beams to measure on the target mB based on the serving cell beam. Self-organizing procedures may be used to create this beam ID mapping. The source/target mBs may keep track of the successful handovers and the beams used before and after handover. The WTRU may maintain a history of beam IDs used before and after handover. The mBs may query this information from the WTRU to update the confidence of the beam ID mapping. Temporary prohibit timer based mechanisms may be used to take into account temporary blockages that may invalidate the mapping and that may result in handover failures.

The source mB may send the beam ID used before the handover to the target mB, and the target mB may maintain the mapping between the source beam IDs and the target beam ID. During handover execution, the target may choose RX beams for RACH/WTRU UL beams based on the reported DL/UL beams during handover preparation.

The source mB may provide a list of prepared target mBs to the WTRU in a pre-handover command. In case of sudden radio link deterioration, the WTRU may experience radio link failure and may recover by reestablishing a radio link with any of the pre-configured target mBs. The source mB may keep the prepared target mBs up to date with the WTRU state and may enable data flooding to the potential mBs. This may be useful if the source mB did not have enough time to transmit a handover command to the WTRU or the WTRU cannot receive the handover command reliably.

In the deployments that use self-backhaul, a handover procedure may be used, mmW mobility may be characterized by frequent handovers and shorter time of stay in each mmW small cell. If certain handover procedures are used, frequent ping pongs may happen and efforts to reduce the ping pong effect with hysteresis may result in increased radio link failures. mmW self-backhaul may enable a lightning X2 connection that may improve handover interruption times and reduce the effect of ping pong. The source and one or more target mBs (e.g., in a clustered deployment) may establish a WTRU-specific lightning X2 connection. In case of radio link failure, L2 handover, or WTRU-based autonomous mobility, the target mB may receive a UL RACH from the WTRU and an ID indicating the source mB. The target mB may coordinate with the source mB to set up a lightning X2 connection that may involve negotiating a schedule for data reception on the mmW backhaul link. The target mB may configure the WTRU to receive on the downlink according to the schedule on the backhaul link. Once a connection is established, the target mB may perform an amplify and forward operation on the data received from the source mB to the WTRU and vice versa. This may result in reduced latency and avoid the effects of ping pong. The duration of the connection may be controlled by a guard timer. On expiry of the guard timer, the target mB may be promoted to a serving mB, and a path switch may be triggered towards the macro mB or the SGW. The target mB may decode and forward the data mapped to the SRBs.

Figure 31:
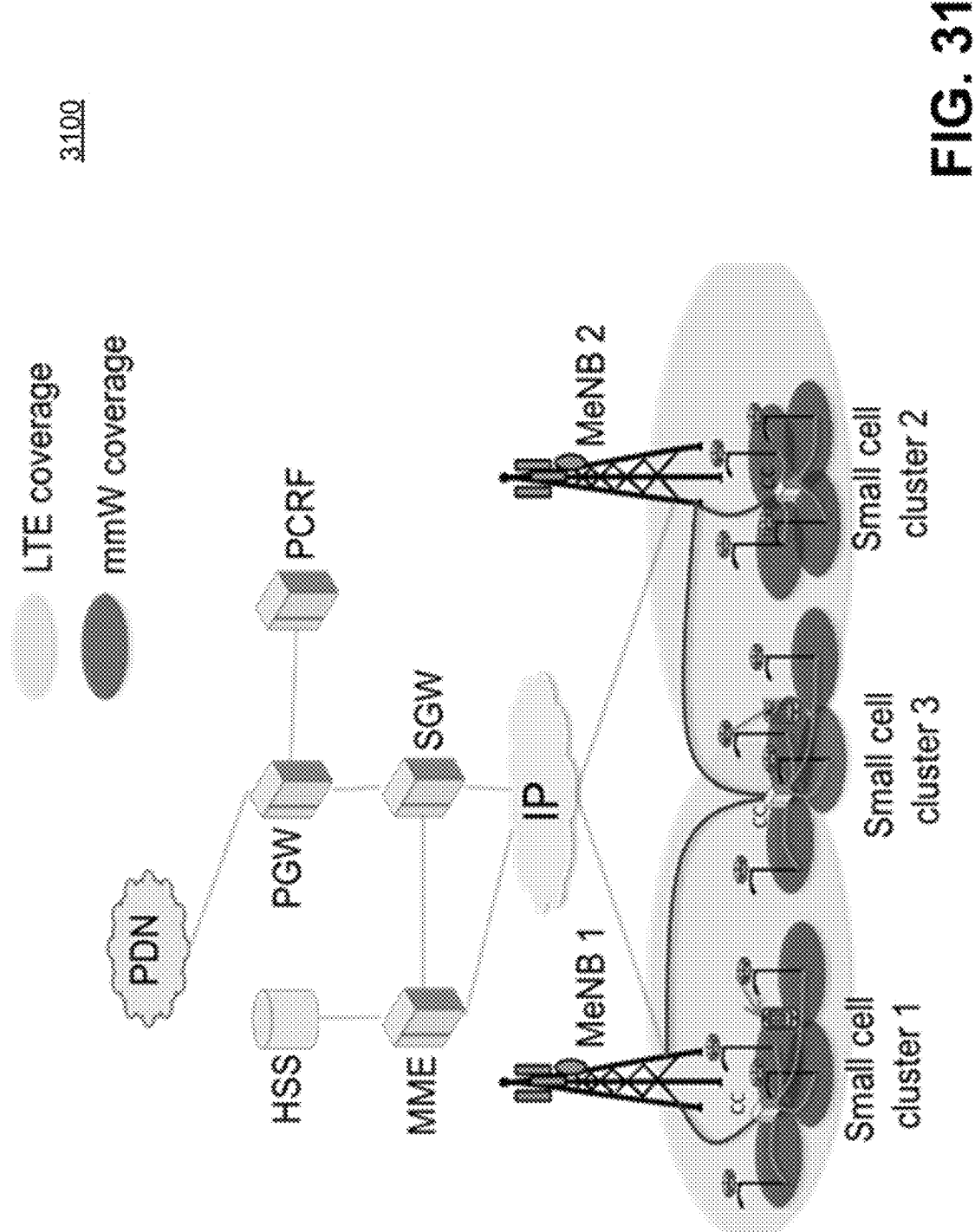
FIG. 31 is a diagram of an example of mmW small cell clustering.

FIG. 31 is a diagram 3100 illustrating an example of mmW small cell clustering. With a dense deployment of mBs, the number of handovers may increase even for low mobility WTRUs. Depending on the WTRU capability and the width of the data beam, a WTRU orientation change may trigger a handover or radio link failure. This may affect QoE as perceived by the WTRU and may increase signaling toward the macro eNB, which may affect network efficiency. The number of context transfers between small cells may also increase. mB clustering may address these issues. An mB cluster may be a grouping of mmW base stations that may hide the mobility of a WTRU in the small cell layer from the macro eNB.

The grouping of the mBs may be static and may be based on the geographical proximity of mBs. A WTRU may discover the cluster configuration by the presence of a cluster ID in the system information broadcast or by the choice of cell ID such that the mBs within a cluster may be identified by a base cell ID and a configured number of offsets.

The grouping of the mBs may be dynamic and may be formed, for example, based on an interference pattern. In interference-based clustering, a group of mBs within the interference zone of each other may form a cluster and a single mB chosen as cluster head may coordinate transmission of different mBs within the cluster. The cluster head may choose to dynamically turn OFF and ON certain mBs within the cluster to reduce the impact of interference.

Grouping may be dynamic and may be WTRU-specific. WTRU-specific clustering may be performed based on the location of the WTRU and may be dynamically updated based on WTRU measurement results. WTRU-specific clustering may be logical (e.g., not physical), e.g., an mB may be part of more than one cluster for two or more WTRUs.

One or more of the clustering disclosed herein may be made transparent or non-transparent to the WTRU. The WTRU may not be able to distinguish transmissions between two different mBs if clustering is made transparent. Transmissions from different mBs may be identified by different beam IDs, and for the purposes of radio resource management the WTRU may assume that the beams may belong to one logical mB. Transparent clustering may be deployed using distributed RRHs that may use mmW CoMP schemes, such as coordinated beam forming or scheduling and dynamic point selection, etc.

One mB in each cluster may be a cluster head and may coordinate the cluster. The cluster head may be a logical node and the cluster head functionality may be implemented using a cloud infrastructure. The cluster head may provide a consistent interference similar to a single small cell interface to the macro eNB. The cluster-specific aspects may be hidden from the macro eNB, which may assume that the WTRU is served by a single mB. The cluster head may provide a consistent interface similar to S1-U interface to the core network elements, e.g., from the SGW point of view, the S1-U interface may terminate at a single small cell eNB.

A flooding mechanism may reduce signaling, context transfer and the data flow between multiple mBs in case of frequent handovers. The entry mB (e.g., the first mB in the cluster that receives the data from the core network) may flood the data to all the mBs in the cluster. The cluster members may maintain an active WTRU context, and the WTRU may move between any mB within the cluster without having to reestablish the link every time. Data may be forwarded to the cluster head, while being cached at each intermediate hop, and the cluster head may forward the data to other mBs in the cluster.

The cluster head may ensure that the L2 state of all the cluster members may be kept up to date, so that the WTRU may transparently move from one cluster member to another. When the WTRU moves from a source mB to any mB within the cluster, the target mB may be ready to accept the uplink data from the WTRU and may be ready to transmit the most recent downlink data to the WTRU without the source mB preparing a particular target mB. The cluster members may maintain the soft L2 state, e.g., the L2 state may be periodically updated by the serving mB for a particular WTRU (e.g., when it receives the ARQ/HARQ feedback from the WTRU). When the WTRU moves from one mB to another, e.g., upon performing a RACH or uplink beam forming procedure, the WTRU may be allowed to transmit and receive on that mB.

A flooding mechanism may solve the ping pong issues that may happen due to frequent changes in WTRU orientation.

Handover within a cluster may be triggered by L2 messaging, e.g., instead of L3 messaging. The handovers within the cluster may be seen by the WTRU as a simple beam switch operation. The source mB may transmit a beam switch command on the MAC CE to trigger a handover to a neighbor mB. The RLC context may persist across a handover to mBs within the cluster. The network may also configure WTRUs to perform autonomous mobility within the cluster. In case of autonomous mobility, the WTRU may dynamically choose any mB within the cluster to transmit and receive the data as soon as the WTRU performs uplink and downlink beam forming.

For mesh backhaul for the small cell mBs, the routing on the backhaul may be performed with cross-layer inputs from the access side protocols. For example, the routing layer on the backhaul may obtain the information about the WTRU-specific cluster configuration and may weigh the routing metric such that the routing path maximizes the traversal through clustered mBs more than the non-cluster mBs. The intermediate hops along the way may cache the forwarded data and store it in the WTRU soft state. The cached data may be deleted when the guard timer expires or based on the frequent L2 state updates from the cluster head. This may reduce the overhead on the backhaul due to flooding mechanism.

Figure 32:
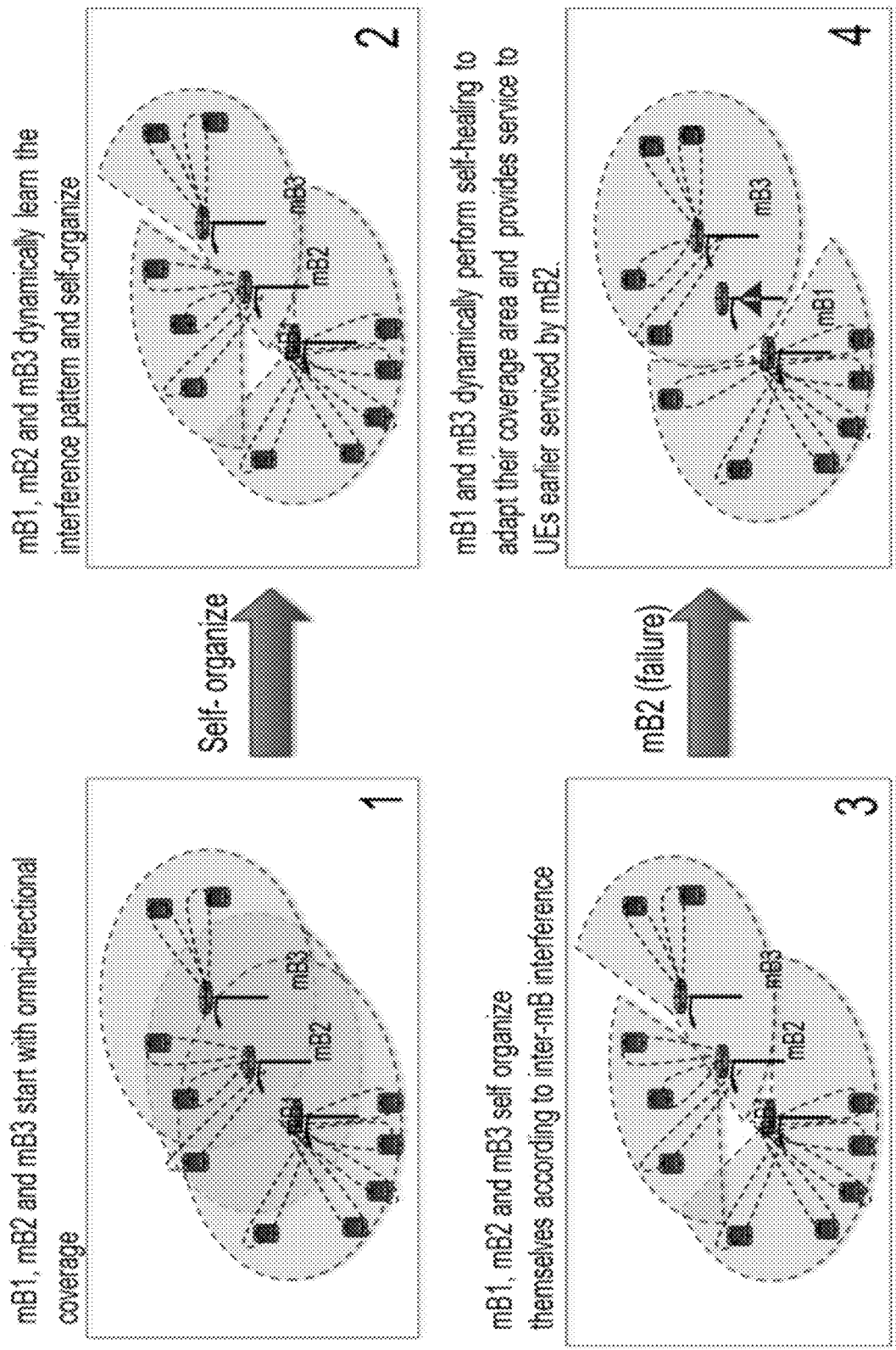
FIG. 32 is a diagram of an example of mmW elastic cells.

FIG. 32 is a diagram 3200 of an example of mmW elastic cells. Millimeter wave base stations (mBs) may not have a fixed cell shape, for example, in a dense deployment of mBs. mmW cells may not have a clear cell boundary. Due to the directional nature of transmission, mBs may dynamically (e.g., SON) morph their cell shapes to adjust their coverage patterns to reduce inter-mB interference (e.g., self-organizing, for example, on/off in certain directions). mBs may dynamically morph their cell shapes to provide services to areas with coverage holes (e.g., self-healing, for example, due to mB failure, e.g., power outage due to lack of a backup power supply or due to blockage due to trucks, new construction, etc.). mBs may dynamically morph their cell shapes to adjust their coverage according to the distribution of WTRUs (e.g., self-optimization, for example, providing overlapping coverage in high user density areas).

mBs may utilize distributed SON (e.g., WTRU reporting, X2 signaling) or centralized SON (e.g., cloud or OAM) support to control the elasticity of cell shapes. Elastic cells may be seen as a spatial domain eICIC to overcome interference issues.

The processes and instrumentalities described herein may apply in any combination, may apply to other wireless technologies, and for other services.

A UE or WTRU may refer to an identity of the physical device, or to the user's identity such as subscription related identities, e.g., MSISDN, SIP URI, etc. UE or WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A wireless transmit/receive unit (WTRU) for evaluating connectivity in a millimeter wave (mmW) system, the WTRU comprising:
   a memory; and
   a processor configured to:
      send a measurement gap request message associated with a mmW measurement;
      receive a first measurement gap pattern for a wide beam measurement of a serving cell and a second measurement gap pattern for a narrow beam measurement of a neighbor cell, and wherein the first measurement gap pattern and the second measurement gap pattern co-exist within a time period; and
      perform the wide beam measurement of the serving cell and the narrow beam measurement of the neighbor cell within the time period using the first measurement gap pattern and the second measurement gap pattern that co-exist within the time period.

2. The WTRU of claim 1, wherein the processor is further configured to send a measurement report that comprises the narrow beam measurement of the neighbor cell.

3. The WTRU of claim 1, wherein the neighbor cell is a first neighbor cell and the processor is further configured to receive a third measurement gap pattern for a beam measurement of a second neighbor cell.

4. The WTRU of claim 3, wherein the processor is further configured to perform the beam measurement of the second neighbor cell using the third measurement gap pattern.

5. The WTRU of claim 1, wherein the measurement gap request message further comprises at least one of a measurement result, a number of neighbor mmW cells detected, a location of the WTRU, or a speed of the WTRU.

6. The WTRU of claim 1, wherein the measurement gap request message further comprises a measurement gap requirement related to a capability of the WTRU.

7. The WTRU of claim 6, wherein the measurement gap requirement further comprises at least one of a number of beams supported by the WTRU, a number of phase antenna arrays supported by the WTRU, or a number of simultaneous receive beams supported by the WTRU.

8. The WTRU of claim 1, wherein at least one of the first measurement gap pattern or the second measurement gap pattern is received by decoding a measurement downlink control information (DCI) in a control channel.

9. The WTRU of claim 1, wherein at least one of the first measurement gap pattern or the second measurement gap pattern is received by decoding a medium access control (MAC) control element.

10. A method performed by a wireless transmit receive unit (WTRU) for evaluating connectivity in a millimeter wave (mmW) system, the method comprising:
sending a measurement gap request message associated with a mmW measurement;
receiving a first measurement gap pattern for a wide beam measurement of a serving cell and a second measurement gap pattern for narrow beam measurement of a neighbor cell, and wherein the first measurement gap pattern and the second measurement gap pattern co-exist within a time period; and
performing the wide beam measurement of the serving cell and the narrow beam measurement of the neighbor cell within the time period using the first measurement gap pattern and the second measurement gap pattern that co-exist within the time period.

11. The method of claim 10, further comprising sending a measurement report that comprises the narrow beam measurement of the neighbor cell.

12. The method of claim 10, wherein the neighbor cell is a first neighbor cell and the method further comprises receiving a third measurement gap pattern for a beam measurement of a second neighbor cell.

13. The method of claim 12, further comprising performing the beam measurement of the second neighbor cell using the third measurement gap pattern.

14. The method of claim 10, wherein the measurement gap request message further comprises at least one of a measurement result, a number of neighbor mmW cells detected, a location of the WTRU, or a speed of the WTRU.

15. The method of claim 10, wherein the measurement gap request message further comprises a measurement gap requirement related to a capability of the WTRU.

16. The method of claim 15, wherein the measurement gap requirement further comprises at least one of a number of beams supported by the WTRU, a number of phase antenna arrays supported by the WTRU, or a number of simultaneous receive beams supported by the WTRU.

17. The method of claim 10, wherein at least one of the first measurement gap pattern or the second measurement gap pattern is received by decoding a measurement downlink control information (DCI) in a control channel.

18. The method of claim 10, wherein at least one of the first measurement gap pattern or the second measurement gap pattern is received by decoding a medium access control (MAC) control element.

19. A wireless transmit/receive unit (WTRU) for evaluating connectivity in a millimeter wave (mmW) system, the WTRU comprising:
a memory; and
a processor configured to:
send a measurement gap request message associated with a mmW measurement;
receive a first measurement gap pattern for a wide beam measurement of a serving cell and a second measurement gap pattern for a narrow beam measurement of a neighbor cell, and wherein the first measurement gap pattern and the second measurement gap pattern co-exist within a time period;
perform the wide beam measurement of the serving cell and the narrow beam measurement of the neighbor cell within the time period using the first measurement gap pattern and the second measurement gap pattern that co-exist within the time period; and
send a measurement report that comprises the narrow beam measurement of the neighbor cell.

20. The WTRU of claim 19, wherein the measurement report further comprises the wide beam measurement of the serving cell.

* * * * *